(12) United States Patent
Isojima et al.

(10) Patent No.: US 12,057,582 B2
(45) Date of Patent: Aug. 6, 2024

(54) ELECTRODE COMPOSITION, ELECTRODE SHEET FOR ALL-SOLID STATE SECONDARY BATTERY, ALL-SOLID STATE SECONDARY BATTERY, AND RESPECTIVE METHODS OF MANUFACTURING ELECTRODE COMPOSITION, ELECTRODE SHEET FOR ALL-SOLID STATE SECONDARY BATTERY, AND ALL-SOLID STATE SECONDARY BATTERY

(71) Applicant: FUJIFILM Corporation, Tokyo (JP)

(72) Inventors: Hiroshi Isojima, Kanagawa (JP); Shin Ozawa, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 663 days.

(21) Appl. No.: 17/228,717

(22) Filed: Apr. 13, 2021

(65) Prior Publication Data
US 2021/0242465 A1    Aug. 5, 2021

Related U.S. Application Data

(63) Continuation of application No. PCT/JP2019/040102, filed on Oct. 10, 2019.

(30) Foreign Application Priority Data

Oct. 15, 2018 (JP) ................. 2018-194509

(51) Int. Cl.
*H01M 4/62* (2006.01)
*H01M 4/134* (2010.01)
(Continued)

(52) U.S. Cl.
CPC ........... *H01M 4/622* (2013.01); *H01M 4/134* (2013.01); *H01M 4/1395* (2013.01); *H01M 10/0562* (2013.01); *H01M 2004/027* (2013.01)

(58) Field of Classification Search
CPC .... H01M 4/622; H01M 4/134; H01M 4/1395; H01M 10/0562; H01M 2004/027;
(Continued)

(56) References Cited

U.S. PATENT DOCUMENTS 10,854,920 B2 * 12/2020 Makino ................. H01M 4/622
2009/0311600 A1 12/2009 Minami et al.
(Continued)

FOREIGN PATENT DOCUMENTS

EP         3579312       12/2019
EP         3859862       8/2021
(Continued)

OTHER PUBLICATIONS

Machine English translation of JP H117942 (Year: 1999).*
(Continued)

*Primary Examiner* — Michael L Dignan
(74) *Attorney, Agent, or Firm* — JCIPRNET

(57) ABSTRACT

Provided are an electrode composition, an electrode sheet for an all-solid state secondary battery, an all-solid state secondary battery, and respective methods of manufacturing the electrode composition, the electrode sheet for an all-solid state secondary battery, and the all-solid state secondary battery. The electrode composition includes: an inorganic solid electrolyte; an active material; and a distributing component that binds to the inorganic solid electrolyte and the active material, in which one kind of the distributing component is a binder, an adsorption rate A of the binder to the active material and an adsorption rate B of the binder to the inorganic solid electrolyte satisfy the following Expressions I) and II), and a distribution rate of the distributing component to the active material in an electrode active material layer formed of the electrode composition exceeds 50%.

(Continued)

Adsorption Rate $A \geq 20\%$      Expression I)

Adsorption Rate $A$ > Adsorption Rate $B$      Expression II)

12 Claims, 1 Drawing Sheet

(51) Int. Cl.
  *H01M 4/1395* (2010.01)
  *H01M 10/0562* (2010.01)
  *H01M 4/02* (2006.01)

(58) Field of Classification Search
  CPC ........ H01M 4/386; H01M 4/387; H01M 4/62; H01M 4/139; H01M 10/052; H01M 2004/021; H01M 2300/0068; Y02E 60/10
  See application file for complete search history.

(56) References Cited

U.S. PATENT DOCUMENTS

| | | | | |
|---|---|---|---|---|
| 2015/0349310 A1* | 12/2015 | Viner | ................... | C08G 75/00 |
| | | | | 429/126 |
| 2016/0204468 A1* | 7/2016 | Makino | .............. | C08G 18/6692 |
| | | | | 429/310 |
| 2018/0212227 A1* | 7/2018 | Otaki | ................. | H01M 10/052 |
| 2018/0254519 A1* | 9/2018 | Maeda | ................. | H01M 4/133 |
| 2019/0348709 A1 | 11/2019 | Makino et al. | | |
| 2019/0367657 A1 | 12/2019 | Mizuta et al. | | |
| 2019/0372160 A1 | 12/2019 | Makino et al. | | |

FOREIGN PATENT DOCUMENTS

| | | | | |
|---|---|---|---|---|
| JP | H117942 | 1/1999 | | |
| JP | 2009081106 | 4/2009 | | |
| JP | 2009301862 | 12/2009 | | |
| JP | 2010080297 | 4/2010 | | |
| JP | 2011204626 | 10/2011 | | |
| JP | 2014-043487 | * 3/2014 | .............. | C08F 12/22 |
| JP | 2015-220099 | * 12/2015 | ........ | H01M 10/0585 |
| JP | 2016139511 | 8/2016 | | |
| JP | 2016149238 | 8/2016 | | |
| WO | 2016136090 | 9/2016 | | |
| WO | 2017018456 | 2/2017 | | |
| WO | 2018143383 | 8/2018 | | |
| WO | 2018147051 | 8/2018 | | |
| WO | 2018151161 | 8/2018 | | |

OTHER PUBLICATIONS

Machine English translation of JP2014-043487 (Year: 2014).*
Machine English translation of JP2015-220099 (Year: 2015).*
"Office Action of Japan Counterpart Application" with English translation thereof, issued on Dec. 14, 2021, p. 1-p. 6.
"Search Report of Europe Counterpart Application", issued on Jan. 5, 2022, p. 1-p. 9.
"International Search Report (Form PCT/ISA/210) of PCT/JP2019/040102," mailed on Nov. 26, 2019, with English translation thereof, pp. 1-5.
"Written Opinion of the International Searching Authority (Form PCT/ISA/237) of PCT/JP2019/040102," mailed on Nov. 26, 2019, with English translation thereof, pp. 1-7.
"Office Action of Korea Counterpart Application" with English translation thereof, issued on Mar. 20, 2023, p. 1-p. 13.
"Office Action of Japan Counterpart Application" with English translation thereof, issued on May 31, 2022, p. 1-p. 7.
"Office Action of China Counterpart Application", issued on Dec. 1, 2023, with English translation thereof, p. 1-p. 14.

* cited by examiner

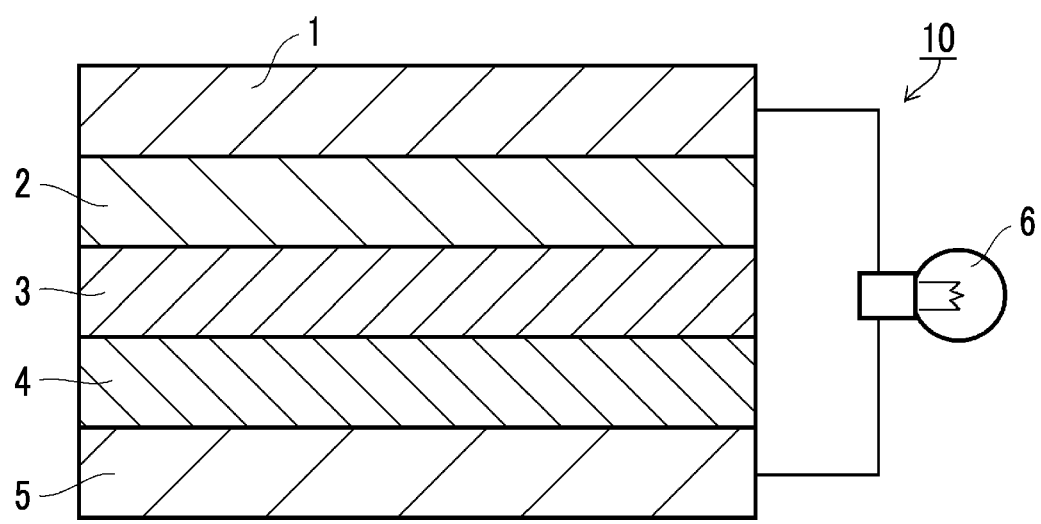

ELECTRODE COMPOSITION, ELECTRODE SHEET FOR ALL-SOLID STATE SECONDARY BATTERY, ALL-SOLID STATE SECONDARY BATTERY, AND RESPECTIVE METHODS OF MANUFACTURING ELECTRODE COMPOSITION, ELECTRODE SHEET FOR ALL-SOLID STATE SECONDARY BATTERY, AND ALL-SOLID STATE SECONDARY BATTERY

CROSS-REFERENCE TO RELATED APPLICATIONS

This application is a Continuation of PCT International Application No. PCT/JP2019/040102 filed on Oct. 10, 2019, which claims priority under 35 U.S.C. § 119 (a) to Japanese Patent Application No. 2018-194509 filed in Japan on Oct. 15, 2018. Each of the above applications is hereby expressly incorporated by reference, in its entirety, into the present application.

BACKGROUND OF THE INVENTION

1. Field of the Invention

The present invention relates to an electrode composition, an electrode sheet for an all-solid state secondary battery, an all-solid state secondary battery, and respective methods of manufacturing the electrode composition, the electrode sheet for an all-solid state secondary battery, and the all-solid state secondary battery.

2. Description of the Related Art

A lithium ion secondary battery is a storage battery including a negative electrode, a positive electrode, and an electrolyte sandwiched between the negative electrode and the positive electrode and enables charging and discharging by the reciprocal migration of lithium ions between both electrodes. In the related art, in lithium ion secondary batteries, an organic electrolytic solution has been used as the electrolyte. However, in organic electrolytic solutions, liquid leakage is likely to occur, there is a concern that a short-circuit and ignition may be caused in batteries due to overcharging or overdischarging, and there is a demand for additional improvement in safety and reliability.

Under these circumstances, all-solid state secondary batteries in which an inorganic solid electrolyte is used instead of the organic electrolytic solution are attracting attention. In an all-solid state secondary battery, a negative electrode, an electrolyte, and a positive electrode are all solid, and safety or reliability of batteries including an organic electrolytic solution can be significantly improved.

In the all-solid state secondary battery, as a material for forming a constituent layer such as a negative electrode active material layer, a solid electrolyte layer, or a positive electrode active material layer, a material including an inorganic solid electrolyte, an active material, and a polymer is disclosed.

For example, JP2016-139511A describes a solid electrolyte composition including: an inorganic solid electrolyte having ion conductivity of a metal belonging to Group 1 or Group 2 in the periodic table; polymer particles (binder); and a dispersion medium that includes a solvent in which the polymer particles are soluble and a solvent in which the polymer particles are insoluble.

SUMMARY OF THE INVENTION

A binder exhibits an effect of improving binding properties between solid particles or the like in an electrode active material layer of an all-solid state secondary battery. On the other hand, the binder coats the inorganic solid electrolyte, interrupts ion conduction in the electrode active material layer, and reduces the discharge capacity of the all-solid state secondary battery, which may cause an increase in resistance.

An object of the present invention is to provide an electrode composition. By using this electrode composition as a material for forming an electrode active material layer, an all-solid state secondary battery having a high discharge capacity and a low resistance can be realized. In addition, another object of the present invention is to provide an electrode sheet for an all-solid state secondary battery and an all-solid state secondary battery that include the electrode active material layer formed of the electrode composition. In addition, still another object of the present invention is to provide respective methods of manufacturing the electrode composition, the electrode sheet for an all-solid state secondary battery, and the all-solid state secondary battery.

The present inventors repeatedly conducted a thorough investigation and found that, in a case where, in an electrode composition prepared using a combination of an inorganic solid electrolyte, an active material, and a binder, an adsorption rate to the active material in the binder is higher than an adsorption rate to the inorganic solid electrolyte in the binder and is a specific value or higher and a distribution rate of the binder to the active material in an electrode active material layer formed of this electrode composition exceeds a specific value, an all-solid state secondary battery including this electrode active material layer has a high discharge capacity and a low resistance. The present invention has been completed based on the above findings as a result of repeated investigation.

That is, the above-described objects have been achieved by the following means.

<1> An electrode composition comprising:
an inorganic solid electrolyte;
an active material; and
a distributing component that binds to the inorganic solid electrolyte and the active material,
in which one kind of the distributing component is a binder,
an adsorption rate A of the binder to the active material and an adsorption rate B of the binder to the inorganic solid electrolyte satisfy the following Expressions I) and II), and
a distribution rate of the distributing component to the active material in an electrode active material layer formed of the electrode composition exceeds 50%, Adsorption Rate $A \geq 20\%$, and  Expression I)

Adsorption Rate $A >$ Adsorption Rate $B$.  Expression II)

<2> The electrode composition according to <1>,
in which the adsorption rate B is 10% or lower.
<3> The electrode composition according to <1> or <2>,
in which the binder is a particle binder.
<4> The electrode composition according to any one of <1> to <3>,
in which a polymer forming the binder is an acrylic polymer or polyurethane.

<5> The electrode composition according to any one of <1> to <4>,
  in which a polymer forming the binder includes a repeating unit having at least one of a carboxy group, a sulfanyl group, a hydroxy group, an amino group, an isocyanate group, or a cyano group.
<6> The electrode composition according to any one of <1> to <5>,
  in which the active material is a negative electrode active material having a silicon atom or a tin atom.
<7> The electrode composition according to <6>,
  in which the negative electrode active material is a negative electrode active material having a silicon atom.
<8> The electrode composition according to any one of <1> to <7>,
  in which a content of the binder is 2 mass % or lower with respect to all solid components in the electrode composition.
<9> The electrode composition according to any one of <1> to <8>,
  in which a modulus of elasticity of a polymer forming the binder that is measured according to JIS K 7161 (2014) is 10 to 500 MPa.
<10> The electrode composition according to any one of <1> to <9>,
  in which a tensile strain at break of a polymer forming the binder that is measured according to JIS K 7161 (2014) is 50% to 700%.
<11> An electrode sheet for an all-solid state secondary battery, the electrode sheet comprising:
  an electrode active material layer including an inorganic solid electrolyte, an active material, and a distributing component that binds to the inorganic solid electrolyte and the active material,
  in which one kind of the distributing component is a binder, and
  a distribution rate of the distributing component to the active material in the electrode active material layer exceeds 50%.
<12> An all-solid state secondary battery comprising, in the following order:
  a positive electrode active material layer;
  a solid electrolyte layer; and
  a negative electrode active material layer in this order,
  in which at least one of the positive electrode active material layer or the negative electrode active material layer is formed of the electrode composition according to any one of <1> to <10>.
<13> A method of manufacturing the electrode composition according to any one of <1> to <10>, the method comprising:
  a step of mixing an active material and a binder with each other to obtain a mixture; and
  a step of mixing the mixture and an inorganic solid electrolyte with each other.
<14> A method of manufacturing an electrode sheet for an all-solid state secondary battery, the method comprising:
  applying the electrode composition obtained using the manufacturing method according to <13>.
<15> A method of manufacturing an all-solid state secondary battery, the method comprising:
  manufacturing an all-solid state secondary battery using the electrode sheet for an all-solid state secondary battery obtained using the manufacturing method according to <14>.

By using the electrode composition according to the present invention as a material for forming an electrode active material layer, an all-solid state secondary battery having a high discharge capacity and a low resistance can be realized. In addition, the present invention can provide an electrode sheet for an all-solid state secondary battery and an all-solid state secondary battery that include the electrode active material layer formed of the electrode composition. Further, the present invention can provide respective methods of manufacturing the electrode composition, the electrode sheet for an all-solid state secondary battery formed of the electrode composition, and the all-solid state secondary battery.

BRIEF DESCRIPTION OF THE DRAWINGS

FIG. 1 is a vertical cross-sectional view schematically showing an all-solid state secondary battery according to a preferred embodiment of the present invention.

DESCRIPTION OF THE PREFERRED EMBODIMENTS

In the present specification, numerical ranges represented by "to" include numerical values before and after "to" as lower limit values and upper limit values.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where desired effects are exhibited.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect not having a substituent but also an aspect having a substituent. The same shall be applied to a compound which is not specified in the present specification regarding whether to be substituted or unsubstituted. Preferable examples of the substituent include a substituent Z described below.

In the present specification, in a case where a plurality of substituents or the like represented by a specific reference numeral are present or a plurality of substituents or the like are simultaneously or alternatively defined, the respective substituents or the like may be the same as or different from each other. In addition, unless specified otherwise, in a case where a plurality of substituents or the like are adjacent to each other, the substituents may be linked or fused to each other to form a ring.

[Electrode Composition]

An electrode composition according to an embodiment of the present invention comprises: an inorganic solid electrolyte; an active material; and a distributing component that binds to the inorganic solid electrolyte and the active material at a predetermined ratio, in which one kind of the distributing component is a binder. "Binding" described above includes not only physical binding but also electronic binding (electrons are transferred). Even in a case where an adsorption rate B described below is 0%, as long as the binder is distributed to the inorganic solid electrolyte, it is understood that the binder binds to the inorganic solid electrolyte.

In the electrode composition according to the embodiment of the present invention, an adsorption rate A of the binder to the active material and an adsorption rate B of the binder to the inorganic solid electrolyte satisfy the following Expressions I) and II), and a distribution rate of the distributing component to the active material in an electrode active material layer formed of the electrode composition exceeds 50%.

Adsorption Rate $A \geq 20\%$          Expression I)

Adsorption Rate $A >$ Adsorption Rate $B$          Expression II)

An all-solid state secondary battery that includes the electrode active material layer formed of the electrode composition according to the embodiment of the present invention has a high discharge capacity and a low resistance. The reason is not yet clear but is presumed to be that, in a case where the adsorption rate of the binder satisfies Expressions I) and II) and the distribution rate of the distributing component exceeds 50%, that is, in a case where the proportion of the distributing component binding to the active material is higher than that of the distributing component to the inorganic solid electrolyte, binding properties between particles of the active material can be improved, an ion conduction path between particles of the inorganic solid electrolyte can be secured, and the ion conductivity in the electrode active material layer can be improved.

It is preferable that the electrode composition according to the embodiment of the present invention includes a dispersion medium. In this case, an aspect where the inorganic solid electrolyte, the active material, the distributing component, and the dispersion medium are mixed is not particularly limited. It is preferable that the electrode composition according to the embodiment of the present invention is a slurry in which the inorganic solid electrolyte, the active material, and the distributing component are dispersed in the dispersion medium.

The electrode composition according to the embodiment of the present invention can be preferably used as a material for forming an active material layer of an electrode sheet for an all-solid state secondary battery or an all-solid state secondary battery.

The moisture content (also referred to as "water content") in the electrode composition according to the embodiment of the present invention is not particularly limited and is preferably 500 ppm or lower, more preferably 200 ppm or lower, still more preferably 100 ppm or lower, and still more preferably 50 ppm or lower by mass. In a case where the moisture content of the electrode composition is low, deterioration of the sulfide-based inorganic solid electrolyte can be suppressed. The moisture content refers to the amount of water (the mass ratio thereof to the electrode composition) in the electrode composition and specifically is a value measured by Karl Fischer titration after filtering the solid electrolyte composition through a membrane filter having a pore size of 0.02 μm.

Hereinafter, the components that are included in the electrode composition according to the embodiment of the present invention and components that may be included therein will be described.

<Inorganic Solid Electrolyte>

The electrode composition according to the embodiment of the present invention includes an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from organic solid electrolytes (polymer electrolytes such as polyethylene oxide (PEO) and organic electrolyte salts such as lithium bis(trifluoromethanesulfonyl)imide (LiTFSI)) since the inorganic solid electrolyte does not include any organic matter as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers (LiPF$_6$, LiBF$_4$, lithium bis(fluorosulfonyl)imide (LiFSI), LiCl, and the like). The inorganic solid electrolyte is not particularly limited as long as it has ion conductivity of a metal belonging to Group 1 or Group 2 in the periodic table and generally does not have electron conductivity. In a case where an all-solid state secondary battery according to the embodiment of the present invention is a lithium ion battery, the inorganic solid electrolyte preferably has ion conductivity of lithium ions.

The inorganic solid electrolyte can be appropriately selected from solid electrolyte materials that are typically used for an all-solid state secondary battery. Representative examples of the inorganic solid electrolyte include (i) a sulfide-based inorganic solid electrolyte and (ii) an oxide-based inorganic solid electrolyte. In the present invention, from the viewpoint that a more favorable interface can be formed between the active material and the inorganic solid electrolyte, a sulfide-based inorganic solid electrolyte is preferably used.

(i) Sulfide-Based Inorganic Solid Electrolyte

The sulfide-based inorganic solid electrolyte is preferably a compound that contains a sulfur atom, has ion conductivity of a metal belonging to Group 1 or Group 2 in the periodic table, and has electron-insulating properties. The sulfide-based inorganic solid electrolyte is preferably an inorganic solid electrolyte that contains at least Li, S, and P as elements and has lithium ion conductivity. The sulfide-based inorganic solid electrolyte may include elements other than Li, S, and P depending on the purposes or cases.

Examples of the sulfide-based inorganic solid electrolyte include a lithium ion-conductive inorganic solid electrolyte satisfying a composition represented by Formula (A).

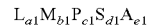$L_{a1}M_{b1}P_{c1}S_{d1}A_{e1}$          Formula (A)

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F. a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios among the respective elements can be controlled by adjusting the amounts of raw material compounds blended to manufacture the sulfide-based inorganic solid electrolyte as described below.

The sulfide-based inorganic solid electrolyte may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M described above (for example, $SiS_2$, SnS, and $GeS_2$).

The ratio between $Li_2S$ and $P_2S_5$ in each of Li—P—S-based glass and Li—P—S-based glass ceramic is preferably 60:40 to 90:10 and more preferably 68:32 to 78:22 in terms of the molar ratio between $Li_2S:P_2S_5$. In a case where the ratio between $Li_2S$ and $P_2S_5$ is set in the above-described range, it is possible to increase the lithium ion conductivity. Specifically, the lithium ion conductivity can be preferably set to $1 \times 10^{-4}$ S/cm or more and more preferably set to $1 \times 10^{-3}$ S/cm or more. The upper limit is not particularly limited but is realistically $1 \times 10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$-$A_{12}S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Mixing ratios of the respective raw materials do not matter. Examples of a method for synthesizing the sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing steps.

(ii) Oxide-Based Inorganic Solid Electrolyte

The oxide-based inorganic solid electrolyte is preferably a compound that contains an oxygen atom, has ion conductivity of a metal belonging to Group 1 or Group 2 in the periodic table, and has electron-insulating properties.

The ion conductivity of the oxide-based inorganic solid electrolyte is preferably $1 \times 10^{-6}$ S/cm or more, more preferably $5 \times 10^{-6}$ S/cm or more, and particularly preferably $1 \times 10^{-5}$ S/cm or more. The upper limit is not particularly limited but is realistically $1 \times 10^{-1}$ S/cm or less.

Specific examples of the compound include: $Li_{xa}La_{ya}TiO_3$ (xa satisfies $0.3 \leq xa \leq 0.7$ and ya satisfies $0.3 \leq ya \leq 0.7$) (LLT); $Li_{xb}La_{yb}Zr_{zb}M^{bb}_{mb}O_b$ ($M^{bb}$ represents one or more elements selected from Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ represents one or more elements selected from C, S, Al, Si, Ga, Ge, In, or Sn, xc satisfies $0 < xc \leq 5$, yc satisfies $0 < yc \leq 1$, zc satisfies $0 < zc \leq 1$, and nc satisfies $0 < nc \leq 6$); $Li_{xd}(Al,Ga)_{yd}(Ti,Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$); $Li_{(3-2xe)}M^{ee}_{xe}D^{ee}O$ (xe represents a number of 0 to 0.1, $M^{ee}$ represents a divalent metal atom, and $D^{ee}$ represents a halogen atom or a combination of two or more halogen atoms); $Li_{xf}Si_{yf}O_{zf}$ (xf satisfies $1 \leq xf \leq 5$, yf satisfies $0 < yf \leq 3$, and zf satisfies $1 \leq zf \leq 10$); $Li_{xg}S_{yg}O_{zg}$ (xg satisfies $1 \leq xg \leq 3$, yg satisfies $0 < yg \leq 2$, and zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies $w < 1$); $Li_{3.5}Zn_{0.25}GeO_4$ having a lithium super ionic conductor (LISICON)-type crystal structure; $La_{0.55}Li_{0.35}TiO_3$ having a perovskite-type crystal structure; $LiTi_2P_3O_{12}$ having a natrium super ionic conductor (NASICON)-type crystal structure; $Li_{1+xh+yh}(Al,Ga)_{xh}(Ti,Ge)_{2-xh}Si_{yh}P_{3-yh}O_{12}$ (xh satisfies $0 \leq xh \leq 1$, and yh satisfies $0 \leq yh \leq 1$); and $Li_7La_3Zr_2O_{12}$ (LLZ) having a garnet-type crystal structure.

In addition, phosphorus compounds containing Li, P, and O are also desirable. Examples of the phosphorus compound include: lithium phosphate ($Li_3PO_4$); LiPON in which some of oxygen atoms in lithium phosphate are substituted with nitrogen atoms; and $LiPOD^1$ ($D^1$ preferably represents one or more elements selected from Ti, V, Cr, Mn, Fe, Co, Ni, Cu, Zr, Nb, Mo, Ru, Ag, Ta, W, Pt, or Au).

Further, for example, $LiA^1ON$ ($A^1$ represents one or more elements selected from Si, B, Ge, Al, C, or Ga) can be preferably used.

The inorganic solid electrolyte is preferably in the form of particles. In this case, the average particle size (volume average particle size) of the inorganic solid electrolyte is not particularly limited, but is preferably 0.01 μm or more and more preferably 0.1 μm or more. The upper limit is preferably 100 μm or less and more preferably 50 μm or less. "Volume average particle size" refers to a volume median size. The median size corresponds to a cumulative value of 50% in a case where a particle size distribution is represented by a cumulative distribution.

The average particle size is measured in the following order. The inorganic solid electrolyte particles are diluted using water (heptane in a case where the inorganic solid electrolyte is unstable in water) in a 20 mL sample bottle to prepare 1 mass % of a dispersion liquid. The diluted dispersion sample is irradiated with 1 kHz ultrasonic waves for 10 minutes and is then immediately used for testing. The volume average particle size is obtained by acquiring data 50 times using this dispersion liquid sample, a laser diffraction/scattering particle size distribution analyzer LA-920 (trade name, manufactured by Horiba Ltd.), and a quartz cell for measurement at a temperature of 25° C. Other detailed conditions and the like can be found in JIS Z8828: 2013 "Particle Size Analysis-Dynamic Light Scattering" as necessary. For each level, five samples are prepared and the average value thereof is adopted.

As the inorganic solid electrolyte, one kind may be used alone, or two or more kinds may be used in combination.

The total mass (mg) of the active material and the inorganic solid electrolyte per unit area ($cm^2$) of the electrode active material layer (weight per unit area) is not particularly limited. The total mass (mg) can be appropriately determined depending on the designed battery capacity and may be, for example, 1 to 100 $mg/cm^2$.

The content of the inorganic solid electrolyte in the electrode composition is not particularly limited. From the viewpoints of dispersibility, a reduction in interface resistance, and binding properties, the total content of the inorganic solid electrolyte and the active material described below is preferably 50 mass % or higher, more preferably 70 mass % or higher, and still more preferably 90 mass % or higher with respect to 100 mass % of the solid content. From the same viewpoint, the upper limit is preferably 99.9 mass % or lower, more preferably 99.5 mass % or lower, still more preferably 99 mass % or lower, and still more preferably 95 mass % or lower.

In the present invention, the solid content (solid component) refers to components that does not disappear by volatilization and evaporation in a case where the electrode composition is dried at 150° C. for 6 hours in a nitrogen atmosphere at a pressure of 1 mmHg. Typically, the solid content refers to components other than a dispersion medium described below.

<Active Material>

The electrode composition according to the embodiment of the present invention includes an active material capable of intercalating and deintercalating ions of a metal belonging to Group 1 or Group 2 in the periodic table. Although described below, examples of the active material include a positive electrode active material and a negative electrode active material. As the positive electrode active material, a metal oxide is preferable (more preferably a transition metal oxide). As the negative electrode active material, a metal oxide or a metal such as Sn, Si, Al, or In capable of forming an alloy with lithium is preferable.

(Positive Electrode Active Material)

The positive electrode active material is preferably capable of reversibly intercalating or deintercalating or capable of intercalating and deintercalating lithium ions. The material is not particularly limited as long as it has the above-described characteristics and may be transition metal oxides, elements capable of being complexed with Li such as sulfur, or the like.

Among these, as the positive electrode active material, transition metal oxides are preferably used, and transition metal oxides having a transition metal element $M^a$ (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0 to 30 mol % of the amount (100 mol %) of the transition metal element $M^a$. It is more preferable that the transition metal oxide is synthesized by mixing the above components such that a molar ratio $Li/M^a$ is 0.3 to 2.2.

Specific examples of the transition metal oxides include transition metal oxides having a layered rock salt structure (MA), transition metal oxides having a spinel-type structure (MB), lithium-containing transition metal phosphate compounds (MC), lithium-containing transition metal halogenated phosphate compounds (MD), and lithium-containing transition metal silicate compounds (ME).

Specific examples of the transition metal oxides having a layered rock salt structure (MA) include $LiCoO_2$ (lithium cobalt oxide [LCO]), $LiNi_2O_2$ (lithium nickel oxide) $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickel oxide).

Specific examples of the transition metal oxides having a spinel-type structure (MB) include $LiMn_2O_4$(LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphate compounds (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and monoclinic nasicon type vanadium phosphate salt such as $Li_3V_2(PO_4)_3$ (lithium vanadium phosphate).

Examples of the lithium-containing transition metal halogenated phosphate compounds (MD) include iron fluorophosphates such as $Li_2FePO_4F$, manganese fluorophosphates such as $Li_2MnPO_4F$, and cobalt fluorophosphates such as $Li_2CoPO_4F$. Examples of the lithium-containing transition metal silicate compounds (ME) include $Li_2FeSiO_4$, $Li_2MnSiO_4$, and $Li_2CoSiO_4$.

In the present invention, the transition metal oxides having a layered rock salt structure (MA) is preferable, and LCO or NMC is more preferable.

The shape of the positive electrode active material is not particularly limited, but is preferably a particle shape. The volume average particle size (sphere-equivalent average particle size) of the positive electrode active material is not particularly limited. For example, the volume average particle size can be set to 0.1 to 50 µm. In order to allow the positive electrode active material to have a predetermined particle size, an ordinary pulverizer or classifier may be used. Positive electrode active materials obtained using a calcination method may be used after being washed with water, an acidic aqueous solution, an alkaline aqueous solution, or an organic solvent. The volume average particle size (sphere-equivalent average particle size) of positive electrode active material particles can be measured using a laser diffraction/scattering particle size distribution analyzer LA-920 (trade name, manufactured by Horiba Ltd.).

As the positive electrode active material, one kind may be used alone, or two or more kinds may be used in combination.

(Negative Electrode Active Material)

The negative electrode active material is preferably capable of reversibly intercalating or deintercalating or capable of intercalating and deintercalating lithium ions. The material is not particularly limited as long as it has the above-described characteristics, and examples thereof include carbonaceous materials, metal oxides such as tin oxide, silicon oxide, metal composite oxides, a lithium single body, lithium alloys such as a lithium aluminum alloy, metals capable of forming alloys with lithium such as Sn, Si, Al, and In and the like. Among these, a carbonaceous material or a lithium composite oxide is preferably used from the viewpoint of reliability. In addition, the metal composite oxide is preferably capable of intercalating and deintercalating lithium. The materials are not particularly limited, but preferably include at least any one of titanium or lithium as components from the viewpoint of high current density charging-discharging characteristics.

The carbonaceous material which is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

The metal oxides and the metal composite oxides being applied as the negative electrode active material are particularly preferably amorphous oxides, and furthermore, chalcogenides which are reaction products between a metal element and an element belonging to Group 16 in the periodic table are also preferably used. "Amorphous" described herein represents an oxide having a broad scattering band with a peak in a range of 20° to 40° in terms of 2θ in case of being measured by an X-ray diffraction method using CuKα rays, and the oxide may have a crystalline diffraction line. The highest intensity in a crystalline diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystalline diffraction line.

In a compound group consisting of the amorphous oxides and the chalcogenides, amorphous oxides of metalloid elements and chalcogenides are more preferred, and elements belonging to Groups 13 (IIIB) to 15 (VB) of the periodic table, oxides consisting of one element or a combination of two or more elements of Al, Ga, Ge, Pb, Sb, and Bi, and chalcogenides are particularly preferable. Specific examples of preferred amorphous oxides and chalcogenides include $Ga_2O_3$, GeO, PbO, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, GeS, PbS, $PbS_2$, $Sb_2S_3$, $Sb_2S_5$, and $SnSiS_3$.

The negative electrode active material preferably contains a titanium atom. More specifically, $Li_4Ti_5O_{12}$ (lithium titanium oxide [LTO]) is preferred since the volume fluctuation during the intercalation and deintercalation of lithium ions is small, and thus the high-speed charging-discharging characteristics are excellent, and the deterioration of electrodes is suppressed. Therefore, it becomes possible to improve the service lives of lithium ion secondary batteries.

In the present invention, as the negative electrode active material, a negative electrode active material having a silicon atom or a tin atom that has large expansion and contraction during charging and discharging and is capable of forming an alloy with lithium can be used, it is preferable that a negative electrode active material having a silicon atom that has a higher volume is used, and it is more preferable that a negative electrode active material in which the content of a silicon atom is 50 mol % or higher with respect to all the constituent atoms is used. Generally, a silicon negative electrode or a tin negative electrode is capable of intercalating a larger number of Li ions than a carbon negative electrode (graphite, acetylene black, or the like). That is, the amount of Li ions intercalated per unit weight increases. Therefore, it is possible to increase the discharge capacity. As a result, there is an advantage that the battery run time can be extended.

Specific preferable examples of the negative electrode active material having a silicon atom or a tin atom include: Sn, Si, or SiOx (0<x≤1); an alloy (for example, $LaSi_2$ or $VSi_2$) or an organized active material (for example, $LaSi_2$/Si) including titanium, vanadium, chromium, manganese, nickel, copper, or lanthanum; and SnO, $SnO_2$, $SnSiO_3$, SnS, $SnS_2$, or $SnSiS_3$. In addition, a composite oxide with lithium oxide, for example, $Li_2SnO_2$ can also be used.

SiO itself can be used as the negative electrode active material (metalloid oxide). In addition, Si is produced along with the operation of an all-solid state secondary battery, and thus SiO can be used as an active material (or a precursor thereof) capable of forming an alloy with lithium.

The shape of the negative electrode active material is not particularly limited, but is preferably a particle shape. The average particle size of the negative electrode active material is preferably 0.1 to 60 μm. In order to obtain a predetermined particle size, an ordinary pulverizer or classifier is used. For example, a mortar, a ball mill, a sand mill, a vibration ball mill, a satellite ball mill, a planetary ball mill, a swirling air flow jet mill, or a sieve is preferably used. During the pulverization, wet pulverization of causing water or an organic solvent such as methanol to coexist with the negative electrode active material can be optionally performed. In order to obtain a desired particle size, it is preferable to perform classification. A classification method is not particularly limited, and a method using, for example, a sieve or an air classifier can be optionally used. The classification can be used using a dry method or a wet method. The average particle size of negative electrode active material particles can be measured using the same method as the method of measuring the volume average particle size of the positive electrode active material.

As the negative electrode active material, one kind may be used alone, or two or more kinds may be used in combination.

(Coating of Active Material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specifically, titanium oxide spinel, tantalum-based oxides, niobium-based oxides, or lithium niobate-based compounds can be used, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur or phosphorous.

Furthermore, the particle surfaces of the positive electrode active material or the negative electrode active material may be treated with an actinic ray or an active gas (plasma or the like) before or after the coating of the surfaces.

<Distributing Component>

The distributing component used in the present invention may consist of a binder or may consist of a binder and a conductive auxiliary agent. "Distributing component" is a component that is selectively distributed to the active material or the inorganic solid electrolyte in the electrode active material layer according to the embodiment of the present invention, and is a component that is a calculation target for the distribution rate in a measurement method described in Examples. Examples of this component include a binder and a conductive auxiliary agent. In addition the above-described components, for example, a dispersant and a thickener can also be used.

As described above, the distribution rate of the distributing component to the active material in the electrode active material layer formed of the electrode composition according to the embodiment of the present invention exceeds 50%. The distribution rate of the distributing component to the active material is preferably 60% or higher, more preferably 65% or higher, and still more preferably higher than 65%. The upper limit of the distribution rate is preferably 95% or lower. In the present invention, the distribution rate is a value calculated using the method described in Examples.

In a case where the distribution rate is 50% or lower, the distributing component interferes the ion conduction between particles of the inorganic solid electrolyte, reduces the discharge capacity of an all-solid state secondary battery, and increases the resistance.

(Binder) As described above, the adsorption rate A of the binder used in the present invention to the active material and the adsorption rate B of the binder used in the present invention to the inorganic solid electrolyte satisfy the following Expressions I) and II). In the present invention, the Adsorption rates A and B are values calculated using the method described in Examples.

Adsorption Rate $A \geq 20\%$  Expression I)

Adsorption Rate $A >$ Adsorption Rate $B$  Expression II)

In a case where the binder satisfies Expression I), particles of the active material are sufficiently bound. In a case where the binder satisfies Expression II), the ion conduction between particles of the inorganic solid electrolyte can be improved.

The adsorption rate A is practically 90% or lower and may be 85% or lower.

In order to further increase the discharge capacity of an all-solid state secondary battery prepared using the electrode composition according to the embodiment of the present invention to further reduce the resistance, the adsorption rate B is preferably 10% or lower. The lower limit is preferably 1% and more preferably 2%.

The shape of the binder used in the present invention in the electrode composition is not particularly limited as long as they can bind particles of the active material to each other as a binder. The shape of the binder may be a particle shape, a flat shape, or an unstructured shape but is preferably a particle shape (particle binder).

The average particle size of the particle binder is not particularly limited, and is preferably 1000 nm or less, more preferably 500 nm or less, and still more preferably 300 nm or less. The lower limit value is preferably 1 nm or more, more preferably 5 nm or more, still more preferably 10 nm or more, and still more preferably 50 nm or more. By adjusting the size of the particle binder to be in the above-described range, the contact area between the particle binder and the active material or the like can be reduced within a range where the strong binding properties between particles of the active material do not deteriorate, and the resistance of the sheet and the all-solid state secondary battery can be reduced. That is, an increase in the interface resistance of the solid particles can be suppressed while improving the binding properties between particles of the active material.

Unless specified otherwise, the average particle size of the particle binder is limited to measurement conditions and a definition described below.

The particle binder is diluted using an appropriate solvent (for example, diisobutyl ketone) in a 20 mL sample bottle to prepare 1 mass % of a dispersion liquid. The diluted dispersion sample is irradiated with 1 kHz ultrasonic waves for 10 minutes and is then immediately used for testing. The volume average particle size is obtained by acquiring data 50 times using this dispersion liquid sample, a laser diffraction/scattering particle size distribution analyzer LA-920 (trade name, manufactured by Horiba Ltd.), and a quartz cell for measurement at a temperature of 25° C. The obtained volume average particle size (median size) is set as the average particle size. Other detailed conditions and the like can be found in JIS Z8828: 2013 "Particle Size Analysis-Dynamic Light Scattering" as necessary. For each level, five samples are prepared and measured, and the average value thereof is adopted.

In a case where an all-solid state secondary battery is used, the average particle size of the particle binder can be measured for example, by disassembling the all-solid state secondary battery to peel off an active material layer, measuring the average particle size of a material of the active material layer using the above-described method of measuring the average particle size of the particle binder, and excluding the measured value of the average particle size of the particles other than the particle binder obtained in advance from the average particle size of the material.

The kind of a polymer forming the binder used in the present invention is not particularly limited as long as it satisfies Expressions I) and II) and the distribution rate of the distributing component to the active material in the electrode active material layer exceeds 50%. Examples of the kind of the polymer include styrene-butadiene rubber, an acrylic polymer, polyurethane, polyester, polyether, polyurea, polystyrene, polypropylene, and polyvinyl alcohol. Among these, an acrylic polymer or polyurethane is preferable.

It is preferable that the polymer forming the binder used in the present invention includes a repeating unit having at least one of a carboxy group, a sulfanyl group, a hydroxy group, an amino group, an isocyanate group, or a cyano group. The content of the repeating unit with respect to all the components of the polymer is not particularly limited and, from the viewpoint of the discharge capacity, is preferably 1% to 90 mass %, more preferably 30% to 85 mass %, and still more preferably 50% to 80 mass %.

It is preferable that the binder used in the present invention is formed of binder particles formed to include a polymer represented by the following Formula 1. Hereinafter, the binder particles will be referred to as "binder particles (A)". In the present invention, the binder particles (A) can be obtained as particles (a dispersion liquid of the binder polymer) by solidifying the polymer obtained in the synthesis process of the polymer in a particle shape in the dispersion medium. Components in the binder particles (A) other than the polymer are not particularly limited. Examples of the other components include a synthetic raw material (an unreacted material or a decomposition product of a polymerization initiator catalyst) of the polymer, a dispersion medium, and water. The content rate of the polymer in the binder particles (A) is not particularly limited within a range where strong binding properties between particles of the active material do not deteriorate, and is appropriately determined depending on the performance required for an electrode sheet for an all-solid state secondary battery, an all-solid state secondary battery, or the like and the kind, content, and the like of solid particles that is further used in combination.

The glass transition temperature of the binder particles (A) is not particularly limited and is preferably 30° C. or lower. In a case where the glass transition temperature is 30° C. or lower, the dispersibility of the electrode composition is high, low resistance and strong binding properties between particles of the active material for use in a sheet or an electrode active material layer are exhibited, and excellent battery performance is exhibited. The lower limit of the glass transition temperature is not particularly limited, can be set to, for example, −200° C., and is preferably −150° C. or higher and more preferably −120° C. or higher.

The glass transition temperature (Tg) is measured using a dry sample of the binder particles (A) as a measurement target with a differential scanning calorimeter "X-DSC7000" (trade name, manufactured by SII NanoTechnology Inc.) under the following conditions. The measurement is performed twice using the same sample, and the result of the second measurement is adopted.

Atmosphere in measuring chamber: nitrogen gas (50 mL/min)
Temperature increase rate: 5° C./min
Measurement start temperature: −100° C.
Measurement end temperature: 200° C.
Sample pan: aluminum pan
Mass of measurement sample: 5 mg Calculation of Tg: Tg is calculated by rounding off the decimal point of an intermediate temperature between a declination start point and a declination end point in a DSC chart.

In a case where an all-solid state secondary battery is used, the glass transition temperature can be obtained, for example, by disassembling the all-solid state secondary battery to peel off an active material layer, putting the active material layer into water to disperse a material thereof, filtering the dispersion liquid, collecting the remaining solid, and measuring the glass transition temperature of the solid using the above-described measurement method.

It is preferable that the polymer in the binder particles (A) is amorphous. In the present invention, the polymer being "amorphous" typically refers to a resin that shows no endothermic peak caused by crystal melting during measurement using the above-described measurement method of the glass transition temperature.

The mass average molecular weight of the polymer forming the binder particles (A) is not particularly limited. For example, the mass average molecular weight is preferably 3,000 or higher, more preferably 5,000 or higher, and still more preferably 7,000 or higher. The upper limit is practically 1,000,000 or lower. In addition, an aspect where the polymer is crosslinked is also preferable.

The mass average molecular weight of the polymer represented by the following Formula 1 can be measured as the mass average molecular weight in terms of standard polystyrene using the same method as that of the number-average molecular weight of the macromonomer.

In a case where the crosslinking of the polymer progresses due to heating or voltage application, the molecular weight may be higher than the above-described molecular weight. At the start of using the all-solid state secondary battery, the mass average molecular weight of the polymer forming the binder particles (A) is preferably in the above-described range.

The moisture content of the polymer (binder particles (A)) represented by the following Formula 1 is preferably 100 ppm (by mass) or lower. In addition, the polymer (binder particles (A)) may be dried by crystallization, or the polymer dispersion liquid solution may be used as it is. As described above, the polymer (binder particles (A)) represented by the following Formula 1 has a high purity and can strongly bind particles of the active material to each other even without being purified.

The polymer in the binder particles (A) is the polymer represented by the following Formula 1.

In the polymer, linking groups, polymer chains, and adsorption groups $A^1$ represented by the respective reference numerals may be the same as or different from each other, respectively. In addition, in a case where a plurality of the respective chains ($-S-R^2-P^1$, $-S-R^3-P^2$, and $-S-R^4-(A^1)p$) linked to $R^1$ are present, these chains may be the same as or different from each other.

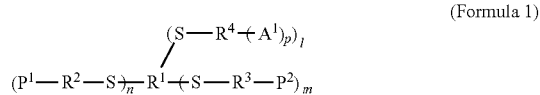

(Formula 1)

In Formula 1, $R^1$ represents a (l+m+n)-valent linking group. $A^1$ represents a hydrogen atom, an acidic group, a group having a basic nitrogen atom, a urea group, a urethane group, an alkoxysilyl group, an epoxy group, an isocyanate group, or a hydroxy group. p represents an integer of 1 to 10. $R^2$, $R^3$, and $R^4$ each independently represent a single bond or a linking group. $P^1$ represents a polymer chain including 50 mass % or higher of a component having a SP value of 19.5 or higher. $P^2$ represents a polymer chain including a component derived from a macromonomer having a number-average molecular weight of 500 or higher. l represents an integer of 0 to 5, m represents an integer of 1 to 8, and n represents an integer of 1 to 9. l+m+n represents an integer of 3 to 10.

$R^1$ represents a (l+m+n)-valent linking group, which is typically a linking group (organic linking group) consisting of an organic group having a skeleton to which a carbon atom is linked through a covalent bond and preferably a linking group having an oxygen atom. The molecular weight of the linking group is not particularly limited and, for example, is preferably 200 or higher and more preferably 300 or higher. The upper limit of the molecular weight is preferably 5,000 or lower, more preferably 4,000 or lower, and still more preferably 3,000 or lower. It is preferable that the linking group does not consist of only one tetravalent carbon atom.

The valence of the linking group is 3 to 10 and has the same definition and the same preferable range as those of (l+m+n) described below.

It is preferable that the linking group has a group represented by the following Formula 1a. It is preferable that the number of groups represented by Formula 1a in the linking group $R^1$ is the same as (l+m+n) that is the valence of $R^1$. In a case where the linking group has a plurality of groups represented by Formula 1a, the groups may be the same as or different from each other.

Formula 1a

In Formula 1a, n represents an integer of 0 to 10, preferably an integer of 1 to 6, and more preferably 1 or 2.

$R^f$ represents a hydrogen atom or a substituent and preferably a hydrogen atom. The substituent which may be used as $R^f$ is not particularly limited, and examples thereof include a halogen atom (for example, a fluorine atom, a chlorine atom, an iodine atom, or a bromine atom), an alkyl group (having preferably 1 to 12 carbon atoms, more preferably 1 to 6 carbon atoms, and still more preferably 1 to 3 carbon atoms), an alkoxy group (having preferably 1 to 12 carbon atoms, more preferably 1 to 6 carbon atoms, and still more preferably 1 to 3 carbon atoms), an acyl group (having preferably 2 to 12 carbon atoms, more preferably 2 to 6 carbon atoms, and still more preferably 2 or 3 carbon atoms), an aryl group (having preferably 6 to 22 carbon atoms and more preferably 6 to 10 carbon atoms), an alkenyl group (having preferably 2 to 12 carbon atoms and more preferably 2 to 5 carbon atoms), a hydroxy group, a nitro group, a cyano group, a sulfanyl group, an amino group, an amide group, and an acidic group (for example, a carboxy group, a phosphate group, or a sulfonate group). Each of the acidic groups may be a salt thereof. Examples of a counter ion include an alkali metal ion an alkali earth metal ion, an ammonium ion, and an alkylammonium ion.

The linking group $R^1$ is preferably a linking group represented by the following Formula 1A or Formula 1B, and more preferably a linking group represented by Formula 1B.

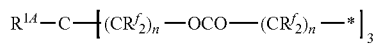

Formula 1A

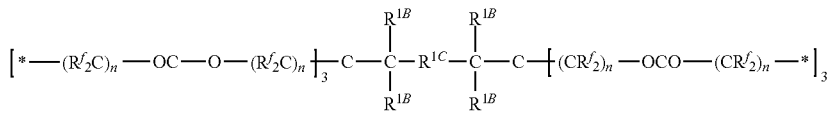

Formula 1B

In both the formulae, $R^f$ and n have the same definitions and the same preferable ranges as those of $R^f$ and n in Formula 1a. * represents a binding site to a sulfur atom in Formula 1.

In Formula 1A, $R^{1A}$ represents a hydrogen atom or a substituent. The substituent which can be used as $R^{1A}$ is not particularly limited, and examples thereof include the respective substituents which can be used as $R^f$ and the group represented by Formula 1a. In particular, an alkyl group or the group represented by Formula 1a is preferable. The number of carbon atoms in the alkyl group is preferably 1 to 12, more preferably 1 to 6, and still more preferably 1 to 3. The substituent which can be used as $R^{1A}$ may have one or two or more substituents, and the substituent which may be further included is not particularly limited, and examples thereof include the respective substituents which can be used as $R^f$. In particular, a hydroxy group is preferable. Examples of the substituent which may further have one or two or more substituents include a hydroxyalkyl group (the number of carbon atoms is as described above). Specifically, hydroxymethyl is preferable.

In Formula 1B, $R^{1C}$ represents a linking group. The linking group which can be used as $R^{1C}$ is not particularly limited, and examples thereof include respective linking groups which can be used as W in Formula 3. In particular, an alkylene group, an ether group (—O—), a sulfide group (—S—), a carbonyl group, or a linking group including a combination of two or more (preferably 2 to 5) thereof is preferable, and an ether group is more preferable. $R^{1B}$ represents a hydrogen atom or a substituent and preferably a hydrogen atom. The substituent which can be used as $R^{1B}$ is not particularly limited, and examples thereof include the respective substituents which can be used as $R^f$.

In Formula 1A and Formula 1B, groups represented by the same reference numeral may be the same as or different from each other.

In addition to the above-described linking groups, as the linking group $R^1$, for example, a linking group in Formula 1B in which one or two or more groups represented by Formula 1a are substituted with each of the substituents which can be used as $R^f$, in particular, hydroxymethyl is also a preferable aspect.

As the linking group $R^1$, a linking group represented by any one of the following Formulae 1C to 1H is also preferable. In each of the formulae, * represents a binding site to S in Formula 1.

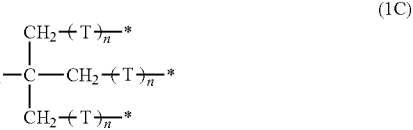

(1C)

-continued

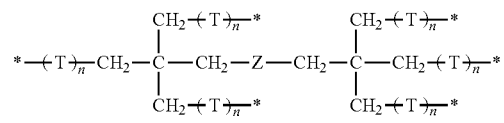

(1D)

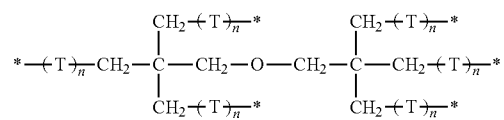

(1E)

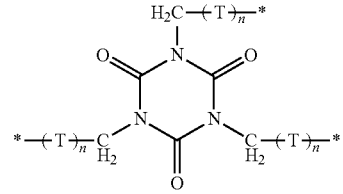

(1F)

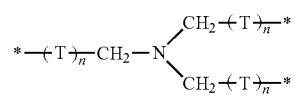

(1G)

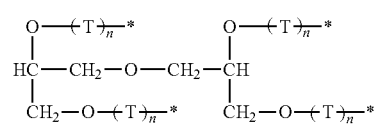

(1H)

In Formulae 1C to 1H, T represents a linking group and preferably a group represented by any one of the following Formulae T1 to T6 or a linking group including a combination of two or more (preferably two or three). In the group represented by any one of Formulae T1 to T6, a sulfur atom in Formula 1 may be bound to any binding site. However, in a case where T represents an oxyalkylene group (the group represented by any one of Formulae T2 to T5), it is preferable that a sulfur atom in Formula 1 is bound to a carbon atom (binding site) at a terminal.

A plurality of T's present in each of the formulae may be the same as or different from each other.

Z represents a linking group and is preferably a group represented by the following Z1 or Z2.

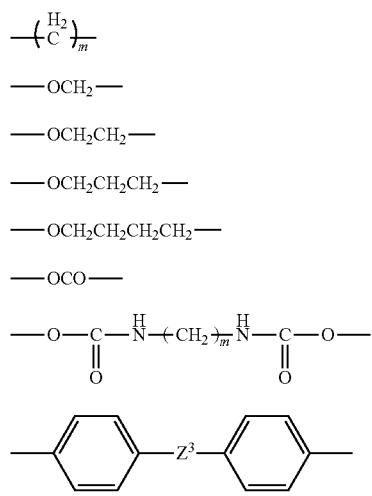

(T1)
(T2)
(T3)
(T4)
(T5)
(T6)
(Z1)
(Z2)

In each of Formulae 1C to 1H, n represents an integer, preferably an integer of 0 to 14, more preferably an integer of 0 to 5, and still more preferably an integer of 1 to 3.

In each of Formula T1 and Formula Z1, m represents an integer of 1 to 8, more preferably an integer of 1 to 5, and still more preferably an integer of 1 to 3.

$Z^3$ represents a linking group, preferably an alkylene group having 1 to 12 carbon atoms, and more preferably an alkylene group having 1 to 6 carbon atoms. In particular, a 2,2-propanediyl group is still more preferable.

Hereinafter, specific examples of the linking group $R^1$ will be shown, but the present invention is not limited thereto. In each of the specific examples, * represents a binding site to a sulfur atom in Formula 1.

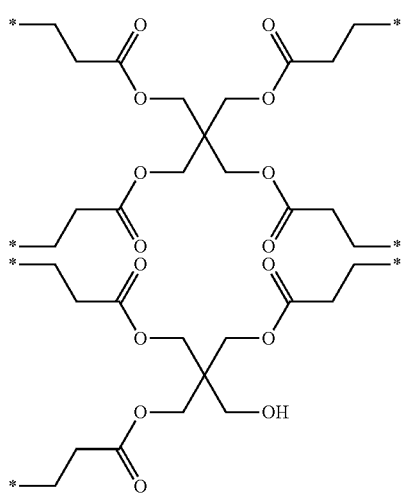

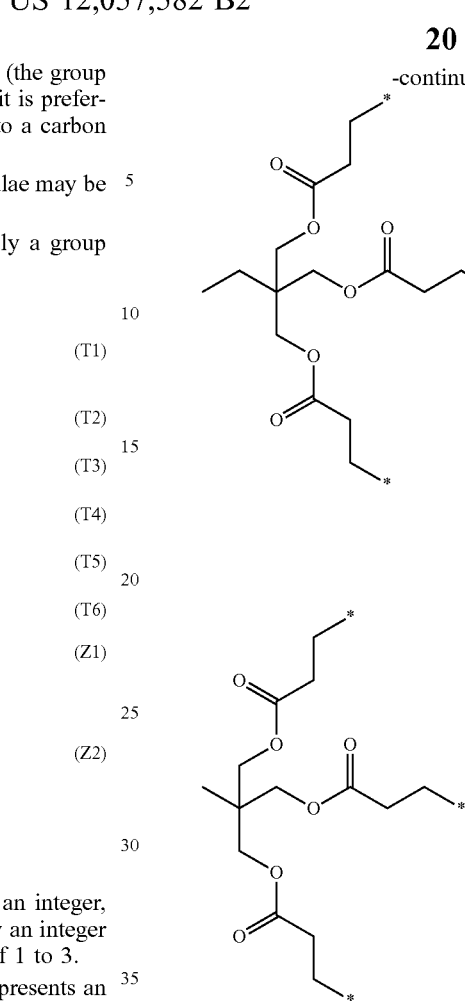

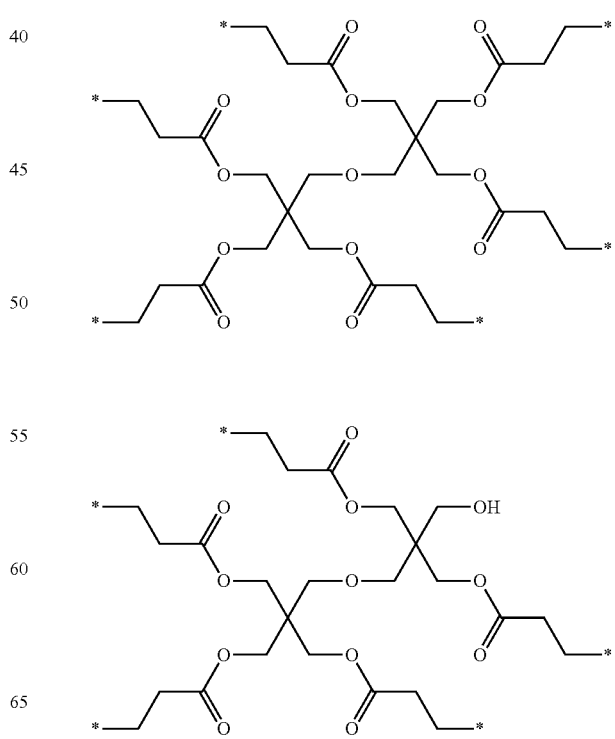

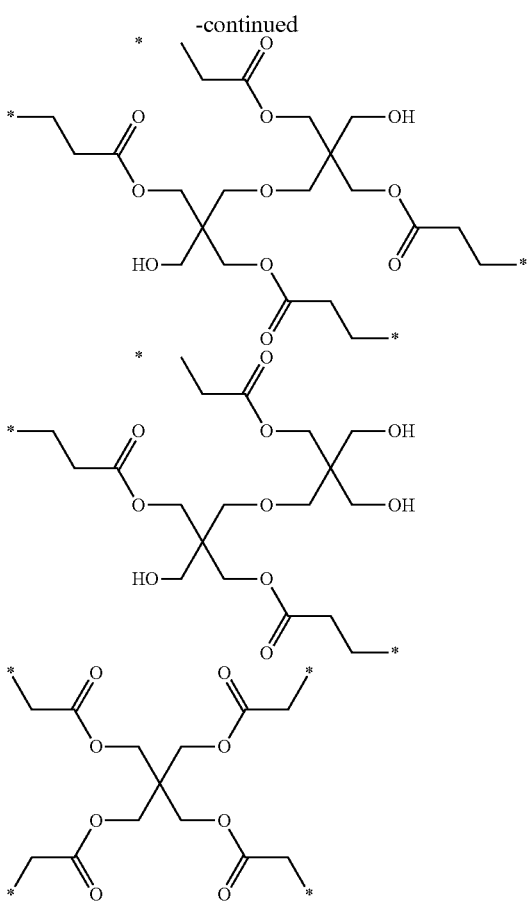

In Formula 1, $R^2$, $R^3$, and $R^4$ each independently represent a single bond or a linking group. $R^2$ and $R^3$ represent preferably a single bond, and $R^4$ represents preferably a linking group.

The linking group that can be used as each of $R^2$, $R^3$, and $R^4$ is not particularly limited. It is preferable that the linking group is not a linking group consisting of an oligomer or a polymer including two or more repeating units. Examples of the linking group include linking groups which can be used as W in Formula 3.

However, as —$R^4$-(A)p in the formula, a polymer chain can be used. For example, a polymer chain including a p number of Al's described below can also be used as at least one component consisting of a polymerizable compound forming the polymer chain $P^1$ described below and preferably as each of the components.

In Formula 1, the polymer chain $P^1$ represents a polymer chain including 50 mass % or higher of a component having a SP value of 19.5 or higher. By introducing the polymer chain $P^1$ into the polymer in the binder particles (A), a function of improving a cohesive force of the polymer required to form the binder particles (A) is exhibited. As long as the polymer chain $P^1$ includes 50 mass % or higher of the component having a SP value of 19.5 or higher, the polymer chain $P^1$ may include one or two or more components having a SP value of 19.5 or higher. It is preferable that the polymer chain $P^1$ does not include a component derived from the macromonomer. The macromonomer is not particularly limited, and examples thereof include the macromonomer forming the polymer chain $P^2$ described below.

The polymer chain $P^1$ is not particularly limited as long as it is a polymer chain that reacts with a sulfur atom or the linking group $R^2$ in Formula 1 to be introduced into the polymer represented by Formula 1, and a chain consisting of a typical polymer can be used. Examples of the polymer chain include a chain consisting of a polymer of a polymerizable compound including one or two or more (preferably 1 to 4) ethylenically unsaturated bonds (addition polymerizable unsaturated bonds) at a terminal or a side chain of the molecular structure. Examples of the ethylenically unsaturated bond include a vinyl group and a (meth)acryloyl group. Preferable examples of the polymerizable compound forming the polymer chain $P^1$ include a styrene compound, vinylnaphthalene, vinylcarbazole, (meth)acrylic acid, a (meth)acrylic acid ester compound, a (meth)acrylamide compound, a (meth)acrylonitrile compound, an allyl compound, a vinyl ether compound, a vinyl ester compound, and a dialkyl itaconate compound.

Among the components derived from the polymerizable compounds, it is preferable that, the polymer chain $P^1$ includes a component derived from a polymerizable compound selected from (meth)acrylic acid, a (meth)acrylic acid ester compound, a (meth)acrylamide compound, or a (meth)acrylonitrile compound, (the polymer chain $P^1$ is a polymer chain consisting of a (meth)acrylic polymer), and it is more preferable that the polymer chain $P^1$ includes a component derived from a polymerizable compound selected from (meth)acrylic acid, a (meth)acrylic acid ester compound, or a (meth)acrylonitrile compound.

The component having a SP value of 19.5 or higher in the polymer chain $P^1$ may be any component as long as it has a SP value of 19.5 or higher, and is preferably a component that is not derived from the macromonomer. As this component, a component derived from a polymerizable compound having a low molecular weight is preferable, a component derived from a polymerizable compound having a low molecular weight that has an ethylenically unsaturated bond is more preferable, and a component having a SP value of 19.5 or higher among the components derived from the polymerizable compounds is still more preferable. The molecular weight of the polymerizable compound having a low molecular weight is not uniquely determined and is, for example, preferably lower than 1000 and more preferably lower than 500.

In a case where the polymer chain $P^1$ includes a component having a SP value of 19.5 or higher, a dispersion liquid of the binder particles (A) in which particles of the polymer are dispersed in the synthesis process of the polymer in a hydrophobic solvent (for example, preferably the dispersion medium described below) can be prepared, and further binding properties between particles of the active material or battery characteristics is excellent. The SP value of the component is preferably 20.0 or higher and more preferably 21.0 or higher. On the other hand, the upper limit is not particularly limited and is appropriately set. For example, the upper limit is preferably 45.0 or lower and more preferably 30.0 or lower.

Examples of a method of setting the SP value of the component to be 19.5 or higher include a method of introducing a functional group having high polarity, for example, a method of introducing a substituent such as a hydroxy group.

In the present invention, a value calculated using the Okitsu method is used as the SP value of the component. The Okitsu method is specifically described in, for example, "Journal of the Adhesion Society of Japan", 1993, vol. 29, No. 6, pp. 249 to 259. As the SP value of a component in the present invention, a value calculated based on a structure of the component incorporated into the polymer is used.

In addition, in a case where the component has an acidic group, and this acidic group is neutralized to disperse the binder particles (A) in the electrode composition, the SP value of the component before neutralization is used.

In addition, the unit of the SP value is not shown but is $MPa^{1/2}$.

The compound for deriving the component having a SP value of 19.5 or higher is not particularly limited, and examples thereof include (meth)acrylic acid, a hydroxyalkyl (meth)acrylate, (meth)acrylic acid (polyoxyalkylene ester), N-mono or di(alkyl) (meth)acrylic acid amide, N-(hydroxyalkyl) (meth)acrylic acid amide, an α,β-unsaturated nitrile compound, and compounds used in Examples below.

Specific examples of the component having a SP value of 19.5 or higher include components described in Examples described below, tetrahydrofurfuryl (meth)acrylate, 2-acrylamido-2-methylpropanesulfonic acid, diacetone acrylamide, 2-(meth)acryloyloxyethyl acid phosphate, N-(meth)acryloyloxyethyl-N, and N-dimethylammonium-α-N-methylcarboxybetaine.

The polymer chain $P^1$ may include components other than the component having a SP value of 19.5 or higher, for example, a component having a SP value of lower than 19.5. As this component, a component derived from the macromonomer may be used, but a component derived from a polymerizable compound having a low molecular weight is preferable, a component derived from a polymerizable compound having a low molecular weight that has an ethylenically unsaturated bond is more preferable, and a component having a SP value of lower than 19.5 among the components derived from the polymerizable compounds is still more preferable. The molecular weight of the polymerizable compound having a low molecular weight is not uniquely determined and is, for example, preferably lower than 500 and more preferably lower than 300.

The SP value of the component having a SP value of lower than 19.5 only has to be lower than 19.5, and the lower limit thereof is appropriately set without any particular limitation. For example, the lower limit is preferably 15.0 or higher and more preferably 17.0 or higher.

The component having a SP value of lower than 19.5 is not particularly limited as long as it is a component derived from a polymerizable compound that is copolymerizable with the polymerizable compound as the component having a SP value of 19.5 or higher. For example, a component derived from a polymerizable compound having a low molecular weight that has an ethylenically unsaturated bond can be used, and specific examples thereof include components derived from acrylic acid, a (meth)acrylic acid ester compound, a cyclic olefin compound, a diene compound, a styrene compound, a vinyl ether compound, a carboxylic acid vinyl ester compound, an unsaturated carboxylic acid anhydride, and the like. Examples of the copolymerizable compound include components having a SP value of lower than 19.5 among components derived from "vinyl monomer" described in paragraphs "0031" to "0035" of JP2015-088486A and "acrylic monomer" described in paragraphs "0036" to "0042" of JP2015-088486A.

The polymerization degree of all the components in the polymer chain $P^1$ is not particularly limited and is preferably 10 to 10000 and more preferably 20 to 2000.

The content of the component having a SP value of 19.5 or higher in the polymer chain $P^1$ is 50 mass % or higher. In a case where the polymer chain $P^1$ includes 50 mass % or higher of the component, the content of the polymer represented by Formula 1 in the binder particles (A) is high, and binding properties between solid particles can be improved. From the viewpoint of binding properties between solid particles, the content is preferably 60 mass % or higher, more preferably 75 mass % or higher, and still more preferably 90 mass % or higher. The upper limit value of the content is not particularly limited and may be 100 mass % or may be lower than 100 mass %.

The content of the component having a SP value of lower than 19.5 in the polymer chain $P^1$ is 50 mass % or lower. It is preferable that the content of the component is set such that the total content of the components having a SP value of 19.5 or higher is 100 mass %.

In Formula 1, $P^2$ represents a polymer chain (polymer skeleton) including a component derived from a macromonomer having a number-average molecular weight of 500 or higher.

In the present invention, the polymer chain including a component derived from the macromonomer includes not only a chain consisting of a polymer to which a plurality of components derived from the macromonomer are bound but also a chain consisting of one component derived from the macromonomer. In a case where the polymer chain $P^2$ is introduced into the polymer in the binder particles (A), high-purity binder particles (A) having a predetermined average particle size can be synthesized in the synthesis process of the polymer, and a function of improving binding properties between solid particles and dispersibility of solid particles can be exhibited. $P^2$ is not particularly limited as long as it is a polymer chain that reacts with a sulfur atom or a linking group $R^3$ in Formula 1 to be introduced into the polymer represented by Formula 1, and a chain consisting of a typical polymer or a typical macromonomer can be used. Examples of the polymer chain include a chain consisting of a polymerizable compound (including at least the macromonomer) having an ethylenically unsaturated bond at a terminal or a side chain of the molecular structure and a polymer of the polymerizable compound. As the polymerizable compound forming the polymer chain $P^2$, the same compound as the polymerizable compound forming the polymer chain $P^1$ is preferable, and methacrylic acid or a (meth)acrylic acid ester compound is more preferable (the polymer chain $P^2$ is a polymer chain consisting of a (meth)acrylic acid ester compound or a (meth)acrylic polymer).

The number-average molecular weight of the macromonomer is preferably 500 or higher, and from the viewpoint of binding properties between particles of the active material and dispersibility of solid particles, is more preferably 1,000 or higher, still more preferably 2,000 or higher, and still more preferably 3,000 or higher. The upper limit is not particularly limited and is preferably 500,000 or lower, more preferably 100,000 or lower, and still more preferably 30,000 or lower.

—Measurement of Molecular Weight—

In the present invention, as a number-average molecular weight of the macromonomer, a number-average molecular weight in terms of standard polystyrene is measured by gel permeation chromatography (GPC). Regarding a measurement method, basically, a value measured using a method under the following condition 1 or condition 2 (preferred) is used. In this case, an appropriate eluent may be selected and used depending on the kind of the macromonomer.

(Condition 1)

Column: a column in which two TOSOH TSKgel Super AWM-H's are linked

Carrier: 10 mM LiBr/N-methylpyrrolidone

Measurement temperature: 40° C.

Carrier flow rate: 1.0 ml/min
Sample concentration: 0.1 mass %
Detector: refractive index (RI) detector
(Condition 2)
Column: a column in which TOSOH TSK gel Super HZM-H, TOSOH TSK gel Super HZ4000, and TOSOH TSK gel Super HZ2000 are linked to each other
Carrier: tetrahydrofuran
Measurement temperature: 40° C.
Carrier flow rate: 1.0 ml/min
Sample concentration: 0.1 mass %
Detector: refractive index (RI) detector The macromonomer is preferably a compound having an ethylenically unsaturated bond at a terminal or a side chain of the molecular structure, and examples thereof include a compound having a number-average molecular weight of 500 or higher among the respective compounds described as the polymerizable compound forming the polymer chain $P^1$. The number of ethylenically unsaturated bonds in one molecule of the macromonomer is as described above and is preferably one.

It is preferable that the macromonomer for deriving the component in the polymer chain $P^2$ is a monomer represented by the following Formula 3. That is, it is preferable that the component in the polymer chain $P^2$ is a component obtained by cleavage (polymerization) of an ethylenically unsaturated bond in the monomer represented by the following Formula 3.

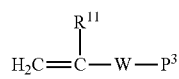

(Formula 3)

in Formula 3, $R^{11}$ represents a hydrogen atom or an alkyl group having 1 to 8 carbon atoms. The number of carbon atoms in the alkyl group is preferably 1 to 3 and more preferably 1. It is preferable that $R^{11}$ represents a hydrogen atom or methyl.

In Formula 3, W represents a single bond or a linking group and preferably a linking group.

The linking group that can be used as W is not particularly limited and is preferably an alkylene group having 1 to 30 carbon atoms, a cycloalkylene group having 3 to 12 carbon atoms, an arylene group having 6 to 24 carbon atoms, a heteroarylene group having 3 to 12 carbon atoms, an ether group (—O—), a sulfide group (—S—), a phosphinidene group (—PR—: R represents a hydrogen atom or an alkyl group having 1 to 6 carbon atoms), a silylene group (—SiR$^{S1}$R$^{S2}$—: R$^{S1}$ and R$^{S2}$ represent a hydrogen atom or an alkyl group having 1 to 6 carbon atoms), a carbonyl group, an imino group (—NR$^N$—: R$^N$ represents a hydrogen atom, an alkyl group having 1 to 6 carbon atoms, or an aryl group having 6 to 10 carbon atoms), or a linking group including a combination of two or more (preferably 2 to 10) thereof. In particular, an alkylene group having 1 to 30 carbon atoms, an arylene group having 6 to 24 carbon atoms, an ether group, a carbonyl group, a sulfide group, or a linking group including a combination of two or more (preferably 2 to 10) thereof is more preferable.

In Formula 3, $P^3$ represents a polymer chain, and a linking site to W is not particularly limited and may be a terminal or a side chain of the polymer chain. The polymer chain which can be used as $P^3$ is not particularly limited, and a polymer chain consisting of a typical polymer can be used. Examples of the polymer chain include a chain consisting of a (meth)acrylic polymer, polyether, polysiloxane, or polyester and a chain including a combination of two (preferably two or three) of the above-described chains. In particular, a chain including a (meth)acrylic polymer is preferable, and a chain consisting of a (meth)acrylic polymer is more preferable. In the chain including a combination, the combination of chains is not particularly limited and is appropriately determined.

The chain consisting of a (meth)acrylic polymer, polyether, polysiloxane, or polyester is not particularly limited as long as it is a chain consisting of a typical (meth)acrylic resin, a typical polyether resin, typical polysiloxane, or a typical polyester resin.

For example, as the (meth)acrylic polymer, a polymer including a component derived from a polymerizable compound selected from (meth)acrylic acid, a (meth)acrylic acid ester compound, a (meth)acrylamide compound, or a (meth)acrylonitrile compound is preferable, and a polymer including a component derived from a polymerizable compound selected from (meth)acrylic acid, a (meth)acrylic acid ester compound, or a (meth)acrylonitrile compound is more preferable. In particular, among the (meth)acrylic acid ester compounds, a polymer including a component derived from a long-chain alkyl ester of (meth)acrylic acid is preferable. For example, the number of carbon atoms in the long-chain alkyl group is preferably 4 or more, more preferably 4 to 24, and still more preferably 8 to 20. The (meth)acrylic polymer may include a component derived from the above-described polymerizable compound having an ethylenically unsaturated bond, for example, a styrene compound or a cyclic olefin compound.

Examples of the polyether include polyalkylene ether and polyarylene ether. The number of carbon atoms in the alkylene group of the polyalkylene ether is preferably 1 to 10, more preferably 2 to 6, and still more preferably 2 to 4. The number of carbon atoms in the arylene group of the polyarylene ether is preferably 6 to 22 and more preferably 6 to 10. The alkylene groups and the arylene groups in the polyether chain may be the same as or different from each other. The terminal in the polyether chain is a hydrogen atom or a substituent, and examples of the substituent include an alkyl group (preferably having 1 to 20 carbon atoms).

Examples of the polysiloxane include a chain including a repeating unit represented by —O—Si(R$^S_2$)—. In the repeating unit, R$^S$ represents a hydrogen atom or a substituent, the substituent is not particularly limited, and examples thereof include a hydroxy group, an alkyl group (having preferably 1 to 12 carbon atoms, more preferably 1 to 6 carbon atoms, and still more preferably 1 to 3 carbon atoms), an alkenyl group (having preferably 2 to 12 carbon atoms, more preferably 2 to 6 carbon atoms, and still more preferably 2 or 3 carbon atoms), an alkoxy group (having preferably 1 to 24 carbon atoms, more preferably 1 to 12 carbon atoms, still more preferably 1 to 6 carbon atoms, and still more preferably 1 to 3 carbon atoms), an aryl group (having preferably 6 to 22 carbon atoms, more preferably 6 to 14 carbon atoms, and still more preferably 6 to 10 carbon atoms), and an aryloxy group (having preferably 6 to 22 carbon atoms, more preferably 6 to 14 carbon atoms, and still more preferably 6 to 10 carbon atoms), and an aralkyl group (having preferably 7 to 23 carbon atoms, more preferably 7 to 15 carbon atoms, and still more preferably 7 to 11 carbon atoms). In particular, an alkyl group having 1 to 3 carbon atoms, an alkoxy group having 1 to 12 carbon atoms, or a phenyl group is more preferable, and an alkyl group having 1 to 3 carbon atoms is still more preferable. A group positioned at the terminal of the polysiloxane is not particularly limited, and examples thereof include an alkyl group (having preferably 1 to 20 carbon atoms, more preferably 1 to 6 carbon atoms, and still more preferably 1 to 3 carbon atoms), an alkoxy group (having preferably 1 to 20 carbon atoms, more preferably 1 to 6 carbon atoms, and still more preferably 1 to 3 carbon atoms), an aryl group (preferably having 6 to 26 carbon atoms and more preferably having 6 to 10 carbon atoms), and a heterocyclic group (preferably having at least one of an oxygen atom, a sulfur atom, or a nitrogen atom; a heterocyclic group having 2 to 20 carbon atoms preferably a 5-membered ring or a 6-membered ring). The polysiloxane may be linear or branched.

The polyester is not particularly limited as long as it consists of a polycondensate of a polycarboxylic acid and a polyhydric alcohol. As the polycarboxylic acid and the polyhydric alcohol, for example, a typically used polycarboxylic acid and a typically used polyhydric alcohol can be used, and examples thereof include an aliphatic or aromatic polycarboxylic acid and an aliphatic or aromatic polyhydric alcohol. The valence of the polycarboxylic acid and the polyhydric alcohol only has to be 2 or more and is typically 2 to 4.

As the macromonomer for deriving the component in the polymer chain $P^2$, a polymer chain selected from the group consisting of a (meth)acrylic polymer, polyether, polysiloxane, polyester, and a combination thereof or a monomer having an ethylenically unsaturated bond bound to the polymer chain is more preferable. The polymer chain in the macromonomer has the same definition and the same preferable range as those of the polymer chain which can be preferably used as the polymer chain $P^3$ in Formula 3. In addition, the ethylenically unsaturated bond has the same definition as the ethylenically unsaturated bond in the polymerizable compound forming the polymer chain $P^1$, and a (meth)acryloyl group is preferable. The polymer chain and the ethylenically unsaturated bond may be bound to each other directly (without a linking group) or through a linking group. In this case, examples of the linking group include the linking group which can be used as W in Formula 3.

The SP value of the macromonomer is not particularly limited and is, for example, preferably 21 or lower and more preferably 20 or lower. The lower limit value is practically 15 or more.

The polymerization degree of the polymer chain (corresponding to the polymer chain $P^3$ in Formula 3) in the macromonomer of the polymer chain $P^2$ is not particularly limited as long as the number-average molecular weight of the macromonomer is 500 or higher, and is preferably 5 to 5000 and more preferably 10 to 300.

In addition to the component derived from the macromonomer, the polymer chain $P^2$ may include another component. The other component is not particularly limited, and examples thereof include the respective components forming the polymer chain $P^1$ (other than the macromonomer).

The polymerization degree of all the components forming the polymer chain $P^2$ is not particularly limited and is preferably 1 to 200 and more preferably 1 to 100.

The content of the component derived from the macromonomer in the polymer chain $P^2$ is not particularly limited as long as it exceeds 0 mass %. In a case where the polymer chain $P^2$ includes the component derived from the macromonomer, the content of the polymer represented by Formula 1 in the binder particles (A) can be high, and binding properties between solid particles can be improved. From the viewpoint of binding properties between particles of the active material, the content of the component is preferably 50 mass % or higher, more preferably 75 mass % or higher, and still more preferably 90 mass % or higher. The upper limit value of the content is not particularly limited and may be 100 mass % or may be lower than 100 mass %. In a case where the upper limit value is set to be lower than 100 mass %, the upper limit value can be set to be, for example, 50 mass % or lower.

In the polymer chain $P^2$, the content of the other component other than the component derived from the macromonomer is 0 mass % or higher and is preferably set such that the total content of the other $P^2$ chain component and the component derived from the macromonomer is 100 mass %.

In Formula 1, $A^1$ represents a hydrogen atom, an acidic group, a group having a basic nitrogen atom, a urea group, a urethane group, an alkoxysilyl group, an epoxy group, an isocyanate group, or a hydroxy group. In particular, an acidic group, a group having a basic nitrogen atom, a urea group, or a urethane group is preferable.

The acidic group which can be used as $A^1$ is not particularly limited, and examples thereof include a carboxylate group (—COOH), a sulfonate group (sulfo group: —SO$_3$H), a phosphate group (phospho group: —OPO(OH)$_2$), a phosphonate group, and a phosphinate group.

Examples of the group having a basic nitrogen atom which can be used as $A^1$ include an amino group, a pyridyl group, an imino group, and an amidine.

Preferable examples of the urea group which can be used as $A^1$ include —NR$^{15}$CONR$^{16}$R$^{17}$ (here, R$^{15}$, R$^{16}$, and R$^{17}$ represent a hydrogen atom, an alkyl group having 1 to 20 carbon atoms, an aryl group having 6 or more carbon atoms, or an aralkyl group having 7 or more carbon atoms). As the urea group, —NR$^{15}$CONHR$^{17}$ (here, R$^{15}$ and R$^{17}$ represent a hydrogen atom, an alkyl group having 1 to 10 carbon atoms, an aryl group having 6 or more carbon atoms, or an aralkyl group having 7 or more carbon atoms) is more preferable, and —NHCONHR$^{17}$ (here, R$^{17}$ represents a hydrogen atom, an alkyl group having 1 to 10 carbon atoms, an aryl group having 6 or more carbon atoms, or an aralkyl group having 7 or more carbon atoms) is still more preferable.

Preferable examples of the urethane group which can be used as $A^1$ include a group including at least an imino group and a carbonyl group such as —NHCOR$^{18}$, —NR$^{19}$COOOR$^{20}$, —OCONHR$^{21}$, or —OCONR$^{22}$R$^{23}$ (here, R$^{18}$, R$^{19}$, R$^{20}$, R$^{21}$, R$^{22}$, and R$^{23}$ represent an alkyl group having 1 to 20 carbon atoms, an aryl group having 6 or more carbon atoms, or an aralkyl group having 7 or more carbon atoms). As the urethane group, —NHCOOR$^{18}$ or —OCONHR$^{21}$ (here, R$^{18}$ and R$^{21}$ represent an alkyl group having 1 to 20 carbon atoms, an aryl group having 6 or more carbon atoms, or an aralkyl group having 7 or more carbon atoms) is more preferable, and —NHCOOR$^{18}$ or —OCONHR$^{21}$ (here, R$^{18}$ and R$^{21}$ represent an alkyl group having 1 to 10 carbon atoms, an aryl group having 6 or more carbon atoms, an aralkyl group having 7 or more carbon atoms is still more preferable.

The alkoxysilyl group which can be used as $A^1$ is not particularly limited and is preferably an alkoxysilyl group having 1 to 6 carbon atoms, and examples thereof include methoxysilyl, ethoxysilyl, t-butoxysilyl, and cyclohexylsilyl.

$A^1$ interacts with the solid particles such that binding properties between solid particles (mainly the binding properties between particles of the active material) exhibited by the binder particles (A) can be further reinforced. The interaction is not particularly limited, and examples thereof include an interaction by a hydrogen bond, an interaction by an acid-base ionic bond, an interaction by a covalent bond, a π-π interaction by an aromatic ring, and a hydrophobic-hydrophobic interaction. The solid particles and the binder particles (A) adsorb to each other due to one or two or more among the above-described interactions depending on the kind of the group which can be used as $A^1$ and the kind of the above-described solid particles.

In a case where the group which can be used as $A^1$ interacts, the chemical structure of the group which can be used as $A^1$ may or may not change. For example, in the above-described π-π interaction or the like, typically, the group which can be used as Al maintains the structure thereof without a change. On the other hand, in the interaction by a covalent bond or the like, typically, the functional group is converted into an anion (the group which can be used as $A^1$ changes) by desorption of active hydrogen such as a carboxylate group and is bound to the solid particles.

An acidic group, a hydroxy group, or an alkoxysilyl group is suitably adsorbed to the positive electrode active material and the inorganic solid electrolyte. Among these, a carboxylate group is more preferable.

A group having a basic nitrogen atom is suitably adsorbed to a conductive auxiliary agent.

In Formula 1, p represents an integer of 1 to 10, preferably an integer of 1 to 5, more preferably an integer of 1 to 3, and still more preferably 1.

In Formula 1, l represents an integer of 0 to 5, preferably an integer of 0 to 4, more preferably an integer of 0 to 3, and still more preferably 0 to 2.

m represents an integer of 1 to 8, preferably an integer of 1 to 4, more preferably an integer of 1 to 3, and still more preferably 1 or 2.

n represents an integer of 1 to 9, preferably an integer of 2 to 5, and more preferably an integer of 3 to 5.

l+m+n represents an integer of 3 to 10, preferably an integer of 3 to 8, more preferably an integer of 3 to 6, and still more preferably an integer of 4 to 6.

The polymer chain in the polymer represented by Formula 1 may be any one of a homopolymer, a block copolymer, an alternating copolymer, or a random copolymer and may be a graft copolymer.

It is preferable that the polymer represented by Formula 1 is a reactant of a compound (polyvalent thiol compound) represented by the following Formula 2, a polymerizable compound forming the polymer chain $P^1$, and a polymerizable compound forming the polymer chain $P^2$.

As the binder particles (A), a commercially available product can be used. However, the binder particles can be prepared, for example, by using a surfactant, an emulsifier, or a dispersant, the polymerizable compound forming the polymer chain $P^1$, the polymerizable compound forming the polymer chain $P^2$, the polymerizable compound having $A^1$ and $R^4$, a copolymerizable compound, and the like and performing an addition reaction of the polymerizable compound having $A^1$ and $R^4$, the polymerizable compound forming the polymer chain $P^1$, the polymerizable compound forming the polymer chain $P^2$, and a polyvalent thiol compound such that the polymer chain $P^1$ and the polymer chain $P^2$ are introduced into the thiol compound. Optionally, a polymerization (radical polymerization) reaction can also be performed using the polymerizable compound forming the polymer chain $P^1$ and the polymerizable compound forming the polymer chain $P^2$ according to a typical polymerization reaction or the like.

In order to prepare the binder particles (A), a step of causing the polymerizable compound having $A^1$ and $R^4$ to react with the thiol compound, a step of introducing the polymer chain $P^1$ into the thiol compound, and a step of introducing the polymer chain $P^2$ into the thiol compound can be performed simultaneously or separately. It is preferable that the step of introducing the polymer chain $P^1$ into the thiol compound and the step of introducing the polymer chain $P^2$ into the thiol compound are performed separately. Although any one of the steps is performed first, it is preferable that the step of introducing the polymer chain $P^2$ into the thiol compound is performed first. In this case, the reaction rate of each of the polymerizable compounds to all the mercapto groups in the thiol compound represented by Formula 2 is set such that l, m, and n in Formula 1 are satisfied in the step of causing the polymerizable compound having $A^1$ and $R^4$ to react and the step of introducing the polymer chain $P^1$ and the polymer chain $P^2$. The polymer C represented by Formula 1 is typically formed as spherical or granular polymer particles (binder particles (A)). The average particle size of the obtained binder particles (A) can be appropriately set to be in a predetermined range depending on the kinds of the compounds and the like to be used, a polymerization temperature, a dropping time, a dropping method, the amount of a polymerization initiator, and the like.

A solvent used for the polymerization of the polymer (the preparation of the binder particles (A)) is not particularly limited. It is preferable that a solvent that is not reactive with and does not decompose the inorganic solid electrolyte or the active material is used. For example, a hydrocarbon solvent (toluene, heptane, or xylene), an ester solvent (ethyl acetate, propylene glycol monomethyl ether acetate, butyl butyrate), an ether solvent (tetrahydrofuran, dioxane, or 1,2-diethoxyethane), a ketone solvent (acetone, methyl ethyl ketone, cyclohexanone, diisobutyl ketone), a nitrile solvent (acetonitrile, propionitrile, butyronitrile, or isobutyronitrile), or a halogen solvent (dichloromethane or chloroform) can be used.

For example, a polymerization method of the polymer represented by Formula 1 (preparation method of the binder particles (A)) can be performed by causing a polyvalent thiol compound represented by the following Formula 2, the polymerizable compound forming the polymer chain $P^1$, and the polymerizable compound forming the polymer chain $P^2$ to react (addition reaction and polymerization reaction) with each other.

Reaction conditions (polymerization conditions) are set to conditions for an addition reaction (thiol-ene reaction) or a polymerization reaction of the thiol compound represented by the following Formula 2 and the polymerizable compound (including the macromonomer) forming the polymer chain $P^2$ or conditions for a polymerization reaction of the polymerizable compound forming the polymer chain $P^1$. The conditions are appropriately set depending on the kind of the thiol compound or each of the polymerizable compounds, the kind or amount of a catalyst to be used, and the like. Examples of the conditions include conditions where the reaction is performed using the above-described solvent at a reaction temperature of 50° C. to 150° C. for 1 to 15 hours. In this reaction, a typically used polymerization catalyst such as an azo compound or an organic peroxide can be used without any particular limitation.

The thiol compound represented by the following Formula 2, the polymerizable compound (including the macromonomer) forming the polymer chain $P^2$, and the polymerizable compound forming the polymer chain $P^1$ can be caused to react with each other simultaneously or sequentially and preferably are caused to react with each other sequentially. In a case where the reaction is performed sequentially, it is preferable that the thiol compound represented by the following Formula 2 and the polymerizable compound (including the macromonomer) forming the polymer chain $P^2$ are caused to react with each other first and subsequently are caused to react with the polymerizable compound forming the polymer chain $P^1$.

In the above-described polymerization method, the polymerizable compounds used for the polymerization reaction, in particular, the polymerizable compound forming the polymer chain $P^2$, can be caused to react with high efficiency (conversion rate), the residual amount of an unreacted material can be reduced, and a high-purity polymer (binder particles (A)) can be synthesized.

(Formula 2)

In Formula 2, $R^5$ represents a (l+m+n)-valent linking group and has the same definition and the same preferable range as those of $R^1$ in Formula 1. $R^6$ represents a single bond or a linking group and has the same definition and the same preferable range as those of $R^4$ in Formula 1. $A^2$ represents a hydrogen atom, an acidic group, a group having a basic nitrogen atom, a urea group, a urethane group, an alkoxysilyl group, an epoxy group, an isocyanate group, or a hydroxy group, and has the same definition and the same preferable range as those of $A^1$ in Formula 1. p represents an integer of 1 to 10, and has the same definition and the same preferable range as those of p in Formula 1.

In Formula 2, l represents an integer of 0 to 5, and has the same definition and the same preferable range as those of l in Formula 1. m+n represents an integer of 2 to 10, preferably an integer of 3 to 8, more preferably an integer of 3 to 6, and still more preferably an integer of 4 to 6. l+m+n represents an integer of 3 to 10, and has the same definition and the same preferable range as those of l+m+n in Formula 1.

The compound represented by Formula 2 is not particularly limited and can be synthesized, for example, by performing an addition reaction (thiol-ene reaction) of the polymerizable compound including $A^2$ and $R^6$ with the (l+m+n)-valent thiol compound. Examples of the polymerizable compound including $A^2$ and $R^6$ include the polymerizable compound having the above-described absorption group $A^1$ among the polymerizable compounds forming the polymer chain $P^1$ or the polymer chain $P^2$.

Hereinafter, specific examples of the polymer represented by Formula 1 will be shown, but the present invention is not limited thereto.

D-01

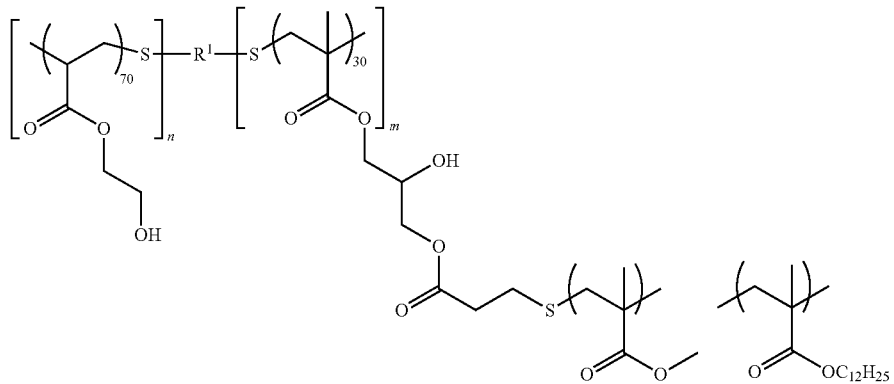

n = 4, m = 2
MMA/LMA = 28/72 wt %
MMA = Methyl Methacrylate
LMA = Lauryl Methacrylate

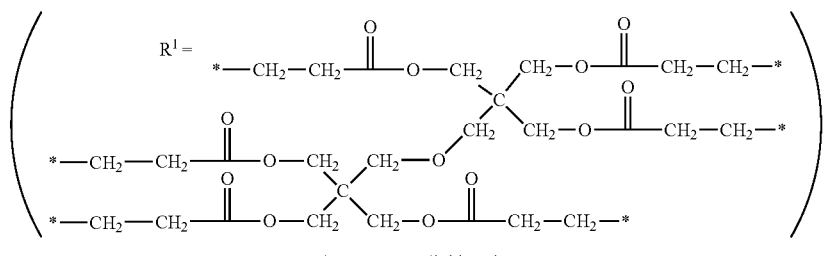

* represents a linking site

-continued
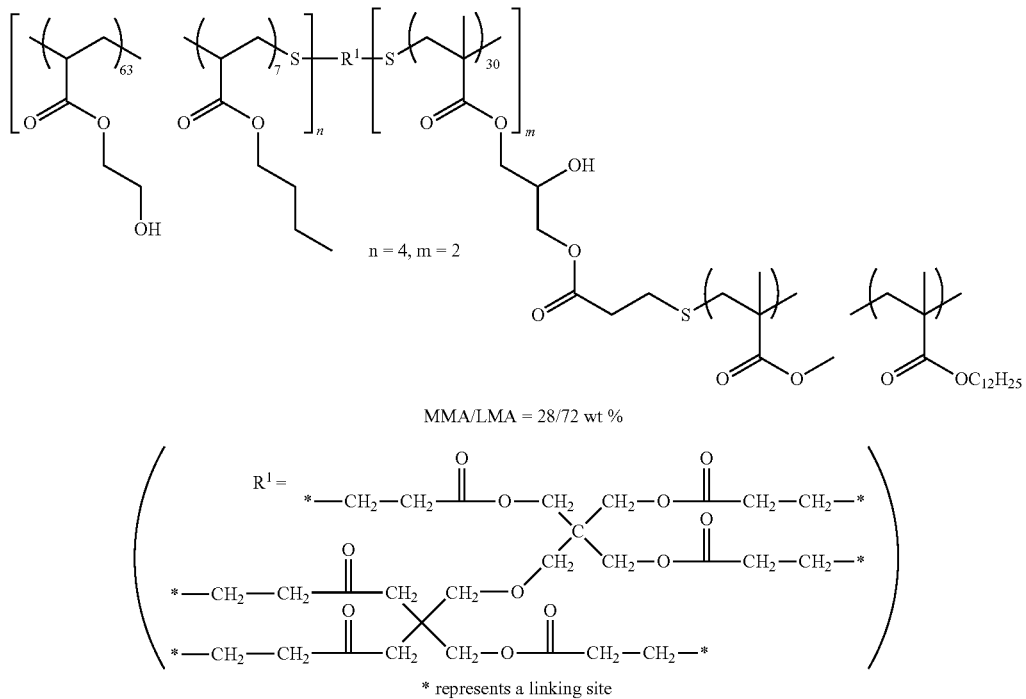
D-02
n = 4, m = 2
MMA/LMA = 28/72 wt %
* represents a linking site
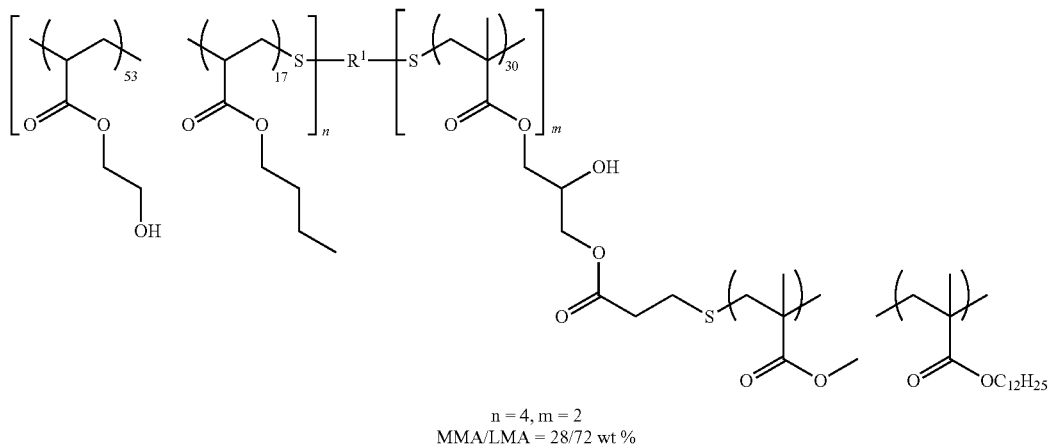
D-03
n = 4, m = 2
MMA/LMA = 28/72 wt %
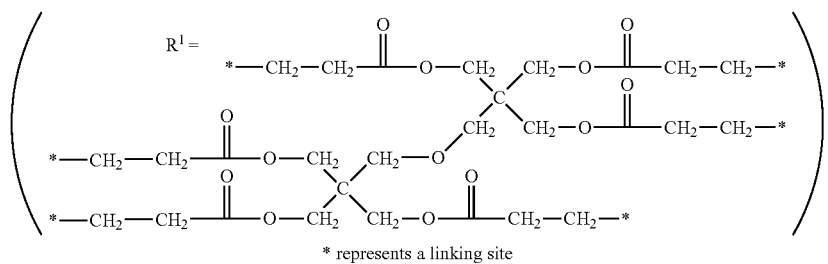
* represents a linking site -continued
D-04
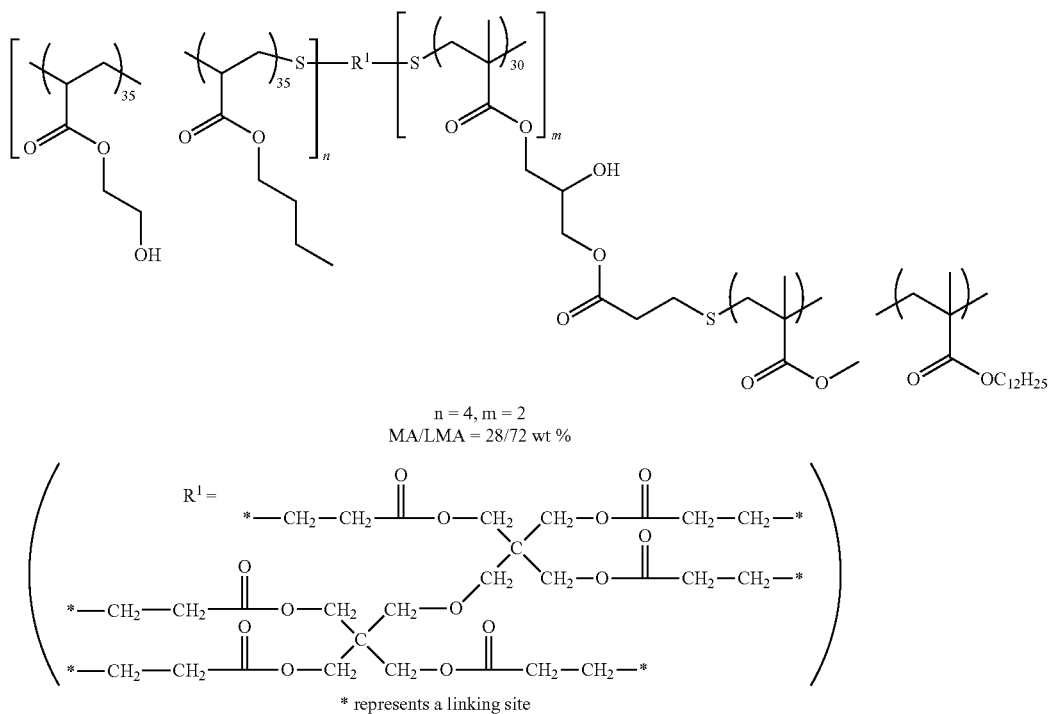
n = 4, m = 2
MA/LMA = 28/72 wt %
* represents a linking site
D-05
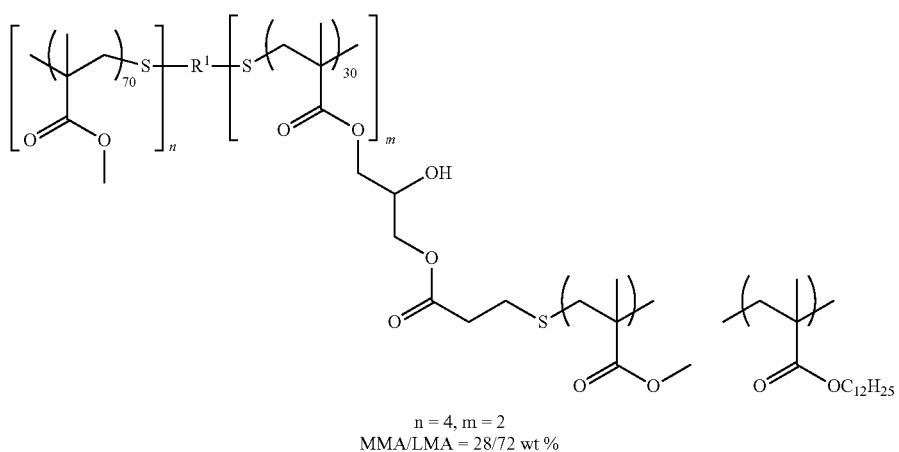
n = 4, m = 2
MMA/LMA = 28/72 wt %
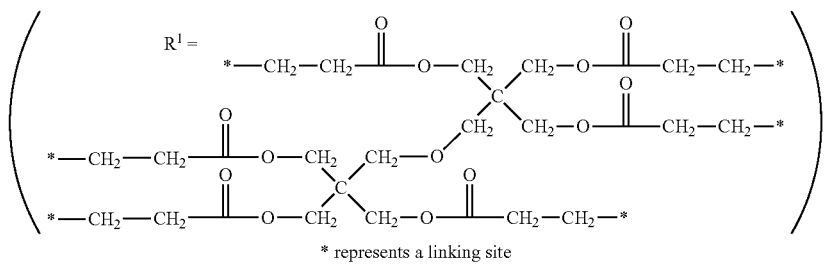
* represents a linking site D-06
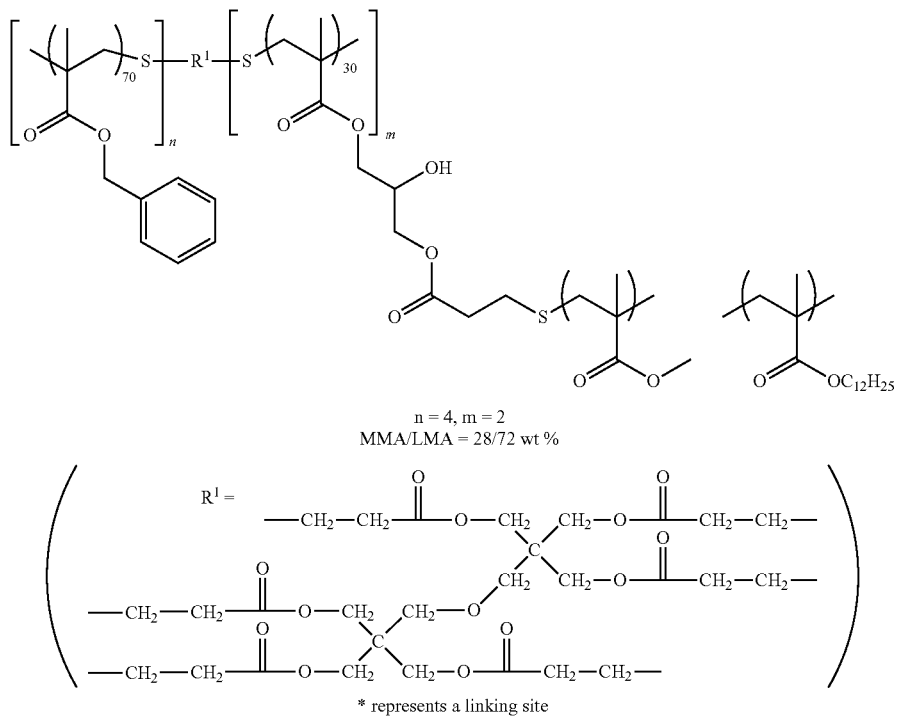
n = 4, m = 2
MMA/LMA = 28/72 wt %
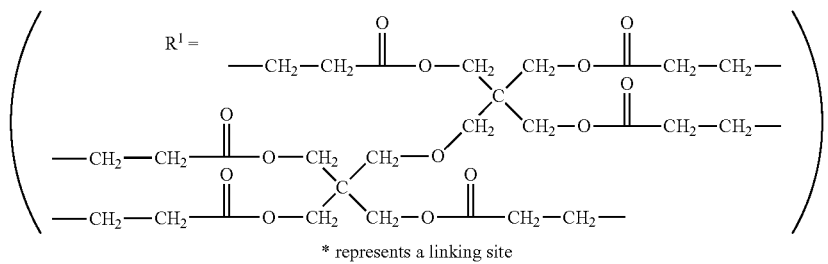
* represents a linking site
D-07
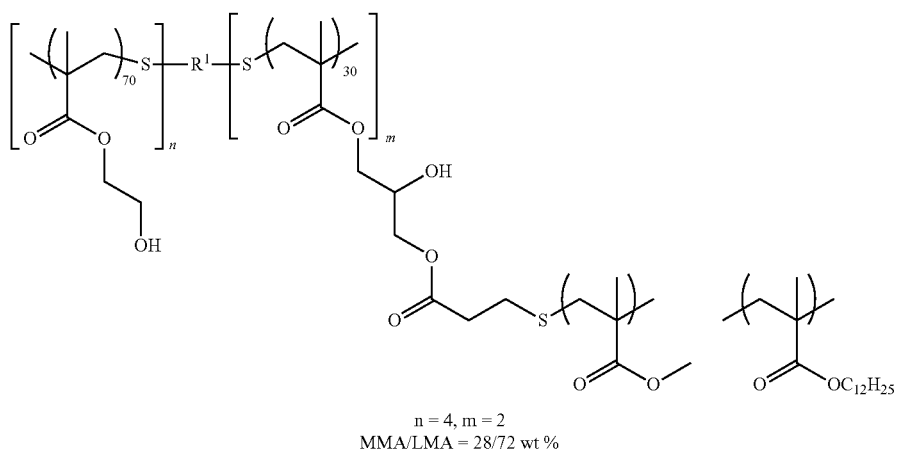
n = 4, m = 2
MMA/LMA = 28/72 wt %
* represents a linking site D-08
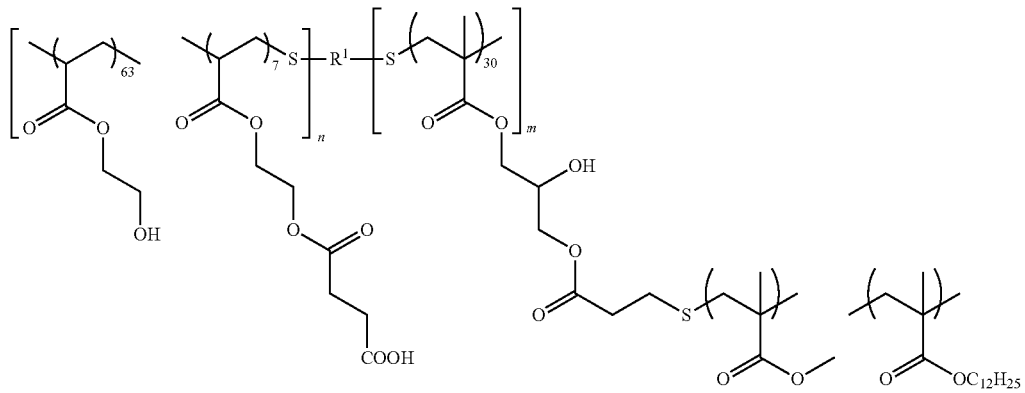
n = 4, m = 2
MMA/LMA = 28/72 wt %
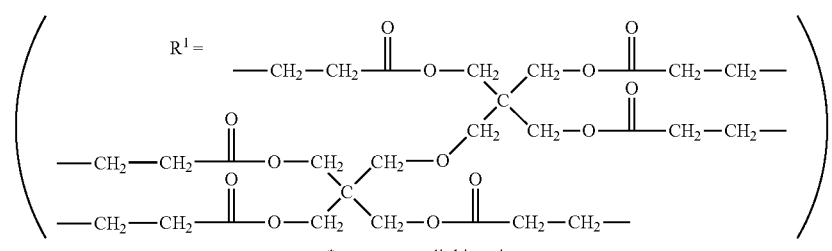
* represents a linking site
D-09
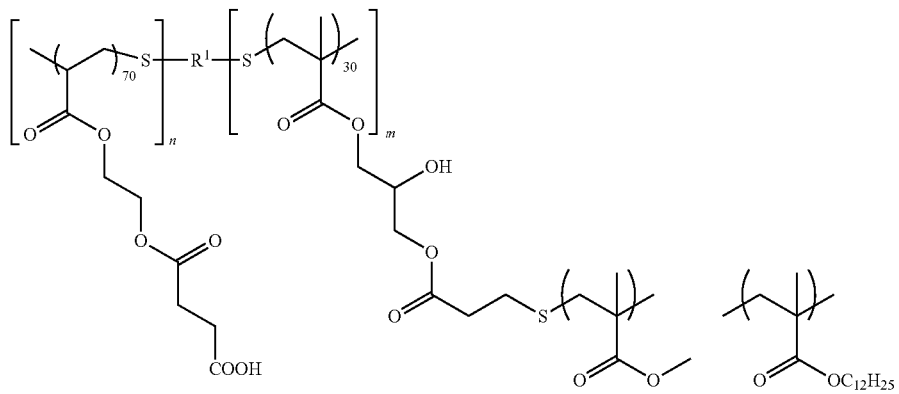
n = 4, m = 2
MMA/LMA = 28/72 wt %
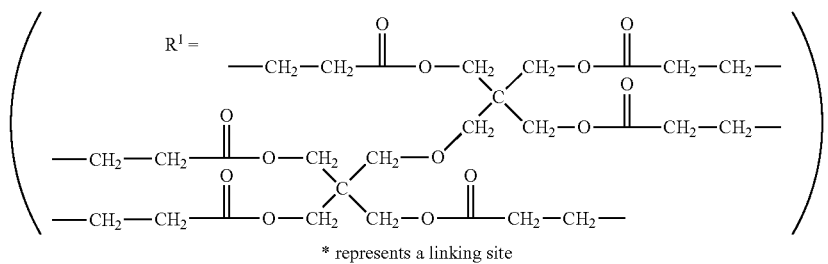
* represents a linking site D-10
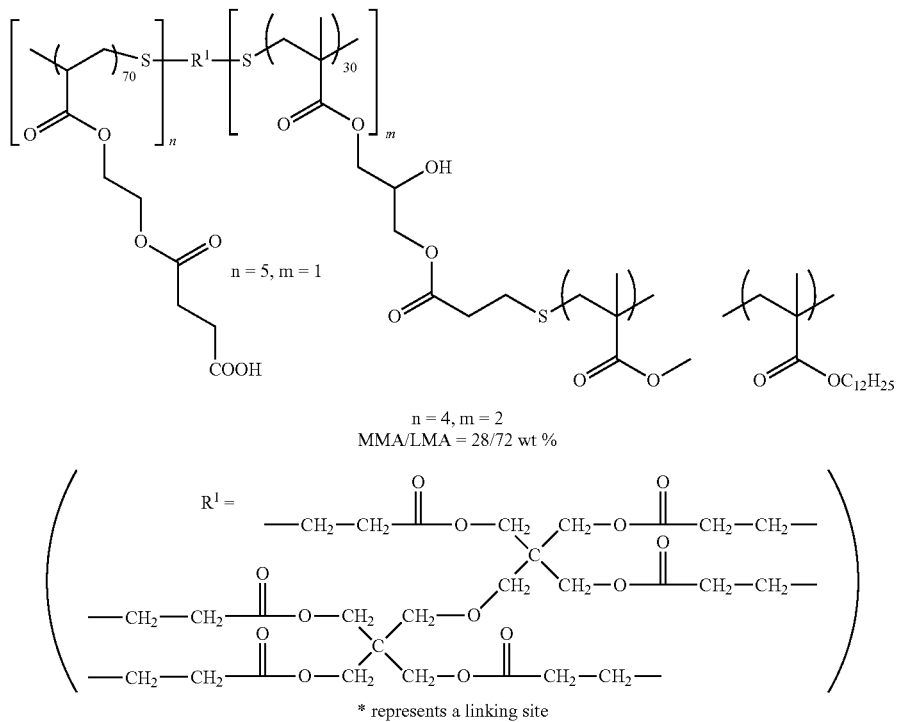
n = 4, m = 2
MMA/LMA = 28/72 wt %
* represents a linking site
D-11
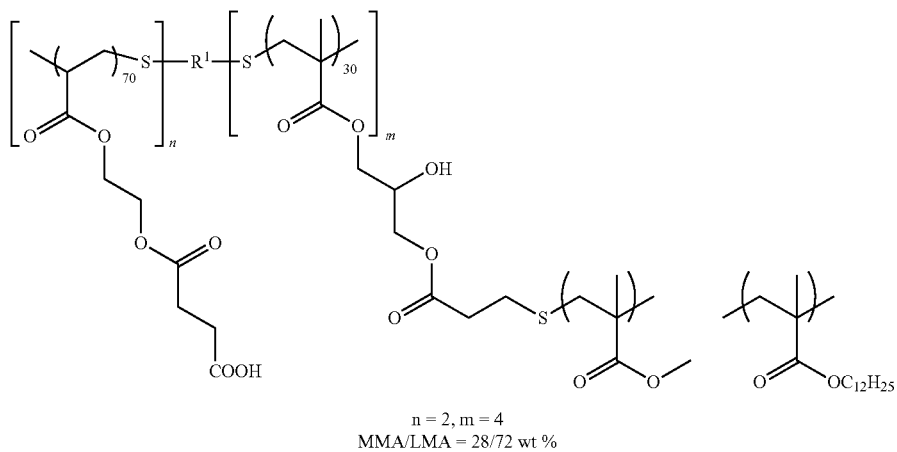
n = 2, m = 4
MMA/LMA = 28/72 wt %
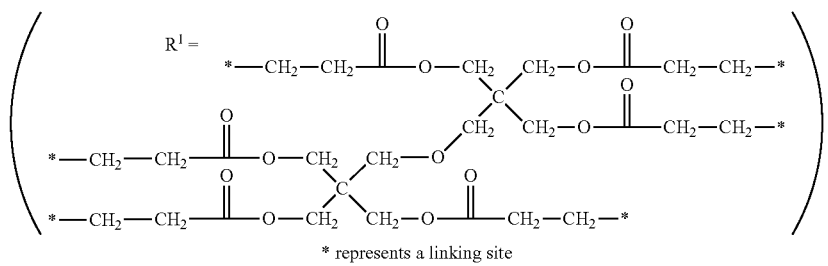
* represents a linking site -continued
D-12
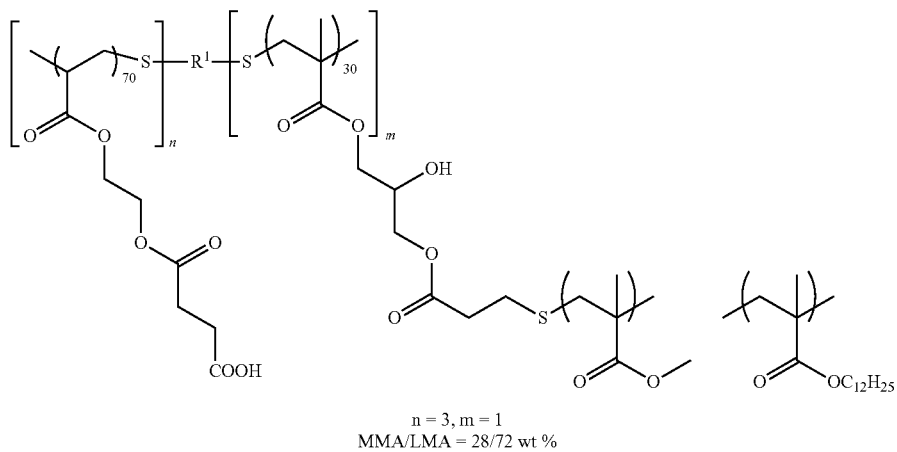
n = 3, m = 1
MMA/LMA = 28/72 wt %
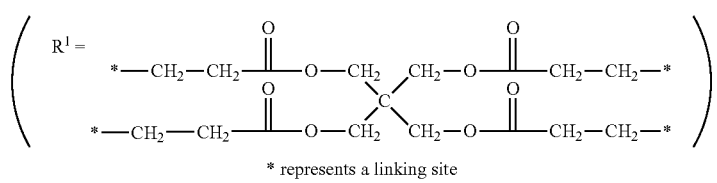
* represents a linking site
D-13
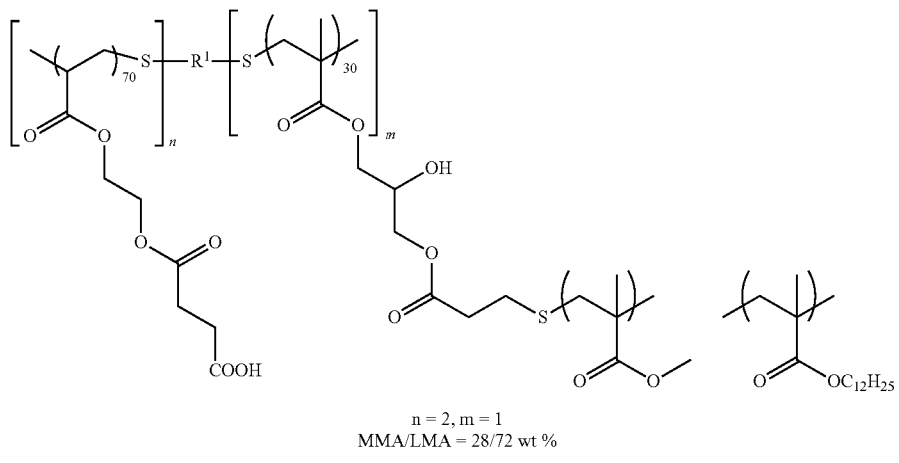
n = 2, m = 1
MMA/LMA = 28/72 wt %
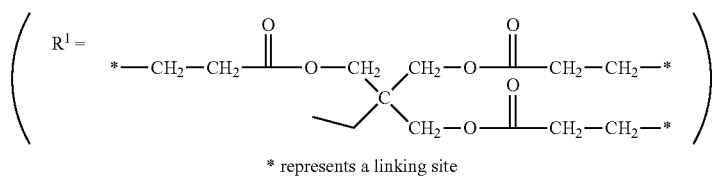
* represents a linking site D-14
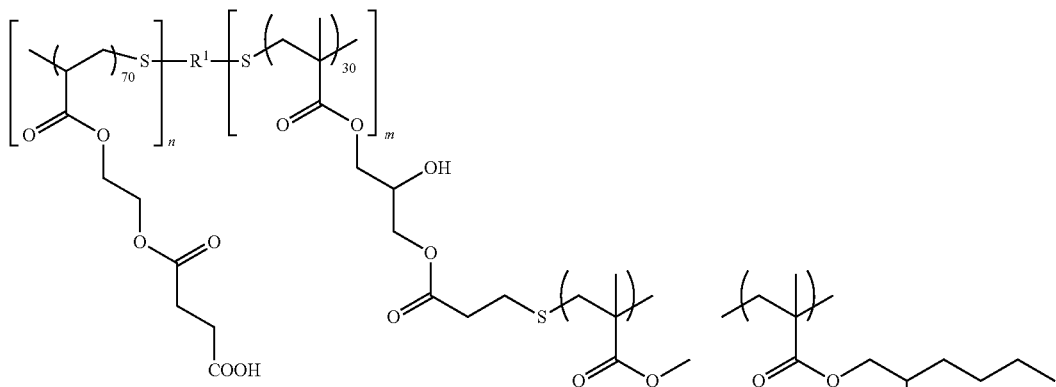
n = 5, m = 1
MMA/EHMA = 28/72 wt %
EHMA = 2-Ethythexyl Methacrylate
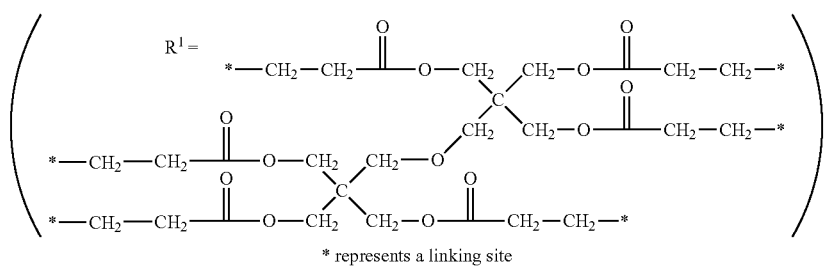
* represents a linking site
D-15
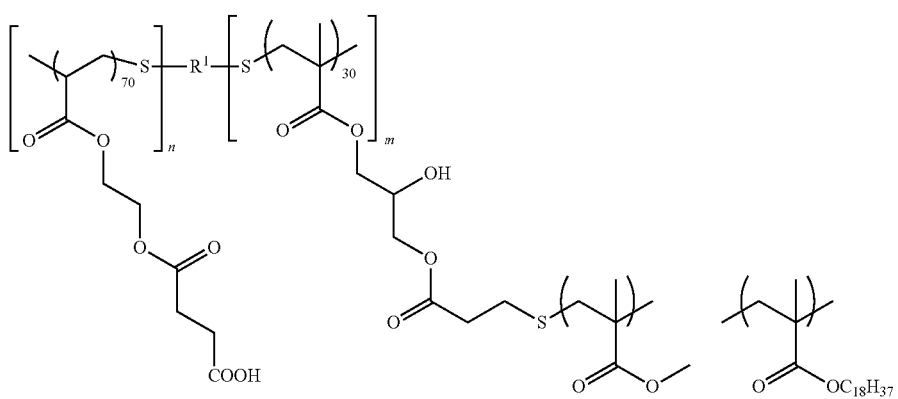
n = 5, m = 1
MMA/SMA = 40/60 wt %
SMA = Stearyl Methacrylate
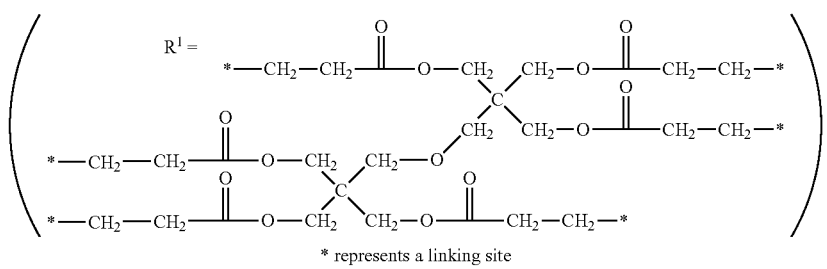
* represents a linking site -continued
D-16
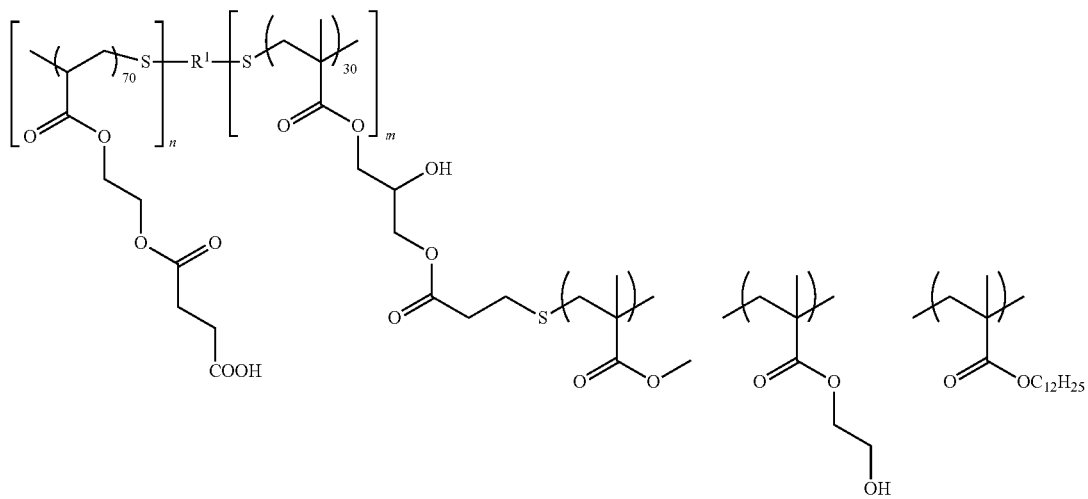
n = 5, m = 1
MMA/HEMA/LMA = 27/20/53 wt %
HEMA:Hydroxyethyl Methacrylate
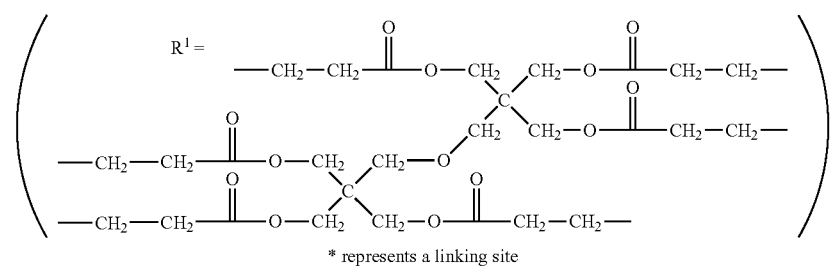
* represents a linking site
D-17
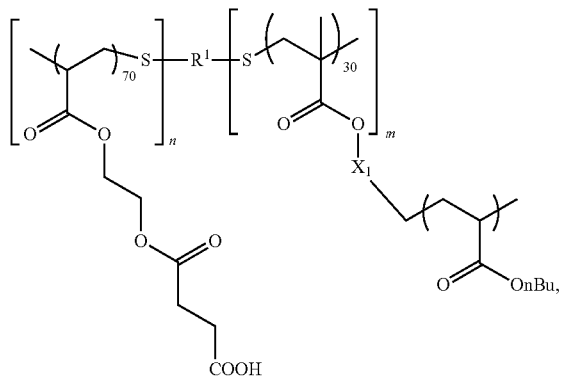
n = 5, m = 1
$X_1$ represents a divalent linking group.
BA = 100 wt %
BA = Normal Butyl Acrylate
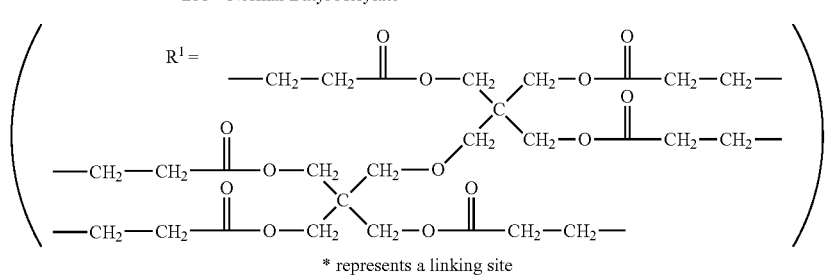
* represents a linking site -continued
D-18
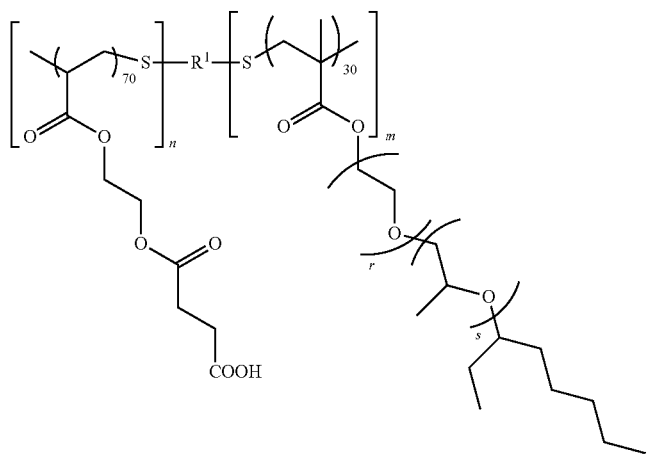
n = 5, m = 1
r = 8, s = 7
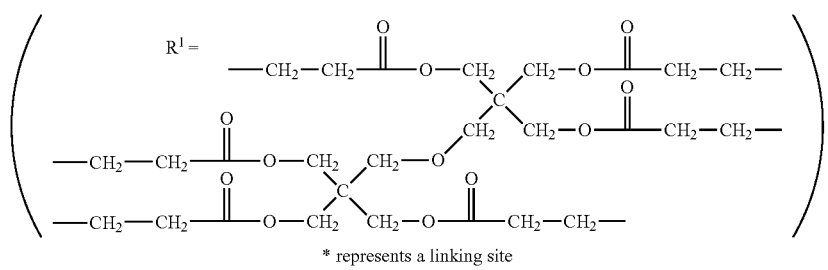
* represents a linking site
D-19
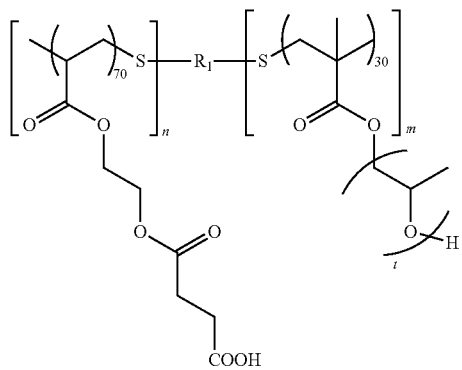
n = 5, m = 1
t = 8
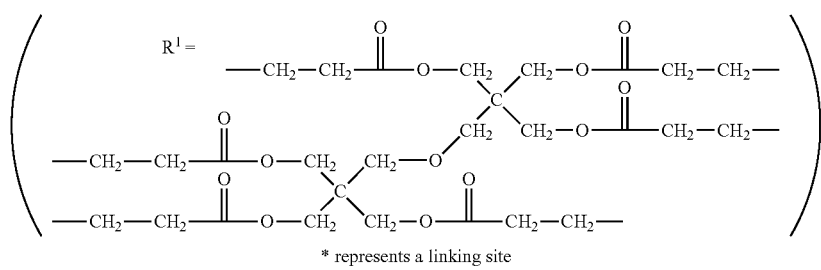
* represents a linking site -continued
D-20
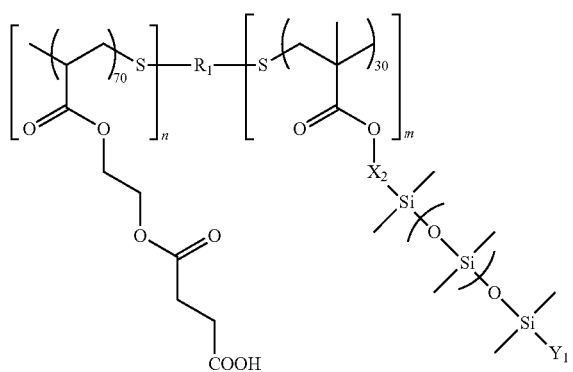
n = 5, m = 1
X₂ represents a divalent linking group,
and Y₁ represents an organic group.
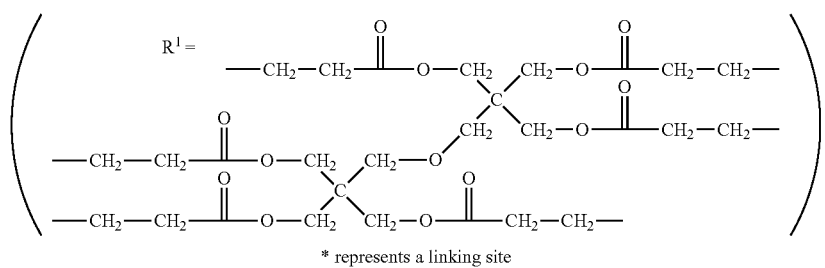
* represents a linking site
D-21
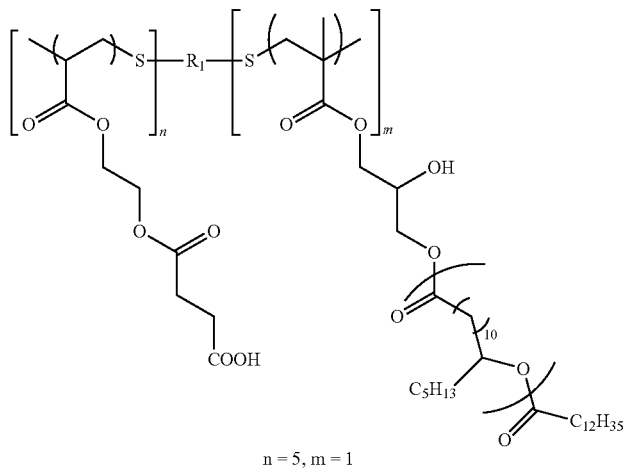
n = 5, m = 1
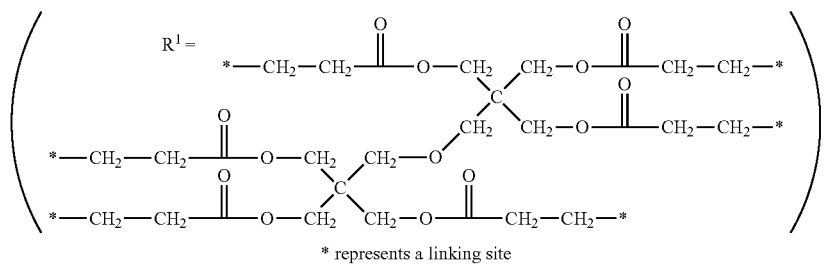
* represents a linking site

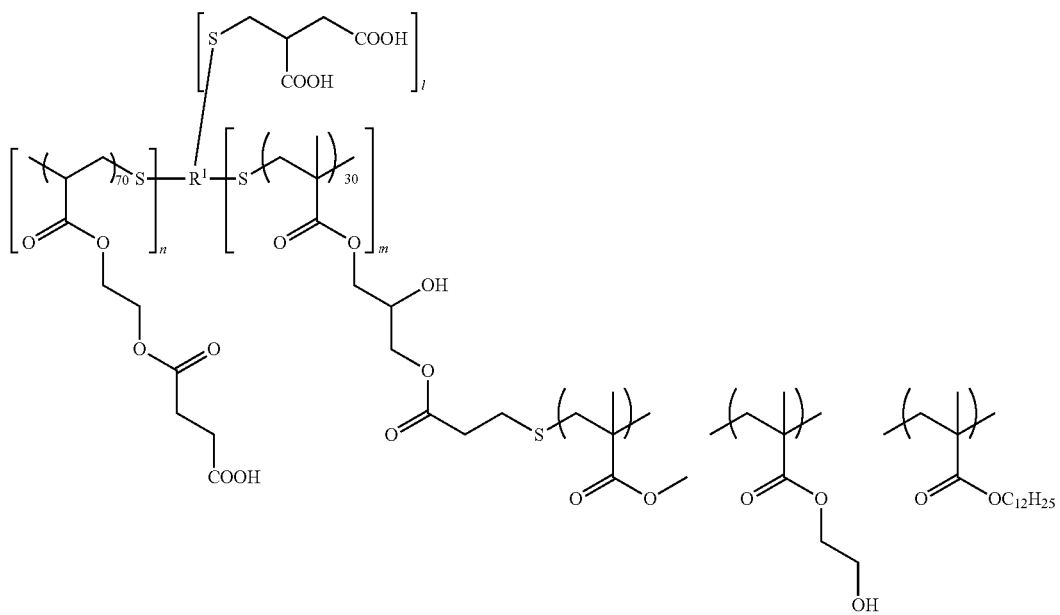
D-22
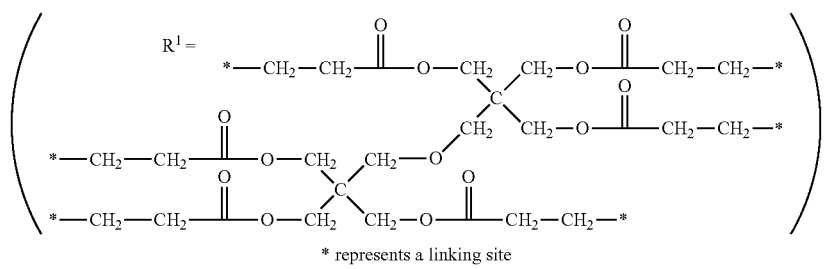
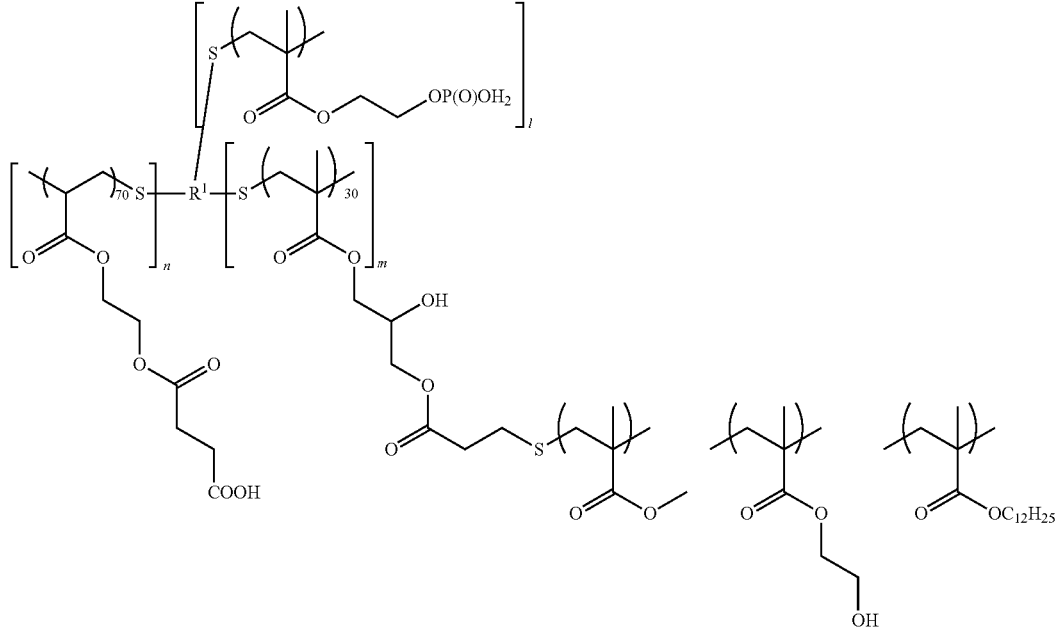
D-23

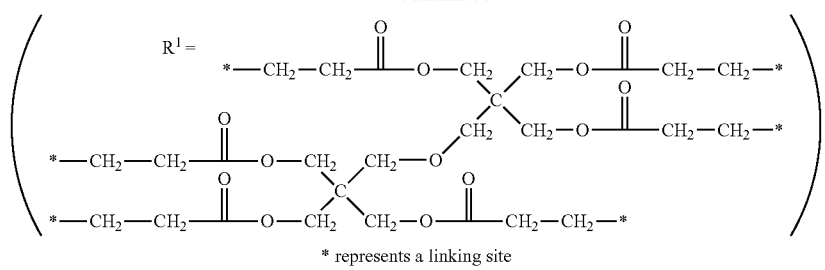
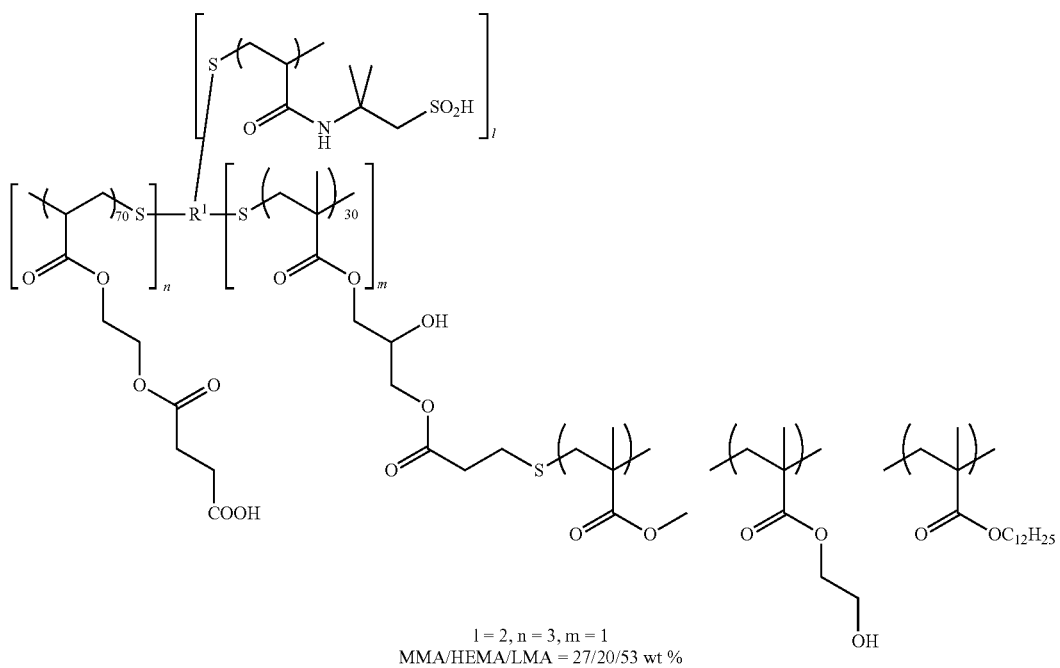
D-24
l = 2, n = 3, m = 1
MMA/HEMA/LMA = 27/20/53 wt %
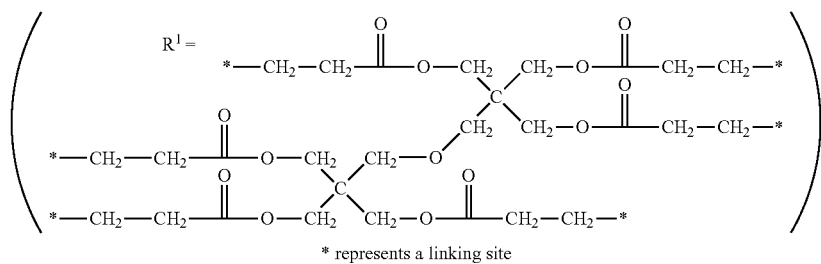

-continued
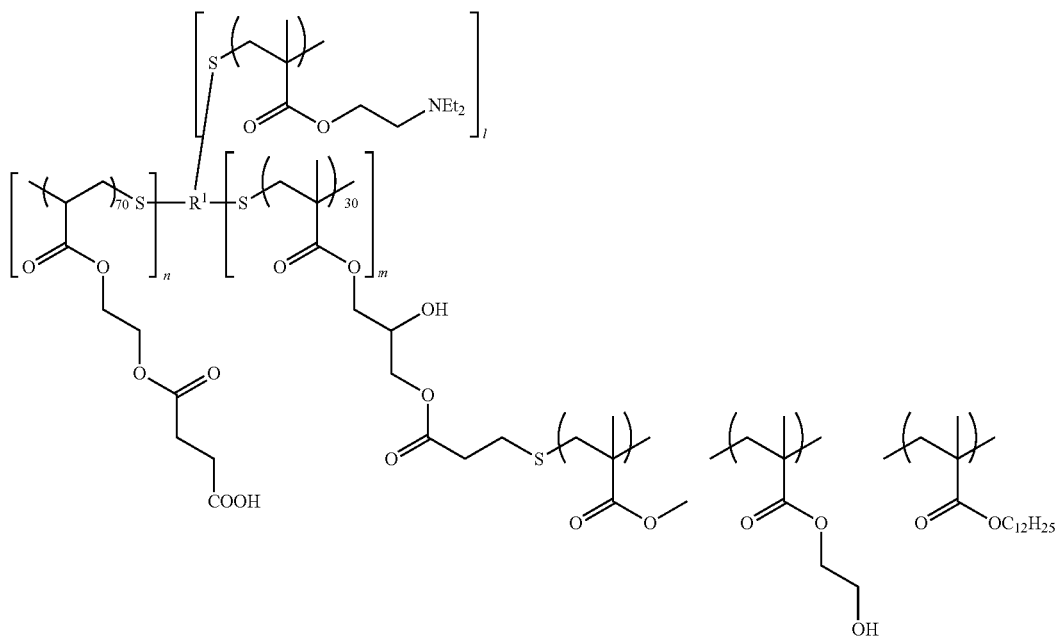
D-25
l = 2, n = 3, m = 1
MMA/HEMA/LMA = 27/20/53 wt %
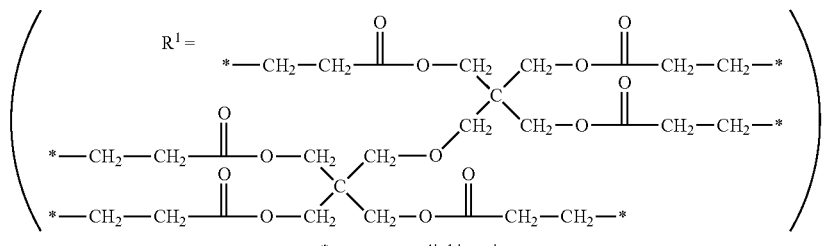
* represents a linking site
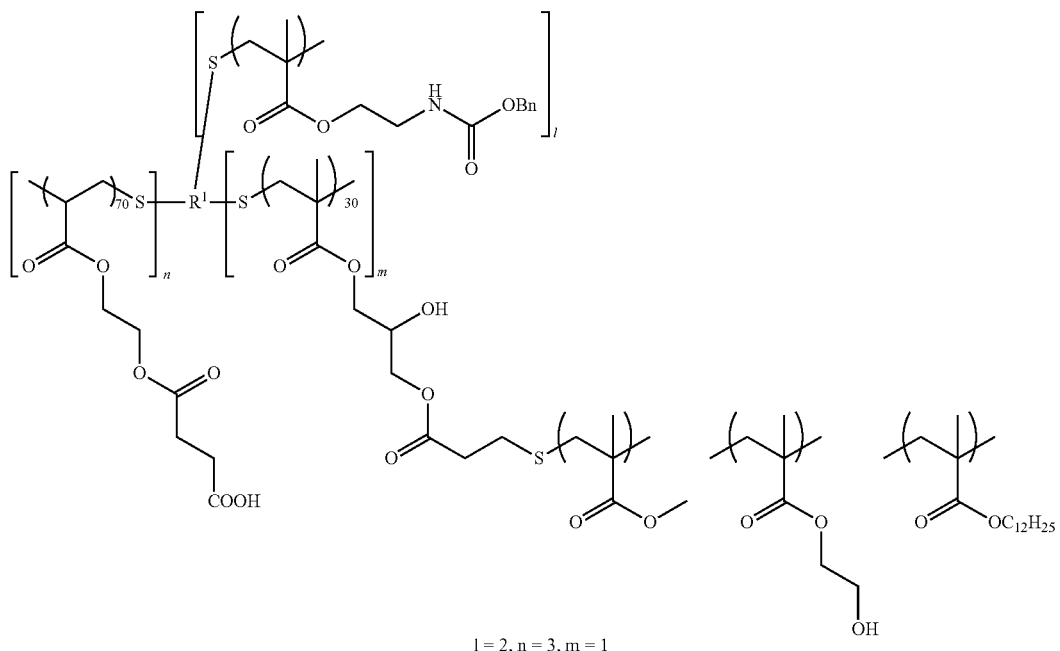
D-26
l = 2, n = 3, m = 1
MMA/HEMA/LMA = 27/20/53 wt %

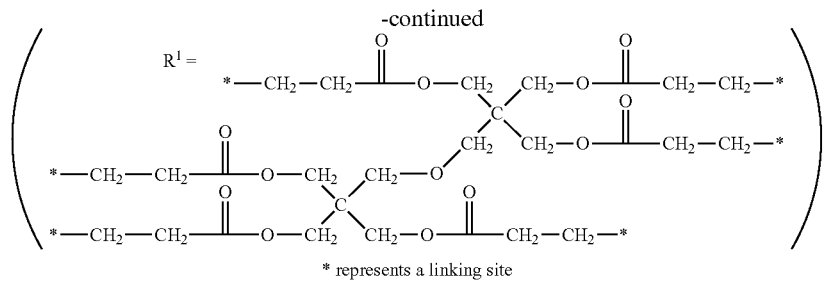

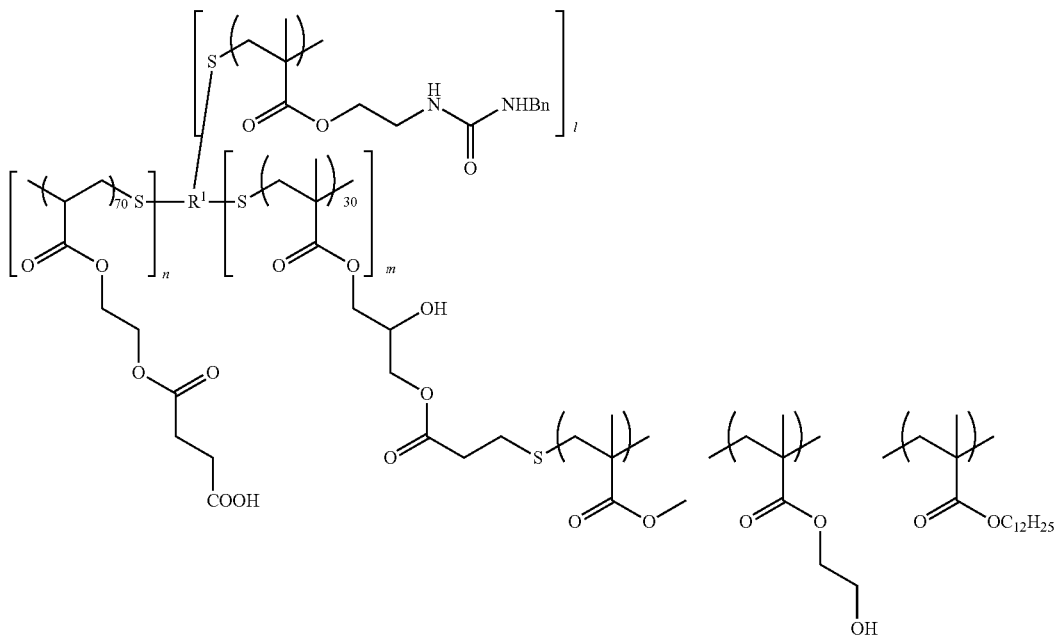

$l = 2, n = 3, m = 1$
MMA/HEMA/LMA = 27/20/53 wt %

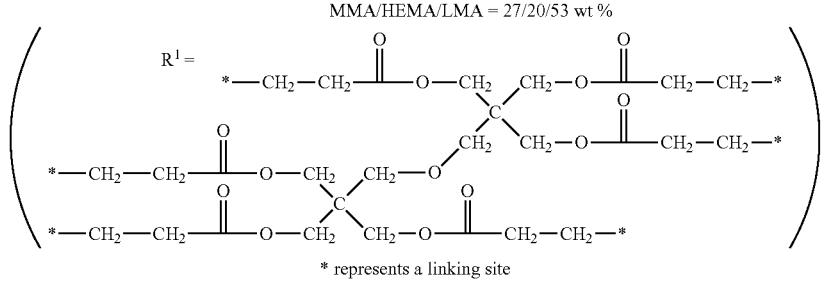

* represents a linking site

In order to further improve the discharge capacity and to further reduce the resistance in an all-solid state secondary battery including an electrode active material layer that is formed of the electrode composition according to the embodiment of the present invention, in the polymer forming the binder used in the present invention, a modulus of elasticity that is measured according to JIS K 7161 (2014) is preferably 10 to 500 MPa, more preferably 50 to 450 MPa, and still more preferably 100 to 350 MPa.

In order to further improve the discharge capacity and to further reduce the resistance in an all-solid state secondary battery including an electrode active material layer that is formed of the electrode composition according to the embodiment of the present invention, in the polymer forming the binder used in the present invention, a tensile strain at break that is measured according to JIS K 7161 (2014) is preferably 500% to 700%, more preferably 150% to 650%, and still more preferably 250% to 600%.

The tensile strain at break is a value obtained by subtracting 100% from the length of a polymer sample at break in a case where the length of the polymer sample before stretching is represented by 100%.

As the binder used in the present invention, one kind may be used alone, or two or more kinds may be used in combination.

The content of the binder in the electrode composition is preferably 0.1 mass % or higher, more preferably 0.3 mass % or higher, and still more preferably 0.5 mass % or higher with respect to the solid content of the electrode composition. The upper limit is more preferably 13 mass % or lower, more preferably 11 mass % or lower, still more preferably 6 mass % or lower, and still more preferably 2 mass % or lower.

By using the binder in the above-described range, the discharge capacity can be further improved and the resistance can be further reduced in an all-solid state secondary battery including an electrode active material layer that is formed of the electrode composition according to the embodiment of the present invention.

(Conductive Auxiliary Agent)

The distributing component used in the present invention may optionally include a conductive auxiliary agent used for improving, for example, the electron conductivity of the active material. As the conductive auxiliary agent, a general conductive auxiliary agent can be used. The conductive auxiliary agent may be, for example, graphite such as natural graphite or artificial graphite, carbon black such as acetylene black, Ketjen black, or furnace black, amorphous carbon such as needle cokes, a carbon fiber such as a vapor-grown carbon fiber or a carbon nanotube, or a carbonaceous material such as graphene or fullerene which are electron-conductive materials and also may be metal powder or a metal fiber of copper, nickel, or the like, and a conductive polymer such as polyaniline, polypyrrole, polythiophene, polyacetylene, or a polyphenylene derivative may also be used. In addition, among these, one kind may be used, or two or more kinds may be used.

In a case where the electrode composition according to the embodiment of the present invention includes the conductive auxiliary agent, the content of the conductive auxiliary agent in the electrode composition is preferably 0% to 10 mass % and more preferably 3% to 5 mass % with respect to all the solid components.

In the present invention, in a case where the negative electrode active material and the conductive auxiliary agent are used in combination, among the above-described conductive auxiliary agents, a conductive auxiliary agent that does not intercalate and deintercalate Li and does not function as a negative electrode active material during charging and discharging of the battery is classified as the conductive auxiliary agent. Whether or not the conductive auxiliary agent functions as the negative electrode active material during charging and discharging of the battery is not uniquely determined but is determined based on a combination of the conductive auxiliary agent with the negative electrode active material.

<Dispersion Medium>

The electrode composition according to the embodiment of the present invention may include a dispersion medium. In a case where the electrode composition includes the dispersion medium, composition uniformity, handleability, and the like can be improved.

The dispersion medium is not particularly limited as long as it can disperse the respective components in the electrode composition according to the present invention.

Examples of the dispersion medium to be used in the present invention include various organic solvents. Examples of the organic solvent include the respective solvents of an alcohol compound, an ether compound, an amide compound, an amine compound, a ketone compound, an aromatic compound, an aliphatic compound, a nitrile compound, and an ester compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of an ether compound include alkylene glycol alkyl ether (for example, ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, propylene glycol monomethyl ether, dipropylene glycol monomethyl ether, tripropylene glycol monomethyl ether, or diethylene glycol monobutyl ether), dialkyl ether (for example, dimethyl ether, diethyl ether, diisopropyl ether, or dibutyl ether), and cyclic ether (for example, tetrahydrofuran or dioxane (including respective isomers of 1,2-, 1,3-, and 1,4-)).

Examples of the amide compound include N,N-dimethylformamide, N-methyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropanamide, and hexamethylphosphoric amide.

Examples of the amine compound include triethylamine, diisopropylethylamine, and tributylamine.

Examples of the ketone compound include acetone, methyl ethyl ketone (MEK), methyl isobutyl ketone, cyclohexanone, and diisobutyl ketone (DIBK).

Examples of the aromatic compound include an aromatic hydrocarbon compound such as benzene, toluene, or xylene.

Examples of the aliphatic compound include an aliphatic hydrocarbon compound such as hexane, heptane, octane, or decane.

Examples of the nitrile compound include acetonitrile, propionitrile, and isobutyronitrile.

Examples of the ester compound include a carboxylic acid ester such as ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

Examples of a non-aqueous dispersion medium include the aromatic compound and the aliphatic compound described above.

In the present invention, the dispersion medium is preferably a ketone compound, an ester compound, an aromatic compound, or an aliphatic compound and more preferably a dispersion medium including at least one selected from a ketone compound, an ester compound, an aromatic compound, or an aliphatic compound.

The number of dispersion media in the electrode composition may be one or two or more but is preferably two or more.

The total content of the dispersion medium in the electrode composition is not particularly limited and is preferably 20% to 80 mass %, more preferably 30% to 70 mass %, and still more preferably 40% to 60 mass %.

<Other Additives>

As components other than the above-described respective components, the electrode composition according to the embodiment of the present invention optionally includes a lithium salt, an ionic liquid, a thickener, an antifoaming agent, a leveling agent, a dehydrating agent, and an antioxidant.

[Method of Manufacturing Electrode Composition]

The electrode composition according to the embodiment of the present invention can be prepared by mixing the inorganic solid electrolyte, the active material, the distributing component, and optionally other components such as the dispersion medium, for example using various mixers that are typically used. A mixing environment is not particularly limited, and examples thereof include a dry air environment and an inert gas environment. A mixing method is not particularly limited. For example, the following mixing methods can be used.

(Mixing Method A)

All the components are mixed in a lump.

(Mixing Method B)

The inorganic solid electrolyte and the binder are mixed to obtain a mixture a1, and this mixture, the active material and optionally a conductive auxiliary agent are mixed. In a case where the inorganic solid electrolyte and the binder are mixed, the dispersion medium may be mixed together. In addition, after mixing the active material and the conductive auxiliary agent to obtain a mixture b1, the mixture a1 and the mixture b1 may be mixed.

(Mixing Method C)

The active material and the binder are mixed to obtain a mixture a2, and this mixture, the inorganic solid electrolyte, and optionally a conductive auxiliary agent are mixed. In a case where the active material and the binder are mixed, the dispersion medium may be mixed together. In addition, after mixing the inorganic solid electrolyte and the conductive auxiliary agent to obtain a mixture b2, the mixture a2 and the mixture b2 may be mixed.

In order to further increase the discharge capacity of an all-solid state secondary battery manufactured using the obtained electrode composition with the method of manufacturing the electrode composition according to the embodiment of the present invention to further reduce the resistance, the mixing methods A and C are preferable, and the mixing method C is more preferable. In the mixing method C, the distribution rate of the distributing component to the active material increases. Therefore, voids at an interface between the active material and the inorganic solid electrolyte can be reduced, and the discharge capacity of the all-solid state secondary battery can be further increased, and the resistance can be further reduced.

[Electrode Sheet for all-Solid State Secondary Battery]

An electrode sheet for an all-solid state secondary battery according to the embodiment of the present invention includes an electrode active material layer including an inorganic solid electrolyte, an active material, and a distributing component, in which a distribution rate of the distributing component to the active material in the electrode active material layer exceeds 50%.

An electrode sheet for an all-solid state secondary battery according to the embodiment of the present invention (simply also referred to as "electrode sheet according to the embodiment of the present invention") is not particularly limited as long as it is an electrode sheet including an active material layer, and may be a sheet in which an active material layer is formed on a substrate (current collector) or may be a sheet that is formed of an active material layer without including a substrate. The electrode sheet is typically a sheet including a current collector and an active material layer. In addition, the electrode sheet includes an aspect thereof include an aspect including the current collector, the active material layer, and the solid electrolyte layer in this order and an aspect including the current collector, the active material layer, the solid electrolyte layer, and the active material layer in this order. The electrode sheet according to the embodiment of the present invention may include another layer such as a protective layer or a conductor layer (for example, a carbon coating layer). The thickness of each of the layers forming the electrode sheet according to the embodiment of the present invention is the same as the thickness of each of layers described below regarding the all-solid state secondary battery.

In the electrode sheet for an all-solid state secondary battery according to the embodiment of the present invention, at least one of a positive electrode active material layer or a negative electrode active material layer is formed of the electrode composition according to the embodiment of the present invention, and the active material and the binder in the layer strongly bind to each other. In addition, in the electrode sheet for an all-solid state secondary battery, the active material layer that is formed of the electrode composition according to the embodiment of the present invention is strongly bound to the current collector. In the present invention, an increase in the interface resistance of solid particles can also be effectively suppressed. Accordingly, the electrode sheet for an all-solid state secondary battery according to the embodiment of the present invention can be suitably used as a sheet with which an electrode active material layer of an all-solid state secondary battery can be formed.

For example, in a case where the electrode sheet for an all-solid state secondary battery is manufactured in-line in an elongated shape (is wound during transport) and used as a wound battery, strong binding properties between the active material in the active material layer and the binder can be maintained. In a case where an all-solid state secondary battery is manufactured using the electrode sheet for an all-solid state secondary battery manufactured, excellent battery performance can be exhibited, and high productivity and yield (reproducibility) can be realized.

[Method of Manufacturing Electrode Sheet for all-Solid State Secondary Battery]

A method of manufacturing an electrode sheet for an all-solid state secondary battery according to the embodiment of the present invention is not particularly limited. For example, the electrode sheet for an all-solid state secondary battery according to the embodiment of the present invention can be manufactured by forming the electrode active material layer using the electrode composition according to the embodiment of the present invention. Examples of the method include a method of forming a film (drying and applying) of the solid electrolyte composition to form a layer (applied and dried layer) formed of the electrode composition optionally on a current collector (other layers may be interposed therebetween). As a result, the electrode sheet for an all-solid state secondary battery including optionally the current collector and the applied and dried layer can be prepared. Here, the applied and dried layer refers to a layer formed by applying the electrode composition according to the embodiment of the present invention and drying the dispersion medium (that is, a layer formed using the electrode composition according to the embodiment of the present invention and made of a composition obtained by removing the dispersion medium from the electrode composition according to the embodiment of the present invention).

Each of steps of application, drying, or the like in the method of manufacturing an electrode sheet for an all-solid state secondary battery according to the embodiment of the present invention will be described below regarding a method of manufacturing an all-solid state secondary battery.

In the method of manufacturing an electrode sheet for an all-solid state secondary battery according to the embodiment of the present invention, it is also possible to pressurize the applied and dried layer obtained as described above. Pressurization conditions or the like will be described below regarding the method of manufacturing an all-solid state secondary battery.

In addition, in the method of manufacturing an electrode sheet for an all-solid state secondary battery according to the embodiment of the present invention, it is also possible to peel the current collector, the protective layer (particularly, the release sheet), or the like.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is formed optionally on a positive electrode current collector to configure a positive electrode. The negative electrode active material layer is formed optionally on a negative electrode current collector to configure a negative electrode.

At least one of the negative electrode active material layer or the positive electrode active material layer is formed of the electrode composition according to the embodiment of the present invention, and it is preferable that both the negative electrode active material layer and the positive electrode active material layer are formed of the electrode composition according to the embodiment of the present invention. In the active material layer formed of the electrode composition according to the embodiment of the present invention, it is preferable that the kinds of components to be included and the content ratio thereof are the same as those of the solid content of the electrode composition according to the embodiment of the present invention. A well-known material can be used for the active material layer and the solid electrolyte layer that are not formed of the electrode active material layer according to the embodiment of the present invention.

The thicknesses of the negative electrode active material layer, the solid electrolyte layer, and the positive electrode active material layer are not particularly limited respectively. In consideration of the dimension of a general all-solid state secondary battery, each of the thicknesses of the respective layers is preferably 10 to 1,000 μm and more preferably 15 μm or more and less than 500 μm. In the all-solid state secondary battery according to the embodiment of the present invention, the thickness of at least one layer of the positive electrode active material layer or the negative electrode active material layer is still more preferably 50 μm or more and less than 500 μm.

Each of the positive electrode active material layer and the negative electrode active material layer may include the current collector opposite to the solid electrolyte layer.

[Case]

Depending on uses, the all-solid state secondary battery according to the embodiment of the present invention may be used as the all-solid state secondary battery having the above-described structure as it is but is preferably sealed in an appropriate case to be used in the form of a dry cell. The case may be a metallic case or a resin (plastic) case. In a case where a metallic case is used, examples thereof include an aluminum alloy case and a stainless steel case. It is preferable that the metallic case is classified into a positive electrode-side case and a negative electrode-side case and that the positive electrode-side case and the negative electrode-side case are electrically connected to the positive electrode current collector and the negative electrode current collector, respectively. The positive electrode-side case and the negative electrode-side case are preferably integrated by being joined together through a gasket for short-circuit prevention.

Hereinafter, an all-solid state secondary battery according to a preferred embodiment of the present invention will be described with reference to FIG. 1, but the present invention is not limited thereto.

FIG. 1 is a cross-sectional view schematically illustrating the all-solid state secondary battery (lithium ion secondary battery) according to the preferred embodiment of the present invention. In the case of being seen from the negative electrode side, an all-solid state secondary battery 10 of the present embodiment includes a negative electrode current collector 1, a negative electrode active material layer 2, a solid electrolyte layer 3, a positive electrode active material layer 4, and a positive electrode current collector 5 in this order. The respective layers are in contact with one another and adjacent to each other. In a case in which the above-described structure is adopted, during charging, electrons ($e^-$) are supplied to the negative electrode side, and lithium ions ($Li^+$) are accumulated in the negative electrode side. On the other hand, during discharging, the lithium ions ($Li^+$) accumulated in the negative electrode side return to the positive electrode, and electrons are supplied to an operation portion 6. In an example shown in the drawing, an electric bulb is adopted as a model of the operation portion 6 and is lit by discharging.

(Positive Electrode Active Material Layer, Solid Electrolyte Layer, and Negative Electrode Active Material Layer)

In the all-solid state secondary battery 10, both of the positive electrode active material layer and the negative electrode active material layer are formed of the electrode composition according to the embodiment of the present invention. This all-solid state secondary battery 10 exhibits excellent battery performance. The inorganic solid electrolytes and the binders in the positive electrode active material layer 4 and the negative electrode active material layer 2 may be the same as or different from each other, respectively.

In the present invention, either or both of the positive electrode active material layer and the negative electrode active material layer will also be simply referred to as the active material layer or the electrode active material layer. In addition, either or both of the positive electrode active material and the negative electrode active material will also be simply referred to as "active material" or "electrode active material".

In the present invention, it is presumed that, in a case where the above-described binder is used in combination with the solid particles such as the inorganic solid electrolyte or the active material, an increase in interface resistance between the solid particles and an increase in interface resistance between the solid particles and the current collector can also be suppressed. Therefore, the all-solid state secondary battery according to the embodiment of the present invention exhibits excellent battery characteristics.

In the all-solid state secondary battery 10, the negative electrode active material layer can be formed as a lithium metal layer. Examples of the lithium metal layer include a layer formed by deposition or forming of lithium metal powder, a lithium foil, and a lithium deposited film. The thickness of the lithium metal layer is not limited to the above-described thickness of the above-described negative electrode active material layer and may be, for example, 1 to 500 μm.

The positive electrode current collector 5 and the negative electrode current collector 1 are preferably an electron conductor.

In the present invention, either or both of the positive electrode current collector and the negative electrode current collector will also be simply referred to as the current collector.

As a material for forming the positive electrode current collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material for forming the negative electrode current collector, not only aluminum, copper, a copper alloy, stainless steel, nickel, or titanium but also a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the current collector, typically, current collectors having a film sheet shape are used. For example, net-shaped collectors, punched collectors, compacts of lath bodies, porous bodies, or foaming bodies, or fiber groups can also be used.

The thickness of the current collector is not particularly limited, but is preferably 1 to 500 µm. In addition, it is also preferable that the surface of the current collector is made to be uneven through a surface treatment.

In the present invention, a functional layer, a member, or the like may be appropriately interposed or disposed between the respective layers of the negative electrode current collector, the negative electrode active material layer, the solid electrolyte layer, the positive electrode active material layer, and the positive electrode current collector or on the outside thereof. In addition, each of the layers may have a single-layer structure or a multi-layer structure.

[Manufacturing of all-Solid State Secondary Battery]

The all-solid state secondary battery can also be manufactured using an ordinary method. Specifically, the all-solid state secondary battery can be manufactured by forming the electrode active material layer using the electrode composition according to the embodiment of the present invention and the like. As a result, an all-solid state secondary battery having a low electrical resistance can be manufactured. Hereinafter, the details will be described in detail.

The all-solid state secondary battery according to the embodiment of the present invention can be manufactured through a method (the method of manufacturing an electrode sheet for an all-solid state secondary battery according to the embodiment of the present invention) including (through) a step of applying (forming a film using) the electrode composition according to the embodiment of the present invention to a metal foil also functioning as the current collector to form a coating film.

For example, the electrode composition (positive electrode composition) including a positive electrode active material is applied to a metal foil which is a positive electrode current collector so as to form a positive electrode active material layer. As a result, a positive electrode sheet for an all-solid state secondary battery is prepared. Next, the solid electrolyte composition for forming a solid electrolyte layer is applied to the positive electrode active material layer so as to form the solid electrolyte layer. Further, the electrode composition (negative electrode composition) including the negative electrode active material is applied to the solid electrolyte layer to form a negative electrode active material layer. By laminating the negative electrode current collector (metal foil) on the negative electrode active material layer, an all-solid state secondary battery having a structure in which the solid electrolyte layer is sandwiched between the positive electrode active material layer and the negative electrode active material layer can be obtained. Optionally by sealing the laminate in a case, a desired all-solid state secondary battery can be obtained.

In addition, an all-solid state secondary battery can also be manufactured by forming the negative electrode active material layer, the solid electrolyte layer, and the positive electrode active material layer on the negative electrode current collector in order reverse to that of the method of forming the respective layers and laminating the positive electrode current collector thereon.

As another method, for example, the following method can be used. That is, the positive electrode sheet for an all-solid state secondary battery is prepared as described above. In addition, a negative electrode composition is applied to a metal foil which is a negative electrode current collector so as to form a negative electrode active material layer. As a result, a negative electrode sheet for an all-solid state secondary battery is prepared. Next, the solid electrolyte layer is formed on the active material layer in any one of the sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, the positive electrode sheet for an all-solid state secondary battery and the negative electrode sheet for an all-solid state secondary battery are prepared as described above. In addition, separately from the electrode sheets, the solid electrolyte composition is applied to a substrate to prepare a solid electrolyte sheet for an all-solid state secondary battery including the solid electrolyte layer. Furthermore, the positive electrode sheet for an all-solid state secondary battery and the negative electrode sheet for an all-solid state secondary battery are laminated such that the solid electrolyte layer removed from the substrate is sandwiched therebetween. This way, an all-solid state secondary battery can be manufactured.

In the above-described manufacturing method, the electrode composition according to the embodiment of the present invention may be used as any one of the positive electrode composition or the negative electrode composition, and is preferably used as all of the compositions.

<Formation of Respective Layers (Film Formation)>

The method for applying each of the compositions is not particularly limited and can be appropriately selected. Examples thereof include coating (preferably wet-type coating), spray coating, spin coating, dip coating, slit coating, stripe coating, and bar coating.

In this case, each of the compositions may be dried after being applied each time or may be dried after being applied multiple times. The drying temperature is not particularly limited. The lower limit is preferably 30° C. or higher, more preferably 60° C. or higher, and still more preferably 80° C. or higher. The upper limit is preferably 300° C. or lower, more preferably 250° C. or lower, and still more preferably 200° C. or lower. In a case where the solid electrolyte composition is heated in the above-described temperature range, the dispersion medium can be removed to make the composition enter a solid state (applied and dried layer). In addition, the temperature is not excessively increased, and the respective members of the all-solid state secondary battery are not impaired, which is preferable. Therefore, in the all-solid state secondary battery, excellent total performance can be exhibited, and excellent binding properties and excellent ion conductivity can be obtained even under no pressure.

As described above, in a case where the electrode composition according to the embodiment of the present invention is applied and dried, an applied and dried layer in which solid particles are strongly bound and, in a more preferable aspect, the interface resistance between the solid particles is low can be formed.

After the application of the composition or after the preparation of the all-solid state secondary battery, the respective layers or the all-solid state secondary battery is preferably pressurized. In addition, the respective layers are also preferably compressed in a state where they are laminated. Examples of the compression method include a method using a hydraulic cylinder press machine. The pressurization pressure is not particularly limited, but is, generally, preferably in a range of 50 to 1,500 MPa.

In addition, the applied composition may be heated while being pressurized. The heating temperature is not particularly limited, but is generally in a range of 30° C. to 300° C. The respective layers or the all-solid state secondary battery can also be pressed at a temperature higher than the glass transition temperature of the inorganic solid electrolyte. In addition, the respective layers or the all-solid state secondary battery can also be pressed at a temperature higher than the glass transition temperature of the binder. In general, the pressing temperature does not exceed the melting point of the binder.

The compression may be carried out in a state in which a coating solvent or the dispersion medium has been dried in advance or in a state in which the solvent or the dispersion medium remains.

The respective compositions may be applied at the same time, and the application, the drying, and the pressing may be carried out simultaneously or sequentially. The respective compositions may be applied to separate substrates and then laminated by transfer.

The atmosphere during the compression is not particularly limited and may be any one of in the atmosphere, under the dried air (the dew point: −20° C. or lower), in an inert gas (for example, in an argon gas, in a helium gas, or in a nitrogen gas), or the like.

The pressing time may be a short time (for example, within several hours) at a high pressure or a long time (one day or longer) under the application of an intermediate pressure. In the case of members other than the electrode sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be homogeneous or variable with respect to a pressed portion such as a sheet surface.

The pressing pressure may be variable depending on the area or the thickness of the pressed portion. In addition, the pressure may also be variable stepwise for the same portion.

A pressing surface may be smooth or roughened.

<Initialization>

The all-solid state secondary battery manufactured as described above is preferably initialized after the manufacturing or before the use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. Application aspects are not particularly limited, and, in the case of being mounted in electronic apparatuses, examples thereof include notebook computers, pen-based input personal computers, mobile personal computers, e-book players, mobile phones, cordless phone handsets, pagers, handy terminals, portable faxes, mobile copiers, portable printers, headphone stereos, camcorders, liquid crystal televisions, handy cleaners, portable CDs, mini discs, electric shavers, transceivers, electronic organizers, calculators, memory cards, portable tape recorders, radios, and backup power supplies. In addition, examples of an electronic apparatus for consumer use include an automobile, an electromotive vehicle, a motor, a lighting device, a toy, a game device, a load conditioner, a timepiece, a strobe, a camera, a medical device (for example, a pacemaker, a hearing aid, or a shoulder massager). Further, the all-solid state secondary battery can be used as various cells for use in military or aerospace applications. In addition, the all-solid state secondary battery can also be combined with solar batteries.

EXAMPLES

Hereinafter, the present invention will be described in more detail based on Examples but is not limited to these examples. "%" that represents compositions in the following examples is "mass %" unless specified otherwise. In the present invention, "room temperature" refers to 25° C.

<Synthesis of Sulfide-Based Inorganic Solid Electrolyte>

As a sulfide-based inorganic solid electrolyte, Li—P—S-based glass was synthesized with reference to a non-patent document of T. Ohtomo, A. Hayashi, M. Tatsumisago, Y Tsuchida, S. Hama, K. Kawamoto, Journal of Power Sources, 233, (2013), pp. 231 to 235 and A. Hayashi, S. Hama, H. Morimoto, M. Tatsumisago, T Minami, Chem. Lett., (2001), pp. 872 and 873.

Specifically, in a glove box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, and put into a mortar. The molar ratio between $Li_2S$ and $P_2S_5$($Li_2S:P_2S_5$) was set to 75:25 in terms of molar ratio. The components were mixed using an agate mortar for 5 minutes.

66 g of zirconia beads having a diameter of 5 mm were put into a 45 mL zirconia container (manufactured by Fritsch Japan Co., Ltd.), the full amount of the mixture was put thereinto, and the container was sealed in an argon atmosphere. The container was set in a planetary ball mill P-7 (trade name, manufactured by Fritsch Japan Co., Ltd.), mechanical milling was carried out at 25° C. and a rotation speed of 510 rpm for 20 hours, and a yellow powder (6.20 g) of a sulfide-based inorganic solid electrolyte (Li—P—S-based glass, LPS) was obtained.

<Synthesis of Binder Particles (A)>

Preparation of binder particles (A) used in Examples and binder particles (binders No. 1 to 4 and 6 to 14 shown in Table 1 below) used in Comparative Examples will be described below.

Preparation Example of Binder No. 2

First, a macromonomer solution was prepared. That is, toluene (269.0 g) was charged into a 1 L three-neck flask equipped with a stirrer, a thermometer, a reflux cooling pipe, and a nitrogen gas introduction pipe and was heated to 80° C. in a nitrogen stream. Next, a monomer solution consisting of methyl methacrylate (150.2 g), lauryl methacrylate (381.6 g), V-601 (5.3 g, an azo polymerization initiator, manufactured by Fujifilm Wako Pure Chemical Corporation), and 3-mercaptopropionic acid (4.7 g) was added dropwise to the three-neck flask at a constant speed until the dropwise addition was completed after 2 hours. After completion of the dropwise addition of the monomer solution, the solution was stirred for 2 hours, was heated to 95° C., and was further stirred for 2 hours. Next, p-methoxyphenol (0.3 g), glycidyl methacrylate (31.8 g), and tetrabutylammonium bromide (6.4 g) were added to the obtained reaction mixture, and the solution was heated to 120° C. and was stirred for 3 hours. Next, the reaction solution was cooled to room temperature, was poured into methanol (2 L) under stirring, and was left to stand for a while. A solid obtained by decantation of the supernatant liquid was dissolved in heptane (1200 g), and the solvent was removed by distillation under reduced pressure until the solid content reached 40%. As a result, a macromonomer solution was obtained.

The number-average molecular weight of the macromonomer measured using the above-described measurement method was 10000.

Next, a macromonomer adduct solution was prepared. That is, the obtained macromonomer solution (287 g, solid content: 40%), dipentaerythritol hexakis(3-mercaptopropionate) (5.0 g), and toluene (305.0 g) were charged into a 1 L three-neck flask equipped with a stirrer, a thermometer, a reflux cooling pipe, and a nitrogen gas introduction pipe and were heated to 80° C. in a nitrogen stream. Next, V-601 (0.1 g) was added to the three-neck flask, and the solution was stirred for 2 hours. As a result, a macromonomer adduct solution was obtained (solid content: 20.0%).

The obtained macromonomer adduct was an adduct (m=2) obtained by a reaction of the macromonomer with two mercapto groups on average in dipentaerythritol hexakis (3-mercaptopropionate).

Using the macromonomer adduct solution obtained as described above, a dispersion liquid of the binder No. 2 was prepared. That is, diisobutyl ketone (54.5 g) and the macromonomer adduct solution (225.0 g, solid content: 20.0%) were charged into a 1 L three-neck flask equipped with a stirrer, a thermometer, a reflux cooling pipe, and a nitrogen gas introduction pipe, and the solution was heated to 80° C. in a nitrogen stream. Next, a monomer solution consisting of methyl methacrylate (13.5 g), diisobutyl ketone (38.5 g), and V-601 (0.5 g) was added dropwise to the three-neck flask at a constant speed until the dropwise addition was completed after 30 minutes. After completion of the dropwise addition of the monomer solution, the solution was stirred for 2 hours. Next, a monomer solution consisting of the following compound B (54.0 g), diisobutyl ketone (77 g), and V-601 (1.0 g) was added dropwise to the three-neck flask at a constant speed until the dropwise addition was completed after 1.5 hours. After completion of the dropwise addition of the monomer solution, the solution was stirred for 2 hours, was heated to 90° C., and was further stirred for 2 hours. The obtained reaction mixture was filtered through a mesh having a pore size of 50 μm. This way, a dispersion liquid of the binder No. 2 having a concentration of solid contents of 20 mass % was prepared.

(Compound B)

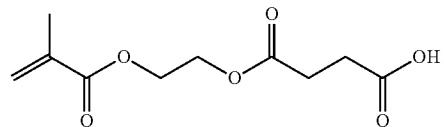

Hereinafter, a structure of the binder No. 2 will be shown.

In Table 1 shown below, a, b, and c represent the total content (mass %) of components represented by ( )$_a$ in the binder polymer, the total content (mass %) of components represented by ( )$_b$ in the binder polymer, and the total content (mass %) of components represented by ( )$_c$ in the binder polymer, respectively. In the binders No. 1 to 4 and 6 to 14 shown in Table 1, "l+m+n" is 6.

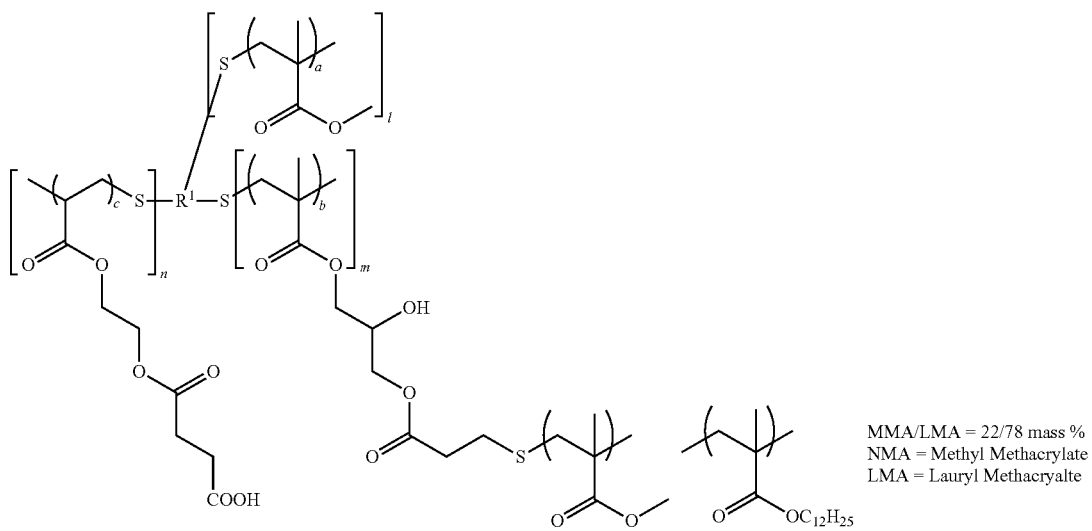

MMA/LMA = 22/78 mass %
NMA = Methyl Methacrylate
LMA = Lauryl Methacryalte

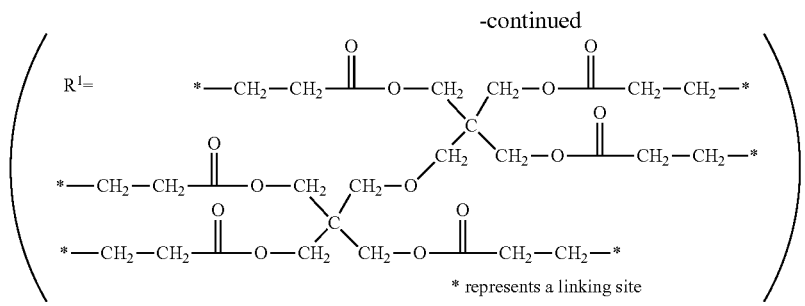

Preparation Example of Binders No. 1, 3, and 4

Binders No. 1, 3, and 4 were prepared using the same method as that of the preparation of the binder No. 2, except that the amounts of raw materials were changed such that a, b, and c were as shown in Table 1.

Preparation of Binder No. 6

A binder No. 6 was prepared using the same method as that of the preparation of the binder No. 4, except that methacrylonitrile was used instead of the compound B.

Preparation of Binder No. 7

A binder No. 7 was prepared using the same method as that of the preparation of the binder No. 4, except that styrene was used instead of the compound B.

Preparation of Binder No. 8

A binder No. 8 was prepared using the same method as that of the preparation of the binder No. 4, except that the compound B (51.0 g) and the following compound C (3.0 g) were used instead of the compound B (54.0 g). In the binder No. 8, a component derived from the compound B and a component derived from the following compound C corresponds to a component represented by [ ] in the chemical formula.

[Chem. 16]

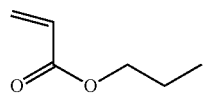

Compound C

Preparation of Binder No. 9

A binder No. 9 was prepared using the same method as that of the preparation of the binder No. 4, except that the compound B (51.0 g) and the following compound D (3.0 g) were used instead of the compound B (54.0 g). In the binder No. 9, a component derived from the compound B and a component derived from the following compound D corresponds to a component represented by [ ] in the chemical formula.

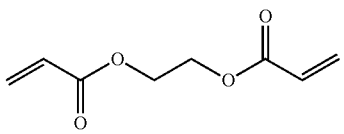

Compound D

Preparation of Binder No. 10

A binder No. 10 was prepared using the same method as that of the preparation of the binder No. 4, except that the compound B (48.0 g) and the compound D (6.0 g) were used instead of the compound B (54.0 g). In the binder No. 10, each of components derived from the compounds B and D corresponds to a component represented by [ ]n in the chemical formula.

Preparation of Binder No. 11

A binder No. 11 was prepared using the same method as that of the preparation of the binder No. 4, except that the compound B (51.0 g) and the following compound E (3.0 g) were used instead of the compound B (54.0 g). In the binder No. 11, a component derived from the compound B and a component derived from the following compound E corresponds to a component represented by [ ] in the chemical formula.

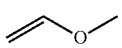

Compound E

Preparation of Binder No. 12

A binder No. 12 was prepared using the same method as that of the preparation of the binder No. 4, except that the compound B (51.0 g) and the following compound F (3.0 g) were used instead of the compound B (54.0 g). In the binder No. 12, a component derived from the compound B and a component derived from the following compound F corresponds to a component represented by [ ]n in the chemical formula.

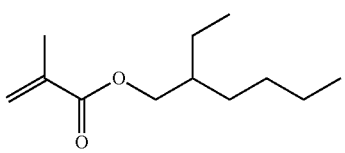

Compound F

Preparation of Binder No. 13

A binder No. 13 was prepared using the same method as that of the preparation of the binder No. 4, except that the compound B (45.0 g), the compound D (6.0 g), and the compound F (3.0 g) were used instead of the compound B (54.0 g). In the binder No. 13, each of components derived from the compounds B, D, and F corresponds to a component represented by [ ]$_n$ in the chemical formula.

Preparation of Binder No. 14

A binder No. 14 was prepared using the same method as that of the preparation of the binder No. 2, except that the amounts of raw materials were changed such that a, b, and c were as shown in Table 1.

The SP value of each of the components forming the binders No. 1 to 4 and 6 to 14 was calculated using the above-described method. Hereinafter, the results are shown.

| | |
|---|---|
| Component derived from methyl methacrylate . . . | SP value: 19.5 |
| Component derived from lauryl methacrylate . . . | SP value: 17.3 |
| Component derived from macromonomer . . . | SP value: 19.3 |
| Component derived from the compound B . . . | SP value: 21.3 |
| Component derived from the compound C . . . | SP value: 20.1 |
| Component derived from the compound D . . . | SP value: 21.4 |
| Component derived from the compound E . . . | SP value: 18.1 |
| Component derived from the compound F . . . | SP value: 18.7 |

<Preparation of Electrode Sheet for all-Solid State Secondary Battery>

An electrode sheet for an all-solid state secondary battery was prepared as follows.

(Preparation of Negative Electrode Sheet (Condition 1)
(Preparation of Negative Electrode Sheet Using Negative Electrode Composition Under Condition 1 in Table 1 Below))

(Step 1 (Mixing Method A))

180 zirconia beads having a diameter of 5 mm were put into a 45 mL zirconia container (manufactured by Fritsch Japan Co., Ltd.), and 6.7 g of LPS synthesized as described above and 12.3 g of heptane as a dispersion medium were put thereinto. The container was set in a planetary ball mill P-7 (manufactured by Fritsch Japan Co., Ltd.) and the components were mixed together for 2 hours at a temperature of 25° C. and a rotation speed of 300 rpm. Next, 7.0 g of Si powder (median size: 1 to 5 μm, manufactured by Thermo Fisher Scientific Inc., Silicon Powder) as an active material, 0.65 g of acetylene black as a conductive auxiliary agent (manufactured by Denka Co., Ltd.), and 0.15 g of the dispersion liquid of the binder No. 1 expressed in terms of solid contents were charged into a container. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. As a result, a negative electrode composition was prepared.

(Step 2)

The negative electrode composition was applied to a stainless steel (SUS) foil (negative electrode current collector) having a thickness of 20 μm using an applicator (trade name: SA-201, a Baker type applicator, manufactured by Tester Sangyo Co., Ltd.) such that the weight per unit area was 2.9 mg/cm$^2$, and was heated and dried at 100° C. for 1 hour. As a result, a negative electrode sheet including the negative electrode active material layer on the negative electrode current collector was prepared. The thickness of the negative electrode active material layer was 25 μm.

(Preparation of Negative Electrode Sheet (Condition 2))

A negative electrode sheet (condition 2) was prepared using the same method as that of the preparation of the negative electrode sheet (condition 1), except that the step 1 (mixing method A) was changed to the following mixing method B.

—Mixing Method B—

180 zirconia beads having a diameter of 5 mm were put into a 45 mL zirconia container (manufactured by Fritsch Japan Co., Ltd.), and 2.80 g of the above-described synthesized LPS, 0.061 g of (expressed in terms of solid contents) of the dispersion liquid of the binder No. 1, and 12.3 g of heptane as a dispersion medium were put thereinto. The container was set in a planetary ball mill P-7 (manufactured by Fritsch Japan Co., Ltd.) and the components were mixed together for 2 hours at a temperature of 25° C. and a rotation speed of 300 rpm. Next, 2.93 g of Si powder (median size: 1 to 5 μm, manufactured by Thermo Fisher Scientific Inc., Silicon Powder) as an active material, and 0.273 g of acetylene black as a conductive auxiliary agent (manufactured by Denka Co., Ltd.) were charged into a container. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. As a result, a negative electrode composition was prepared.

(Preparation of Negative Electrode Sheet (Condition 3))

A negative electrode sheet (condition 3) was prepared using the same method as that of the preparation of the negative electrode sheet (condition 1), except that the step 1 (mixing method A) was changed to the following mixing method C.

—Mixing Method C—

180 zirconia beads having a diameter of 5 mm were put into a 45 mL zirconia container S (manufactured by Fritsch Japan Co., Ltd.), and 2.8 g of LPS synthesized as described above and 12.3 g of heptane as a dispersion medium were put thereinto. The container S was set in a planetary ball mill P-7 (manufactured by Fritsch Japan Co., Ltd.) and the components were mixed together for 2 hours at a temperature of 25° C. and a rotation speed of 300 rpm. 2.93 g of Si powder (median size: 1 to 5 μm, manufactured by Thermo Fisher Scientific Inc., Silicon Powder) as an active material, 0.273 g of acetylene black as a conductive auxiliary agent (manufactured by Denka Co., Ltd.), 0.061 g of the dispersion liquid of the binder No. 1 expressed in terms of solid contents, and 12.3 g of heptane were charged into a container T. Next, using the same method, the container was set in a planetary ball mill P-7 (trade name, manufactured by Fritsch Japan Co., Ltd.) and the components were continuously mixed together for 15 minutes at a temperature of 25° C. and a rotation speed of 200 rpm. The slurry mixed in the container T was charged into the container S. Next, using the same method, the container was set in a planetary ball mill P-7 (trade name, manufactured by Fritsch Japan Co., Ltd.) and the components were mixed together for 15 minutes at a temperature of 25° C. and a rotation speed of 200 rpm. As a result, a negative electrode composition was prepared.

<Preparation of Negative Electrode Sheets (Condition 4) to (Condition 22) and (Condition 25)>

Negative electrode sheets under conditions (condition 4) to (condition 22) and (condition 25) were prepared using the same method as that of the preparation of the negative electrode sheet under the condition 3, except that the composition of the negative electrode composition was changed as shown in Table 1 below.

<Preparation of Negative Electrode Sheet (Condition 23)>

A negative electrode sheet under (condition 23) was prepared using the same method as that of the preparation of the negative electrode sheet under the condition 1, except that the composition of the negative electrode composition was changed as shown in Table 1 below.

<Preparation of Negative Electrode Sheet (Condition 24)>

A negative electrode sheet under (condition 24) was prepared using the same method as that of the preparation of the negative electrode sheet under the condition 2, except that the composition of the negative electrode composition was changed as shown in Table 1 below.

<Preparation of Positive Electrode Sheets (Condition 26) to (Condition 31)>

Positive electrode sheets under conditions (condition 26) to (condition 31) were prepared using the same method as that of the preparation of the negative electrode sheet under the condition 3, except that a positive electrode composition having a composition shown in Table 1 below was used instead of the negative electrode composition.

<Preparation of all-Solid State Secondary Battery>

Using the prepared negative electrode sheet, an all-solid state secondary battery was prepared as follows.

The negative electrode sheet was punched into a disk shape having a diameter of 10 mmϕ and was put into a cylinder formed of polyethylene terephthalate having a diameter of 10 mmϕ. 30 mg of LPS synthesized as described above was put into the surface of the negative electrode active material layer in the cylinder, and a SUS bar having a diameter of 10 mmϕ was inserted into the cylinder from both end openings. The negative electrode current collector side of the negative electrode sheet and LPS were pressed by the SUS bar at a pressure of 350 MPa. As a result, a solid electrolyte layer was formed. Next, the SUS bar disposed on the solid electrolyte layer side was temporarily removed, and a disk-shaped indium (In) sheet (thickness: 20 µm) having a diameter of 9 mmϕ and a disk-shaped lithium (Li) sheet (thickness: 20 µm) having a diameter of 9 mmϕ were inserted into the solid electrolyte layer in the cylinder in this order. The removed SUS bar was inserted into the cylinder again and was fixed in a state where a pressure of 50 MPa was applied. This way, an all-solid state secondary battery having a configuration of the SUS foil (thickness: 20 µm)-the negative electrode active material layer (thickness: 25 µm)-the sulfide-based inorganic solid electrolyte layer (thickness: 200 µm)-the positive electrode active material layer (In/Li sheet, thickness: 30 µm) was obtained.

Using the prepared positive electrode sheet, an all-solid state secondary battery was prepared as follows.

The positive electrode sheet was punched into a disk shape having a diameter of 10 mmϕ and was put into a cylinder formed of PET having a diameter of 10 mmϕ. 30 mg of LPS synthesized as described above was put into the surface of the positive electrode active material layer in the cylinder, and a SUS bar having a diameter of 10 mmϕ was inserted into the cylinder from both end openings. The positive electrode current collector side of the positive electrode sheet and LPS were pressed by the SUS bar at a pressure of 350 MPa. As a result, a solid electrolyte layer was formed. Next, the SUS bar disposed on the solid electrolyte layer side was temporarily removed, and a disk-shaped indium (In) sheet (thickness: 20 µm) having a diameter of 9 mmϕ and a disk-shaped lithium (Li) sheet (thickness: 20 µm) having a diameter of 9 mmϕ were inserted into the solid electrolyte layer in the cylinder in this order. The removed SUS bar was inserted into the cylinder again and was fixed in a state where a pressure of 50 MPa was applied. This way, an all-solid state secondary battery having a configuration of the aluminum foil (thickness: 20 µm)-the positive electrode active material layer (thickness: 100 µm)-the sulfide-based inorganic solid electrolyte layer (thickness: 200 µm)-the negative electrode active material layer (In/Li sheet, thickness: 30 µm) was obtained.

<Calculation Method>

The adsorption rate A of the binder to the active material and the adsorption rate B of the binder to the active material were calculated as follows. In addition, a distribution rate A of the distributing component to the active material and a distribution rate B of the distributing component to the active material were calculated as follows. In addition, the modulus of elasticity and the tensile strain at break of the polymer forming the binder were calculated as follows.

Regarding the binders No. 1 to 5 and 7 to 13, after removing the dispersion medium and the like from the dispersion liquid, the adsorption rate, the modulus of elasticity, and the tensile strain at break were measured.

[Adsorption Rate A]

1.6 g of the active material and 0.08 g of the binder used in the electrode composition were put into a 15 mL vial, 8 g of heptane was added while stirring the solution using a mix rotor, and the solution was stirred at room temperature and 80 rpm for 30 minutes. After stirring, the dispersion liquid was filtered through a filter having a pore size of 1 µm, and 2 g of the filtrate was dried. The mass of the dried binder (the mass of the binder not adsorbed to the active material) was obtained, and the adsorption rate A was calculated from the following expression.

$$\{(0.08\ g - \text{Mass of Binder not adsorbed to Active Material} \times 8/2)0.08\ g\} \times 100(\%)$$

[Adsorption Rate B]

0.5 g of the inorganic solid electrolyte formed of the electrode composition and 0.26 g of the binder used in the electrode composition were put into a 15 mL vial, 25 g of heptane was added while stirring the solution using a mix rotor, and the solution was stirred at room temperature and 80 rpm for 30 minutes. After stirring, the dispersion liquid was filtered through a filter having a pore size of 1 µm, and 2 g of the filtrate was dried. The mass of the dried binder (the mass of the binder not adsorbed to the inorganic solid electrolyte) was obtained, and the adsorption rate B was calculated from the following expression.

$$\{(0.26\ g - \text{Mass of Binder not adsorbed to Inorganic Solid Electrolyte} \times 25/2)0.26\ g\} \times 100(\%)$$

[Distribution Rate]

Using an ion milling device (manufactured by Hitachi, Ltd., IM4000PLUS (trade name)), a cross-section of the electrode active material layer was cut out under conditions of acceleration voltage: 3 kV, discharge voltage: 1.5 V, treatment time: 4 hours, and argon gas flow rate: 0.1 ml/min. The cross-section of the electrode active material layer was observed by AES (Auger Electron Spectroscopy, manufactured by JEOL Ltd., JAMP-9510F (trade name)) at a magnification of 3500-fold. The obtained image of each element was converted into a gray scale image using ImageJ, a histogram of a brightness distribution of each element was generated, and the gray scale image was binarized by using a minimum value between histogram peaks of a bimodal distribution (a peak derived from the background and a peak derived from each element) as a threshold value. As a result, a mapping cross-sectional image of each element was obtained. From the mapping cross-sectional image, a position derived from a Si atom of the active material and positions (positions of the distributing components) derived from carbon atoms of the binder and the conductive auxiliary agent were extracted to obtain the proportions of the active material present in edge portions (contours) of the distributing component. Among the lengths of all the edge portions of the distributing component, the proportion of the length in contact with the active material was obtained as the distribution rate A (%). A value obtained by subtracting the distribution rate A from 100% was set as the distribution rate B (%) of the distributing component to the inorganic solid electrolyte.

In a case where an active material other than Si was used, the measurement was performed using a peak derived from an atom of the active material other than a carbon atom. In a case where CGB (graphite) was used as the active material, a signal of a carbon atom was extracted as the position of the active material, a signal derived from an oxygen atom of the binder was extracted as the position of the distributing component, and the distribution rates were obtained using the above-described method.

[Modulus of Elasticity (Tensile Elastic Modulus)]

A specimen described in JIS K 7161 (2014) "Plastics—Determination of Tensile Properties" was obtained from the binder solution, and the tensile elastic modulus was obtained according to these standards.

Specifically, the binder was dissolved in, for example, methyl ethyl ketone (MEK) or N-methylpyrrolidone (NMP) to prepare a cast film having a thickness of about 200 μm. This cast film was cut into a size of 10 mm×20 mm and was set in a tensile tester such that the distance between chucks was 10 mm, a stress-strain curve was evaluated, and the modulus of elasticity was obtained.

[Tensile Strain at Break]

A specimen described in JIS K 7161 (2014) "Plastics—Determination of Tensile Properties" was obtained from the binder solution, and the tensile strain at break was obtained according to these standards.

Specifically, the binder was dissolved in, for example, methyl ethyl ketone (MEK) or N-methylpyrrolidone (NMP) to prepare a cast film having a thickness of about 200 μm. This cast film was cut into a size of 10 mm×20 mm and was set in a tensile tester such that the distance between chucks was 10 mm, a stress-strain curve was evaluated, and the tensile strain at break was obtained.

<Test>

The discharge capacity and the resistance of the prepared all-solid state secondary battery were evaluated as follows.

(Discharge Capacity Test)

In an environment of 25° C., the all-solid state secondary battery prepared as described above was charged and discharged once (initialized) in a range of 4.3 V to 3.0 V under conditions of charge current value: 0.13 mA and discharge current value: 0.13 mA.

In an environment of 25° C., the all-solid state secondary battery was charged to 4.3 V under a condition of charge current value: 0.13 mA, and was discharged to 3.0 V at a discharge current value of 2.0 mA. In this case, the discharge capacity values were compared.

In a case where the discharge capacity of the condition 7 was represented by 1 (dimensionless because Ah was normalized), a relative value was evaluated based on the following evaluation standards. "C" or higher is an acceptable level of this test.

—Evaluation Standards—

AA: 2.0<relative value of discharge capacity
A: 1.5<relative value of discharge capacity≤2.0
B: 1.0<relative value of discharge capacity≤1.5
C: 0.5<relative value of discharge capacity≤1.0
D: relative value of discharge capacity≤0.5

(Resistance Test)

The battery performance of the all-solid state secondary battery prepared as described above was evaluated based on the battery voltage measured using a charging and discharging evaluation device "TOSCAT-3000" (trade name; manufactured by Toyo System Corporation). Specifically, the all-solid state secondary battery was charged at a current value of 0.2 mA until the battery voltage reached 4.3 V, and then was discharged at a current value of 2.0 mA until the battery voltage reached 3.0 V. The battery voltage measured 10 seconds after the start of discharging was read and evaluated based on the following evaluation standards. "D" or higher is an acceptable level of this test. This shows that, as the voltage increases, the resistance decreases.

—Evaluation Standards—

AA: 4.10 V or higher
A: 4.05 V or higher and lower than 4.10 V
B: 4.00 V or higher and lower than 4.05 V
C: 3.95 V or higher and lower than 4.00 V
D: 3.90 V or higher and lower than 3.95 V
E: 3.85 V or higher and lower than 3.90 V
F: lower than 3.85 V

TABLE 1-A

| Condition | Note | Active Material | Content (mass %) | Inorganic Solid Electrolyte | Content (mass %) | No. | c (mass %) | a (mass %) | b (mass %) | Particle Size (nm) | Modulus of Elasticity (MPa) | Tensile Strain at Break (%) | Adsorption Rate A (%) | Adsorption Rate B (%) | Content (mass %) |
|---|---|---|---|---|---|---|---|---|---|---|---|---|---|---|---|
| | | | | | | | | | Binder | | | | | | |
| | | | | | | Negative Electrode | | | | | | | | | |
| 1 | Comparative Example | Si | 48.3% | Li$_2$S—P$_2$S$_5$ | 46.2% | 1 | 24 | 36 | 40 | 210 | 20 | 320 | 10 | 27 | 1% |
| 2 | Comparative Example | Si | 48.3% | Li$_2$S—P$_2$S$_5$ | 46.2% | 1 | 24 | 36 | 40 | 210 | 20 | 320 | 10 | 27 | 1% |
| 3 | Example | Si | 48.3% | Li$_2$S—P$_2$S$_5$ | 46.2% | 1 | 24 | 36 | 40 | 210 | 20 | 320 | 10 | 27 | 1% |
| 4 | Example | Si | 48.3% | Li$_2$S—P$_2$S$_5$ | 46.2% | 2 | 48 | 12 | 40 | 210 | 20 | 320 | 21 | 18 | 1% |
| 5 | Example | Si | 48.3% | Li$_2$S—P$_2$S$_5$ | 46.2% | 3 | 54 | 6 | 40 | 210 | 20 | 320 | 23 | 9 | 1% |
| 6 | Example | Si | 48.3% | Li$_2$S—P$_2$S$_5$ | 46.2% | 4 | 60 | 0 | 40 | 210 | 20 | 320 | 37 | 6 | 1% |

TABLE 1-A-continued

| Condition | Note | Active Material | Content (mass %) | Inorganic Solid Electrolyte | Content (mass %) | Binder No. | c (mass %) | a (mass %) | b (mass %) | Particle Size (nm) | Modulus of Elasticity (MPa) | Tensile Strain at Break (%) | Adsorption Rate A (%) | Adsorption Rate B (%) | Content (mass %) |
|---|---|---|---|---|---|---|---|---|---|---|---|---|---|---|---|
| 7 | Example | Si | 48.3% | Li$_2$S—P$_2$S$_5$ | 46.2% | 5 | SBR | | | 210 | 2 | 610 | 56 | 30 | 1% |
| 8 | Example | Si | 48.3% | Li$_2$S—P$_2$S$_5$ | 46.2% | 6 | 60 (Cyano Group) | 0 | 40 | 210 | 20 | 320 | 40 | 5 | 1% |
| 9 | Example | Si | 48.3% | Li$_2$S—P$_2$S$_5$ | 46.2% | 7 | 60 (Phenyl Group) | 0 | 40 | 210 | 20 | 320 | 13 | 0 | 1% |
| 10 | Example | CGB20 | 48.3% | Li$_2$S—P$_2$S$_5$ | 46.2% | 4 | 60 | 0 | 40 | 210 | 20 | 320 | 23 | 18 | 1% |
| 11 | Example | Sn | 48.3% | Li$_2$S—P$_2$S$_5$ | 46.2% | 2 | 48 | 12 | 40 | 210 | 20 | 320 | 41 | 2 | 1% |
| 12 | Example | Sn | 48.3% | Li$_2$S—P$_2$S$_5$ | 46.2% | 4 | 60 | 0 | 40 | 210 | 20 | 320 | 60 | 3 | 1% |
| 13 | Example | Si | 48.3% | Li$_2$S—P$_2$S$_5$ | 45.2% | 4 | 60 | 0 | 40 | 210 | 20 | 320 | 37 | 6 | 2% |
| 14 | Example | Si | 48.3% | Li$_2$S—P$_2$S$_5$ | 42.2% | 4 | 60 | 0 | 40 | 210 | 20 | 320 | 37 | 6 | 5% |
| 15 | Example | Si | 48.3% | Li$_2$S—P$_2$S$_5$ | 37.2% | 4 | 60 | 0 | 40 | 210 | 20 | 320 | 37 | 6 | 10% |
| 16 | Example | Si | 48.3% | Li$_2$S—P$_2$S$_5$ | 35.2% | 4 | 60 | 0 | 40 | 210 | 20 | 320 | 37 | 5 | 12% |
| 17 | Example | Si | 48.3% | Li$_2$S—P$_2$S$_5$ | 46.2% | 8 | 60 | 0 | 40 | 210 | 5 | 320 | 74 | 5 | 1% |
| 18 | Example | Si | 48.3% | Li$_2$S—P$_2$S$_5$ | 46.2% | 9 | 60 | 0 | 40 | 210 | 132 | 320 | 83 | 4 | 1% |
| 19 | Example | Si | 48.3% | Li$_2$S—P$_2$S$_5$ | 46.2% | 10 | 60 | 0 | 40 | 210 | 290 | 320 | 80 | 7 | 1% |
| 20 | Example | Si | 48.3% | Li$_2$S—P$_2$S$_5$ | 46.2% | 11 | 60 | 0 | 40 | 210 | 20 | 45 | 77 | 5 | 1% |
| 21 | Example | Si | 48.3% | Li$_2$S—P$_2$S$_5$ | 46.2% | 12 | 60 | 0 | 40 | 210 | 20 | 490 | 75 | 8 | 1% |
| 22 | Example | Si | 48.3% | Li$_2$S—P$_2$S$_5$ | 46.2% | 13 | 60 | 0 | 40 | 210 | 280 | 380 | 75 | 7 | 1% |
| 23 | Example | Si | 48.3% | Li$_2$S—P$_2$S$_5$ | 46.2% | 4 | 60 | 0 | 40 | 210 | 20 | 320 | 37 | 6 | 1% |
| 24 | Example | Si | 48.3% | Li$_2$S—P$_2$S$_5$ | 46.2% | 4 | 60 | 0 | 40 | 210 | 20 | 320 | 37 | 6 | 1% |
| 25 | Example | Si | 48.3% | Li$_2$S—P$_2$S$_5$ | 50.7% | 4 | 60 | 0 | 40 | 210 | 20 | 320 | 37 | 6 | 1% |
| 26 | Comparative Example | NMC | 70% | Li$_2$S—P$_2$S$_5$ | 24.5% | 1 | 24 | 36 | 40 | 210 | 20 | 320 | 10 | 27 | 1% |

Positive Electrode

| 27 | Example | NMC | 70% | Li$_2$S—P$_2$S$_5$ | 24.5% | 14 | 36 | 24 | 40 | 210 | 20 | 320 | 24 | 30 | 1% |
| 28 | Example | NMC | 70% | Li$_2$S—P$_2$S$_5$ | 24.5% | 2 | 48 | 12 | 40 | 210 | 20 | 320 | 63 | 4 | 1% |
| 29 | Comparative Example | NMC | 70% | LLZ | 24.5% | 1 | 24 | 36 | 40 | 210 | 20 | 320 | 3 | 27 | 1% |
| 30 | Example | NMC | 70% | LLZ | 24.5% | 14 | 36 | 24 | 40 | 210 | 20 | 320 | 21 | 30 | 1% |
| 31 | Example | NMC | 70% | LLZ | 24.5% | 2 | 48 | 12 | 40 | 210 | 20 | 320 | 42 | 4 | 1% |

TABLE 1-B

| Condition | Note | Conductive Auxiliary Agent | Content (mass %) | Mixing Method | Distribution Rate A (%) | Distribution Rate B (%) | Discharge Capacity | Resistance |
|---|---|---|---|---|---|---|---|---|
| Negative Electrode | | | | | | | | |
| 1 | Comparative Example | AB | 4.5% | A | 22 | 78 | B | F |
| 2 | Comparative Example | AB | 4.5% | B | 5 | 95 | D | F |
| 3 | Example | AB | 4.5% | C | 54 | 46 | A | D |
| 4 | Example | AB | 4.5% | C | 80 | 20 | A | C |
| 5 | Example | AB | 4.5% | C | 92 | 8 | A | A |
| 6 | Example | AB | 4.5% | C | 94 | 6 | A | AA |
| 7 | Example | AB | 4.5% | C | 55 | 45 | C | D |
| 8 | Example | AB | 4.5% | C | 60 | 40 | B | D |
| 9 | Example | AB | 4.5% | C | 52 | 48 | C | D |
| 10 | Example | AB | 4.5% | C | 53 | 47 | C | B |
| 11 | Example | AB | 4.5% | C | 52 | 48 | B | B |
| 12 | Example | AB | 4.5% | C | 57 | 43 | A | A |
| 13 | Example | AB | 4.5% | C | 81 | 19 | A | A |
| 14 | Example | AB | 4.5% | C | 79 | 21 | A | B |
| 15 | Example | AB | 4.5% | C | 71 | 29 | C | C |
| 16 | Example | AB | 4.5% | C | 62 | 38 | C | D |
| 17 | Example | AB | 4.5% | C | 62 | 38 | C | D |
| 18 | Example | AB | 4.5% | C | 70 | 30 | A | AA |
| 19 | Example | AB | 4.5% | C | 69 | 31 | A | AA |
| 20 | Example | AB | 4.5% | C | 65 | 35 | C | C |

TABLE 1-B-continued

| Condition | Note | Conductive Auxiliary Agent | Content (mass %) | Mixing Method | Distribution Rate A (%) | Distribution Rate B (%) | Discharge Capacity | Resistance |
|---|---|---|---|---|---|---|---|---|
| 21 | Example | AB | 4.5% | C | 67 | 33 | A | AA |
| 22 | Example | AB | 4.5% | C | 80 | 20 | AA | AA |
| 23 | Example | AB | 4.5% | A | 60 | 40 | B | C |
| 24 | Example | AB | 4.5% | B | 53 | 47 | C | D |
| 25 | Example | — | 0.0% | C | 88 | 12 | A | C |
| Positive Electrode | | | | | | | | |
| 26 | Comparative Example | AB | 4.5% | C | 24 | 76 | C | F |
| 27 | Example | AB | 4.5% | C | 58 | 42 | C | B |
| 28 | Example | AB | 4.5% | C | 70 | 30 | C | AA |
| 29 | Comparative Example | AB | 4.5% | C | 19 | 81 | D | F |
| 30 | Example | AB | 4.5% | C | 52 | 48 | C | A |
| 31 | Example | AB | 4.5% | C | 59 | 41 | C | A |

<Notes in Table>
(1) Si: Silicon Powder having a median size of 1 to 5 μm, manufactured by Thermo Fisher Scientific Inc.
(2) CGB 20: graphite having a median size of 20 μm, trade name, manufactured by Nippon Kokuen Group
(3) Sn: Sn powder having a median size of 1 to 5 μm, manufactured by Fujifilm Wako Pure Chemical Corporation
(4) NMC: $LiNi_{1/3}Co_{1/3}Mn_{1/3}O_2$ (lithium nickel manganese cobalt oxide) having a median size of 3 μm
(5) $Li_2S$—$P_2S_5$: LPS synthesized as described above having a median size of 1 μm
(6) LLZ: $Li_7La_3Zr_2O_{12}$ having a median size of 1.5 μm
(7) a, b, and c were calculated from the raw materials used for the preparation of the polymer
(8) In the condition 7, styrene-butadiene rubber (binder No. 5) was used as the polymer, and thus a, b, and c are not described
(9) Particle size: average particle size (median size)
(10) SBR: styrene-butadiene rubber (manufactured by JSR Corporation, DYNARON 1321P (trade name))
(11) AB: acetylene black having a median size of 0.5 μm As can be seen from Table 1, in the all-solid state secondary battery including the electrode active material layer in which the distribution rate of the distributing component to the active material exceeded 50%, the discharge capacity were excellent and the resistance was low.

The present invention has been described using the embodiments. However, unless specified otherwise, any of the details of the above description is not intended to limit the present invention and can be construed in a broad sense within a range not departing from the concept and scope of the present invention disclosed in the accompanying claims.

The present application claims priority based on JP2018-194509 filed on Oct. 15, 2018, the entire content of which is incorporated herein by reference.

EXPLANATION OF REFERENCES

1: negative electrode current collector
2: negative electrode active material layer
3: solid electrolyte layer
4: positive electrode active material layer
5: positive electrode current collector
6: operation portion
10: all-solid state secondary battery
11: coin case
12: laminate for all-solid state secondary battery
13: cell (coin battery) for ion conductivity measurement

What is claimed is:

1. An electrode composition comprising:
an inorganic solid electrolyte, wherein the inorganic solid electrolyte is a sulfide-based inorganic solid electrolyte or an oxide-based inorganic solid electrolyte;
an active material, wherein the active material is a negative electrode active material having a silicon atom or a tin atom, or the active material is a positive electrode active material including transition metal oxides having a layered rock salt structure, transition metal oxides having a spinel-type structure, lithium-containing transition metal phosphate compounds, lithium-containing transition metal halogenated phosphate compounds, or lithium-containing transition metal silicate compounds; and
a distributing component that binds to the inorganic solid electrolyte and the active material,
wherein the distributing component consist of a binder, or consist of the binder and a conductive auxiliary agent, wherein the binder is formed of binder particles including a polymer represented by Formula 1:

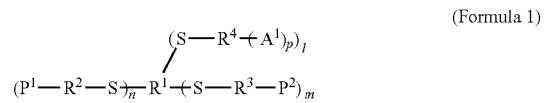

(Formula 1)

in Formula 1, $R^1$ represents a (l+m+n)-valent linking group, $A^1$ represents a hydrogen atom, an acidic group, a group having a basic nitrogen atom, a urea group, a urethane group, an alkoxysilyl group, an epoxy group, an isocyanate group, or a hydroxy group, p represents an integer of 1 to 10, $R^2$, $R^3$, and $R^4$ each independently represent a single bond or a linking group, $P^1$ represents a polymer chain including 50 mass % or higher of a component having a SP value of 19.5 or higher, and the component is derived from a polymerizable compound having a molecular weight of lower than 500, $P^2$ represents a polymer chain including a component derived from a macromonomer having a number-average molecular weight of 1000 or higher and 500,000 or lower, l represents an integer of 0 to 5, m represents an integer of 1 to 8, and n represents an integer of 1 to 9, l+m+n represents an integer of 3 to 10, an adsorption rate A of the binder to the active material and an adsorption rate B of the binder to the inorganic solid electrolyte satisfy the following Expressions I) and II), and a distribution rate of the distributing component to the active material in an electrode active material layer formed of the electrode composition exceeds 50%, Adsorption Rate $A \geq 20\%$, and  (Expression I)

Adsorption Rate $A >$ Adsorption Rate $B$.  (Expression II)

2. The electrode composition according to claim 1, wherein the adsorption rate B is 10% or lower.

3. The electrode composition according to claim 1, wherein the active material is the negative electrode active material having the silicon atom or the tin atom.

4. The electrode composition according to claim 3, wherein the negative electrode active material is the negative electrode active material having the silicon atom.

5. The electrode composition according to claim 1, wherein a content of the binder is 2 mass % or lower with respect to all solid components in the electrode composition.

6. The electrode composition according to claim 1, wherein a modulus of elasticity of the polymer forming the binder that is measured according to JIS K 7161 (2014) is 10 to 500 MPa.

7. The electrode composition according to claim 1, wherein a tensile strain at break of the polymer forming the binder that is measured according to JIS K 7161 (2014) is 50% to 700%.

8. An all-solid state secondary battery comprising, in the following order:
   a positive electrode active material layer;
   a solid electrolyte layer; and
   a negative electrode active material layer in this order,
   wherein at least one of the positive electrode active material layer or the negative electrode active material layer is formed of the electrode composition according to claim 1.

9. A method of manufacturing the electrode composition according to claim 1, the method comprising:
   a step of mixing an active material and a binder with each other to obtain a mixture; and
   a step of mixing the mixture and an inorganic solid electrolyte with each other.

10. A method of manufacturing an electrode sheet for an all-solid state secondary battery, the method comprising:
    applying the electrode composition obtained using the manufacturing method according to claim 9.

11. A method of manufacturing an all-solid state secondary battery, the method comprising: manufacturing an all-solid state secondary battery using the electrode sheet for an all-solid state secondary battery obtained using the manufacturing method according to claim 10.

12. An electrode sheet for an all-solid state secondary battery, the electrode sheet comprising:
    an electrode active material layer including an inorganic solid electrolyte, an active material, and a distributing component that binds to the inorganic solid electrolyte and the active material, wherein
    the inorganic solid electrolyte is a sulfide-based inorganic solid electrolyte or an oxide-based inorganic solid electrolyte,
    the active material is a negative electrode active material having a silicon atom or a tin atom, or the active material is a positive electrode active material including transition metal oxides having a layered rock salt structure, transition metal oxides having a spinel-type structure, lithium-containing transition metal phosphate compounds, lithium-containing transition metal halogenated phosphate compounds, or lithium-containing transition metal silicate compounds,
    the distributing component consist of a binder, or consist of the binder and a conductive auxiliary agent, wherein the binder is formed of binder particles including a polymer represented by Formula 1:

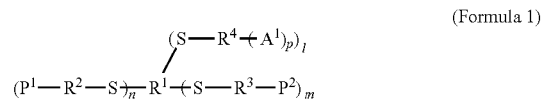

(Formula 1)

in Formula 1, $R^1$ represents a (l+m+n)-valent linking group, $A^1$ represents a hydrogen atom, an acidic group, a group having a basic nitrogen atom, a urea group, a urethane group, an alkoxysilyl group, an epoxy group, an isocyanate group, or a hydroxy group, p represents an integer of 1 to 10, $R^2$, $R^3$, and $R^4$ each independently represent a single bond or a linking group, $P^1$ represents a polymer chain including 50 mass % or higher of a component having a SP value of 19.5 or higher, and the component is derived from a polymerizable compound having a molecular weight of lower than 500, $P^2$ represents a polymer chain including a component derived from a macromonomer having a number-average molecular weight of 1000 or higher and 500,000 or lower, l represents an integer of 0 to 5, m represents an integer of 1 to 8, and n represents an integer of 1 to 9, l+m+n represents an integer of 3 to 10, and a distribution rate of the distributing component to the active material in the electrode active material layer exceeds 50%.

* * * * *